US009033571B2

(12) United States Patent
Hasegawa

(10) Patent No.: US 9,033,571 B2
(45) Date of Patent: May 19, 2015

(54) STIRRING DEVICE AND METHOD FOR MANUFACTURING SAME

(75) Inventor: Teiichi Hasegawa, Chiba (JP)

(73) Assignee: HASEGAWA CORPORATION, Yachiyo-Shi (JP)

( * ) Notice: Subject to any disclaimer, the term of this patent is extended or adjusted under 35 U.S.C. 154(b) by 462 days.

(21) Appl. No.: 13/503,149

(22) PCT Filed: Oct. 19, 2010

(86) PCT No.: PCT/JP2010/068310
§ 371 (c)(1),
(2), (4) Date: Apr. 20, 2012

(87) PCT Pub. No.: WO2011/049057
PCT Pub. Date: Apr. 28, 2011

(65) Prior Publication Data
US 2012/0206991 A1    Aug. 16, 2012

(30) Foreign Application Priority Data

Oct. 23, 2009  (JP) .................................. 2009-244064
May 20, 2010  (JP) ................................. 2010-116348

(51) Int. Cl.
*B01F 15/00* (2006.01)
*A47J 43/10* (2006.01)

(52) U.S. Cl.
CPC .................................. *A47J 43/1093* (2013.01)

(58) Field of Classification Search
CPC ................................................. A47J 43/1093
USPC ............................. 366/129, 342, 343; 416/69
See application file for complete search history.

(56) References Cited

U.S. PATENT DOCUMENTS

| 6,206,561 | B1 | 3/2001 | Hefti |
| 2004/0141407 | A1* | 7/2004 | Settele .......................... 366/129 |
| 2006/0185150 | A1* | 8/2006 | Holcomb et al. ............. 366/129 |

FOREIGN PATENT DOCUMENTS

| JP | 52-14059 U | 2/1977 |
| JP | 53-38821 | 4/1978 |

(Continued)

OTHER PUBLICATIONS

International Preliminary Report on Patentability issued May 18, 2012, in PCT International Application No. PCT/JP2010/068310.

(Continued)

*Primary Examiner* — Tony G Soohoo
*Assistant Examiner* — Anshu Bhatia
(74) *Attorney, Agent, or Firm* — Birch, Stewart, Kolasch & Birch, LLP

(57) ABSTRACT

Provided is a stirrer including a stirring section formed of a plurality of wire members and a handle section to which ends of the respective wire members are mounted, which is capable of preventing, with a simple configuration, liquid such as water from entering inside the handle section from gaps between a mounting part of the handle section and root parts of the respective wire members. The stirrer includes: a stirring section including a plurality of wire members; a fitting body including one or both of grooves and through-holes into which ends of the respective wire members are fitted; and a handle section including a mounting recess to which the fitting body is fitted and fixed under a state in which the ends of the respective wire members are fitted into the one or both of grooves and through-holes.

6 Claims, 51 Drawing Sheets

(56) References Cited

FOREIGN PATENT DOCUMENTS

| | | |
|---|---|---|
| JP | 5-51219 U | 7/1993 |
| JP | 6-13737 A | 1/1994 |
| JP | 6-14843 A | 1/1994 |
| JP | 7-289453 A | 11/1995 |
| JP | 7-313388 A | 12/1995 |
| JP | 2533159 Y2 | 1/1997 |
| JP | 11-18966 A | 1/1999 |
| JP | 3438883 B2 | 6/2003 |
| JP | 2003-525672 A | 9/2003 |
| JP | 3138259 U | 12/2007 |
| JP | 2008-110100 A | 5/2008 |
| JP | 2008-307243 A | 12/2008 |
| JP | 2009-11778 A | 1/2009 |
| WO | WO 01/65988 A2 | 9/2001 |

OTHER PUBLICATIONS

Machine English translation of JP 5-51219-U, Jul. 9, 1993.

Japanese Office Action dated Sep. 30, 2014, for Japanese Application No. 2010-116349.

* cited by examiner (a)

(b)

(a)

(b)

(a)

(b)

(c)

(a)

(b)

(c)

(a)

(b)

(a)

(b)

(a)

(b)

(c)

(a)

(b)

(c)

(a)

(b)

(a)

(b)

(c)

STIRRING DEVICE AND METHOD FOR MANUFACTURING SAME

TECHNICAL FIELD

The present invention relates to a stirrer including a stirring section formed by combining a plurality of wire members and a method of manufacturing the stirrer. In particular, the present invention relates to a stirrer which can be used when ingredients are stirred, for example, and a method of manufacturing the stirrer.

BACKGROUND ART

This type of stirrer is generally formed so that, in a stirring section thereof, a plurality of wire members made of a material such as a metal are bent into a folded shape and are arranged in a state in which the respective wire members are shifted from one another, and further, the respective wire members are mounted and fixed to one end of a handle having a bar-like shape and the like under a state in which both ends of the respective wire members are gathered. The stirrer including such a stirring section is heavily used as a so-called cooking stirrer, which is used when a stirring operation is performed, for example, mixing liquid such as water and various ingredients, or whipping.

Conventionally, there have been known various types of as the wire members forming the stirring section (for example, Patent Literatures 1 to 11).

CITATION LIST

Patent Literature

PTL 1: Japanese Utility Model Application Laid-open No. Hei 6-13737
PTL 2: Japanese Patent Application Laid-open No. Hei 7-289453
PTL 3: Japanese Patent Application Laid-open No. Hei 11-18966
PTL 4: Japanese Utility Model Registration No. 3138259
PTL 5: Japanese Patent No. 3438883
PTL 6: Japanese Patent Application Laid-open No. Hei 6-14843
PTL 7: Japanese Examined Patent Publication No. Sho 53-38821
PTL 8: Japanese Patent Translation Publication No. 2003-525672
PTL 9: Japanese Utility Model Registration No. 2533159
PTL 10: Japanese Patent Application Laid-open No. 2008-307243
PTL 11: Japanese Patent Application Laid-open No. 2009-11778

SUMMARY OF INVENTION

Technical Problem

However, in the conventional stirrer, the ends of the plurality of wire members forming the stirring section are arranged and fixed to a mounting part of the handle section under a state in which the ends are brought into contact with or provided closely to one another. Therefore, the stirrer as described above has such a complicated mounting structure that both the ends of the respective plurality of wire members are fixed in a closely gathered state to one end of the handle section, which has a relatively narrow size. Therefore, at an initial stage or at a stage after certain use, small gaps are liable to be generated at root parts of the respective wire members between the mounting part of the handle section and the roots.

As a result, in the conventional stirrer, in some cases, liquid such as water used during the stirring operation or liquid such as water used during cleaning operation enters (penetrates) inside the handle section from those gaps. The entered liquid cannot be easily discharged, which may cause corrosion or unexpected oozing of the liquid from the gaps during use. This is not preferred for hygienic reasons.

In addition, the conventional stirrer has, as described above, a complicated mounting structure in mounting the plurality of wire members with respect to the handle, and hence manufacturing (assembly) thereof also tends to be cumbersome. Further, in the stirrer, intervals between wire member parts, which extend from the root parts of the respective wire members in the stirring section, are narrow, and hence it is difficult to perform cleaning operation on inner sides of the root parts of the respective wire members and cleaning operation of the mounting part of the handle after the use thereof.

In view of the above, the present invention provides a stirrer including a stirring section formed of a plurality of wire members and a handle section to which ends of the respective wire members are mounted, which is mainly capable of preventing, with a simple configuration, liquid such as water from entering inside the handle section from gaps between a mounting part of the handle section and root parts of the respective wire members. Further, the present invention provides a method of manufacturing a stirrer, which enables easy and reliable manufacturing of the stirrer.

Solution to Problem

According to the invention (A1), provided is a stirrer including: a stirring section including a plurality of wire members formed into a folded shape and arranged in a state in which the plurality of wire members are shifted with respect to one another; a fitting body including one or both of grooves and through-holes into which ends of the respective plurality of wire members forming the stirring section are fitted; and a handle section including a mounting recess to which the fitting body is fitted and fixed under a state in which the ends of the respective plurality of wire members are fitted into the one or both of grooves and through-holes. Terminal ends of the ends of the respective plurality of wire members fitted into the one or both of grooves and through-holes of the fitting body are fixed and connected to a connection member. The fitting body or the mounting recess of the handle section includes a housing recess for housing the connection member. The fitting body is fitted and fixed to the mounting recess of the handle section and the connection member is housed in the housing recess.

In the stirrer according to the invention A1 described above, provided is a stirrer according to the invention (A2), in which the ends of the respective plurality of wire members are arranged at the fitting body in a state in which the ends form two opposing rows spaced with an interval.

The state in which the ends form two opposing rows is a state in which the ends of the respective plurality of wire members are arranged to form two rows. Specifically, the ends of the respective wire members are aligned in a continuous row shape such as a straight-line shape, a curved-line shape, and a zigzag shape. Further, the ends (groups) of the respective wire members aligned in such a row shape are allocated so as to form two opposing rows spaced with an interval. The interval is formed as an interval relatively larger than an interval between the ends of the adjacent wire members forming each row, and is necessary for enabling cleaning operation of the ends of the wire members and the like by inserting a cleaning tool such as a toothbrush or the hand or finger between the two-row wire member ends opposing with the interval therebetween. Further, the interval is preferred to have a value so that the separation distance between the closest wire members in the two rows is at least 10 mm or larger, preferably 12 mm or larger, more preferably 14 mm or larger. When the interval is 10 mm or larger, (apart provided with brush bristles of) the toothbrush can be inserted between the two-row wire member ends. When the interval is 12 mm or larger, it is possible to easily perform a cleaning operation of moving the inserted toothbrush so as to rotate between the two-row wire member ends. When the interval is 14 mm or larger, the hand or finger may be inserted between the two-row wire member ends.

Further, the interval between the ends of the adjacent wire members forming each row of the two opposing rows is, for example, preferably 0.5 mm or larger from the viewpoint that the cleaning tool such as a toothbrush can be used to perform cleaning between the adjacent wire members. Further, the interval between the ends of the adjacent wire members is more preferably in a range of about 1 to 2.5 mm, and further preferably set to a dimension approximated to the outer dimension of the wire member to be used. When the interval between the ends of the adjacent wire members in each row is set to such a dimension, cleaning of the inner side of the wire member part and cleaning of the mounting part of the handle section can be more easily performed. Further, the interval between the ends of the adjacent wire members in each row is set to, in a case where a relatively thin wire member is used as the wire member, a relatively narrow dimension, and in a case where a relatively thick wire member is used as the wire member, a relatively large dimension. In the case where the interval is set in such a condition, it is possible to realize a high density arrangement of the wire members while maintaining the mounting strength of the wire member, with respect to the fitting body or the mounting recess of the handle section, which is a limited region to which the wire members are to be mounted.

Meanwhile, the plurality of wire members when being arranged at the fitting body in a state in which the plurality of wire members form the two opposing rows are preferred to be configured so that one of both the ends of each of the wire members is arranged in one of the two opposing rows, another end thereof is arranged in another of the two rows, and both the ends of each of the wire members are arranged in a state in which both the ends are present at positions opposed to each other across a center between the two rows. When the plurality of wire members are configured as described above, compared to the case where both ends of part of the plurality of wire members are arranged in the same row, it is possible to form a stirring section in a state in which a part (loop) bent into a folded shape of one wire member crosses with respect to all of the other wire members. As a result, the movable directional property during the stirring operation of the stirring section is not particularly limited, and a stirrer having a high stirring effect can be obtained. In addition, the shape of the head portion of the stirring section can be formed into a form which looks substantially like a hemisphere.

Further, in the stirring section formed of the plurality of wire members arranged at the fitting body in a state in which the plurality of wire members form the two opposing rows, it is preferred that part or all of the plurality of wire members forming the stirring section be formed into a shape in which both the ends of the wire members are separately present at positions on opposite sides across a projection straight line of the part bent into the folded shape of the wire member. When the wire member formed into such a shape is applied, the stirring section can be formed so that the parts bent into the folded shape of the respective wire members are arranged so as to pass through a position above the center between the two rows and cross at substantially the same angle with one another, thereby obtaining a radially expanded state. As a result, even when the ends of the respective wire members are arranged in the two-row state, a form close to that of a stirring section of a conventional stirrer can be obtained to prevent uncomfortable feeling.

Further, in the stirring section formed of the plurality of wire members arranged at the fitting body in a state in which the plurality of wire members form the two opposing rows, it is preferred that the parts bent into the folded shape of the plurality of wire members forming the stirring section be arranged so as to pass through the position above the center between the two rows and cross at substantially the same angle with one another, thereby obtaining the radially expanded state. When the parts are arranged in such a state, for example, it is possible to stably obtain the stirring section in which the shape obtained by connecting parts positioned outermost of the parts bent into the folded shape of the respective wire members is a substantially regular polygon (or a circle). In other words, it is possible to prevent the parts bent into the folded shape of the plurality of wire members forming the stirring section from being one-sided. As a result, the shape of the stirring section may be similar to the shape of the stirring section of the conventional stirrer despite that the wire members forming the stirring section are arranged into a two-row state at the mounting recess of the handle section via the fitting body.

Further, the wire members provided at opposing ends of the two rows, of the four wire members in total which are present at both the ends of the respective rows forming the two rows are preferred to be shaped so as to, under a state in which the minimum interval of the two rows is maintained, linearly rise in a range from the upper surface of the fitting body to at least the outermost part when bent into the folded shape (part positioned outermost). When the wire member formed into such a shape is applied, a gap space may be provided in the stirring section, which has a shape linearly extending upright. As a result, the gap space can be used as an operation space for performing the cleaning operation with use of the cleaning tool, and the cleaning of the stirring section and the like is more easily performed.

In the stirrer according to the invention A1 or A2 described above, provided is a stirrer according to the invention (A3), in which the terminal ends of the ends of the respective plurality of wire members are welded to the connection member. The connection member contributes to, in the handle section, retain the respective wire members in a two opposing row state by connecting thereto the terminal ends of the wire members, and in the stirring section, arrange and retain the respective wire members, which are in the folded shape, in a state shifted from one another. Therefore, the connection member is preferred to be fixed so that, for example, the connection member having a shape following the shape of the respective rows (row-like continuous shape) is welded and integrated with the terminal ends of the wire members in each row, thereby firmly connecting the terminal ends of the wire members thereto.

In the stirrer according to any one of the inventions A1 to A3 described above, provided is a stirrer according to the invention (A4), in which the housing recess is formed into a shape corresponding to a shape of the connection member.

The corresponding shape is such a shape of the housing recess that is minimum necessary for housing the connection member (including the wire member part fixed thereto), and that substantially matches the shape of the connection member.

In the stirrer according to any one of the inventions A1 to A4 described above, provided is a stirrer according to according to the invention (A5), in which an adhesion layer is present at respective opposing parts among the mounting recess of the handle section, the fitting body, and the ends of the respective plurality of wire members. The adhesion layer is a layer formed of a material remaining after the adhesive is cured.

In the stirrer according to any one of the inventions A1 to A5 described above, provided is a stirrer according to the invention (A6), in which the fitting body includes a lid portion at an upper portion thereof, for covering an upper end of the mounting recess of the handle section.

According to the invention (B1), provided is a method of manufacturing a stirrer, the stirrer including: a stirring section including a plurality of wire members formed into a folded shape and arranged in a state in which the plurality of wire members are shifted with respect to one another; a fitting body including grooves into which ends of the respective plurality of wire members forming the stirring section are fitted; and a handle section including a mounting recess to which the fitting body is fitted and fixed under a state in which the ends of the respective plurality of wire members are fitted into the grooves, the method including: a first step of fixing and connecting terminal ends of the ends of the respective plurality of wire members to a connection member; a second step of fitting parts of the ends of the respective plurality of wire members other than the terminal ends connected to the connection member in the first step into the grooves of the fitting body, and housing the connection member in a housing recess formed in the fitting body, for housing the connection member; and a third step of fitting and fixing the fitting body having the ends of the respective plurality of wire members fitted thereinto in the second step to the mounting recess of the handle section.

Further, according to the invention (B2), provided is a method of manufacturing a stirrer, the stirrer including: a stirring section including a plurality of wire members formed into a folded shape and arranged in a state in which the plurality of wire members are shifted with respect to one another; a fitting body including grooves into which ends of the respective plurality of wire members forming the stirring section are fitted; and a handle section including a mounting recess to which the fitting body is fitted and fixed under a state in which the ends of the respective plurality of wire members are fitted into the grooves, the method including: a first step of fixing and connecting terminal ends of the ends of the respective plurality of wire members to a connection member; a second step of fitting parts of the ends of the respective plurality of wire members other than the terminal ends connected to the connection member in the first step into the grooves of the fitting body, and causing the connection member to be in a state protruded from the fitting body; and a third step of fitting and fixing the fitting body having the ends of the respective plurality of wire members fitted thereinto in the second step to the mounting recess of the handle section, and housing the connection member in a housing recess formed in the mounting recess of the handle section, for housing the connection member.

In the method of manufacturing a stirrer according to the invention B1 or B2 described above, provided is a method of manufacturing a stirrer according to the invention (B3), in which the grooves of the fitting body are formed in a state in which the grooves form two opposing rows spaced with an interval.

In the method of manufacturing a stirrer according to any one of the inventions B1 to B3 described above, provided is a method of manufacturing a stirrer according to the invention (B4), in which the first step includes welding the terminal ends of the ends of the respective plurality of wire members to the connection member.

In the method of manufacturing a stirrer according to any one of the inventions B1 to B4 described above, provided is a method of manufacturing a stirrer according to the invention (B5), in which the second step includes fitting the ends of the respective plurality of wire members into the grooves of the fitting body with an adhesive interposed therebetween, and in which the third step includes fitting the fitting body to the mounting recess of the handle section with the adhesive interposed therebetween.

According to the invention (C1), provided is a method of manufacturing a stirrer, the stirrer including: a stirring section including a plurality of wire members formed into a folded shape and arranged in a state in which the plurality of wire members are shifted with respect to one another; a fitting body including one or both of through-holes and grooves into which ends of the respective plurality of wire members forming the stirring section are fitted; and a handle section including a mounting recess to which the fitting body is fitted and fixed under a state in which the ends of the respective plurality of wire members are fitted into the one or both of through-holes and grooves, the method including: a first step of fitting the ends of the respective plurality of wire members into the one or both of through-holes and grooves of the fitting body, and sliding the fitting body and the respective plurality of wire members relatively to each other to cause terminal ends of the ends of the respective plurality of wire members to be in a state in which the ends are spaced apart and protruded from a bottom surface portion of the fitting body; a second step of fixing and connecting the terminal ends of the ends of the respective plurality of wire members, which are caused to be spaced apart and protruded in the first step, to a connection member; a third step of pulling back the fitting body toward the terminal ends of the ends of the respective plurality of wire members, and housing the connection member in a housing recess formed in the fitting body, for housing the connection member; and a fourth step of fitting and fixing the fitting body having the ends of the respective plurality of wire members fitted thereinto in the third step to the mounting recess of the handle section.

According to the invention (C2), provided is a method of manufacturing a stirrer, the stirrer including: a stirring section including a plurality of wire members formed into a folded shape and arranged in a state in which the plurality of wire members are shifted with respect to one another; a fitting body including one or both of through-holes and grooves into which ends of the respective plurality of wire members forming the stirring section are fitted; and a handle section including a mounting recess to which the fitting body is fitted and fixed under a state in which the ends of the respective plurality of wire members are fitted into the one or both of through-holes and grooves, the method including: a first step of fitting the ends of the respective plurality of wire members into the one or both of through-holes and grooves of the fitting body, and sliding the fitting body and the respective plurality of wire members relatively to each other to cause terminal ends of the ends of the respective plurality of wire members to be in a state in which the ends are spaced apart and protruded from a bottom surface portion of the fitting body; a second step of fixing and connecting the terminal ends of the ends of the respective plurality of wire members, which are caused to be spaced apart and protruded in the first step, to a connection member; a third step of pulling back the fitting body toward the terminal ends of the ends of the respective plurality of wire members, and causing the connection member to be in a state protruded from the fitting body; and a fourth step of fitting and fixing the fitting body having the ends of the respective plurality of wire members fitted thereinto in the third step to the mounting recess of the handle section, and housing the connection member in a housing recess formed in the mounting recess of the handle section, for housing the connection member.

In the method of manufacturing a stirrer according to the invention C1 or C2 described above, provided is a method of manufacturing a stirrer according to the invention (C3), in which the through-holes of the fitting body or the through-holes and grooves of the fitting body are formed in a state in which the through-holes of the fitting body or the through-holes and grooves of the fitting body form two opposing rows spaced with an interval.

In the method of manufacturing a stirrer according to any one of the inventions C1 to C3 described above, provided is a method of manufacturing a stirrer according to the invention (C4), in which the second step includes welding the terminal ends of the ends of the respective plurality of wire members to the connection member.

In the method of manufacturing a stirrer according to any one of the inventions C1 to C4 described above, provided is a method of manufacturing a stirrer according to the invention (C5), in which the third step includes fitting the ends of the respective plurality of wire members into the through-holes of the fitting body or the through-holes and grooves of the fitting body with an adhesive interposed therebetween, and in which the fourth step includes fitting the fitting body to the mounting recess of the handle section with the adhesive interposed therebetween.

Advantageous Effects of Invention

According to the stirrer of the invention A1 described above, the ends of the plurality of wire members forming the stirring section are fitted into the one or both of grooves and through-holes formed in the fitting body, and the terminal ends of the ends are fixed to the connection member. Further, the connection member is also housed in the housing recess formed in the fitting body or the mounting recess of the handle section. As described above, there is employed a mounting structure in which the fitting body having the ends of the respective wire members mounted thereto is fitted and fixed to the mounting recess of the handle section, and hence it is possible to prevent liquid such as water from entering inside the handle section (particularly, inside the mounting recess) from a gap between the handle section and the root parts of the respective wire members. Further, because the mounting structure in mounting the ends of the respective wire members to the handle section can be obtained with small number of components and its combination is simple, the mounting structure has a simple configuration, which makes it possible to facilitate the manufacturing of the stirrer. Further, when the fitting body including at least the through-holes is applied, the ends of the wire members are at least fitted into the through-holes formed in the fitting body. Therefore, the wire members are fitted into the fitting body without a gap. Thus, liquid penetration can be efficiently prevented and the wire members can be retained in a state with excellent durability.

The stirrer according to the invention A2 described above has a form in which the interval in a passing-through state is present between the two rows formed of the ends of the plurality of wire members. Therefore, a cleaning tool such as a toothbrush or the hand or finger may be inserted from a gap formed by the interval to clean the inner sides of parts (root parts) of the ends of the respective wire members mounted to the handle section (fitting body) and also the handle section (fitting body) present at the root parts of the ends. Thus, the cleaning operation thereof is facilitated. Further, even when liquid such as water is used in the cleaning operation, the liquid is prevented from entering inside the handle section, and hence the cleaning operation using liquid such as water can be reliably performed.

In the stirrer according to the invention A3 described above, the ends of the plurality of wire members are welded to the connection member to be firmly connected in a stable state. Therefore, even when the stirrer receives an external force at a stage of using the stirrer, a new gap is hardly generated between the handle section and the root parts of the respective wire members. With this, liquid such as water is more reliably prevented from entering inside the handle section from a gap between the handle section and the root parts of the respective wire members.

In the stirrer according to the invention A4 described above, the connection member including the ends of the wire members are housed in the housing recess in a state in which few (unnecessary) gaps are formed. Therefore, a firm mounting state of the ends of the wire members forming the stirring section with respect to the handle section can be obtained, and liquid such as water is effectively prevented from entering inside the mounting recess of the handle section from a gap between the fitting body and the ends of the wire members. Further, the gap at the mounting recess of the handle section can be reduced as much as possible to reduce the place for entrance of the liquid such as water.

In the stirrer according to the invention A5 described above, owing to the presence of the adhesion layer, the possibility that a gap is present between the handle section and the root parts of the respective wire members is reduced, and further the fear that a new gap is generated through reception of an external force at the stage of using the stirrer decreases. Therefore, liquid such as water is more reliably prevented from entering inside the handle section from a gap between the handle section and the root parts of the respective wire members. In addition, the possibility that a gap is present between the fitting body and the root parts of the respective wire members, between the fitting body and the mounting recess of the handle section, and between the connection member and the housing recess is reduced, and further the fear that a new gap is generated through reception of an external force at the stage of using the stirrer decreases. Therefore, liquid is more reliably prevented from entering inside the handle section from the respective gaps.

In the stirrer according to the invention A6 described above, the lid portion of the fitting body covers the upper end of the mounting recess of the handle section. Therefore, liquid such as water is prevented from entering inside the mounting recess of the handle section from a gap between the fitting body and the mounting recess of the handle section. Further, no unevenness such as a seam and gaps are formed due to the mounting of the fitting body to the upper surface of the handle section, and hence the cleaning of the upper surface of the handle section can be more easily performed to further maintain the cleanliness.

According to the method of manufacturing a stirrer of each of the inventions B1 and B2 described above, particularly the mounting operation of mounting the plurality of wire members forming the stirring section to the handle section, which can be most cumbersome, can be finished by merely performing the first step, the second step, and the third step, which are manufacturing steps of relatively simple operation contents. Therefore, the entire stirrer can be easily and reliably manufactured.

In the manufacturing method according to the invention B3 described above, only through the operation in the second step of fitting the ends of the respective wire members into the grooves formed in the fitting body, the ends can be easily arranged in a state in which the ends form the two opposing rows spaced with the interval.

In the manufacturing method according to the invention B4 described above, the connecting operation in the first step for the terminal ends of the ends of the respective wire members can be easily and firmly performed.

In the manufacturing method according to the invention B5 described above, a gap at a part having a fear of entrance of liquid such as water can be eliminated in advance.

According to the method of manufacturing a stirrer of each of the inventions C1 and C2 described above, particularly the mounting operation of mounting the plurality of wire members forming the stirring section to the handle section, which can be most cumbersome, can be finished by merely performing the first step, the second step, the third step, and the fourth step, which are manufacturing steps of relatively simple operation contents. Therefore, the entire stirrer can be easily and reliably manufactured. Further, the ends of the wire members are at least fitted into the through-holes formed in the fitting body. Therefore, it is possible to manufacture a stirrer in which the wire members are fitted into the fitting body without a gap, and which is capable of efficiently preventing liquid entrance and retaining the wire members in a state with excellent durability.

In the manufacturing method according to the invention C3 described above, the ends of the respective wire members can be easily arranged in a state in which the ends form the two opposing rows spaced with the interval.

In the manufacturing method according to the invention C4 described above, the connecting operation in the second step for the terminal ends of the ends of the respective wire members can be easily and firmly performed. Further, the ends of the respective wire members are retained by being fitted into the through-holes of the fitting body or the through-holes and grooves of the fitting body, and hence the welding operation with respect to the terminal ends of the ends is facilitated.

In the manufacturing method according to the invention C5 described above, a gap at a part having a fear of entrance of liquid such as water can be eliminated in advance.

BRIEF DESCRIPTION OF DRAWINGS

FIG. 17(b) is an explanatory view illustrating a state when viewed from a lateral side thereof.

FIG. 18 illustrate a state in manufacturing steps (second to fourth steps) of the stirrer according to the third embodiment, in which FIG. 18(a) is an explanatory view illustrating a state when viewed from a front side thereof and FIG. 18(b) is an explanatory view illustrating a state when viewed from a lateral side thereof.

FIG. 19 illustrate a fitting body of a stirrer according to a fourth embodiment, in which FIG. 19(a) is a top view thereof and FIG. 19(b) is a sectional view taken along the line B-B of FIG. 19(a).

FIG. 20 illustrate a handle section of the stirrer according to the fourth embodiment, in which FIG. 20(a) is a front view thereof and FIG. 20(b) is a lateral view thereof.

FIG. 21 illustrate a state in a manufacturing step (first step) of the stirrer according to the fourth embodiment, in which FIG. 21(a) is an explanatory view illustrating a state when viewed from a front side thereof and FIG. 21(b) is an explanatory view illustrating a state when viewed from a lateral side thereof.

FIG. 22 illustrate a state in manufacturing steps (second and third steps) of the stirrer according to the fourth embodiment, in which FIG. 22(a) is an explanatory view illustrating a state when viewed from a front side thereof and FIG. 22(b) is an explanatory view illustrating when viewed from a lateral side thereof.

FIG. 23 illustrate a state in a manufacturing step (fourth step) of the stirrer according to the fourth embodiment, in which FIG. 23(a) is an explanatory view illustrating a state when viewed from a front side thereof and FIG. 23(b) is an explanatory view illustrating when viewed from a lateral side thereof.

FIG. 24 illustrate a main part (mounting structure part of wire member end) of the stirrer according to the fourth embodiment, in which FIG. 24(a) is an explanatory view illustrating a state when viewed from a front side thereof, FIG. 24(b) is an explanatory view illustrating a state when viewed from a lateral side thereof, and FIG. 24(c) is a sectional view taken along the line C-C of FIG. 24(a).

FIG. 26 illustrate a first configuration example as another configuration example of the stirrer, in which FIG. 26(a) is a schematic sectional view illustrating a main part (handle section and mounting structure part of wire member end) of the stirrer and FIG. 26(b) is a sectional view taken along the line B-B of FIG. 26(a).

FIG. 27 illustrate an exploded state of a part of the stirrer of FIG. 26 (fitting body, filling member, and handle section), in which FIG. 27(a) is a schematic sectional view of the exploded respective parts and FIG. 27(b) is a top view of the respective parts.

FIG. 28 illustrate a second configuration example as another configuration example of the stirrer, in which FIG. 28(a) is a schematic sectional view illustrating a main part (handle section and mounting structure part of wire member end) of the stirrer and FIG. 28(b) is a sectional view taken along the line B-B of FIG. 28(a).

FIG. 29 illustrate an exploded state of a part of the stirrer of FIG. 28 (fitting body, filling member, and handle section), in which FIG. 29(a) is a schematic sectional view of the exploded respective parts and FIG. 29(b) is a top view of the respective parts.

FIG. 30 illustrate other configuration examples of the fitting body and the handle section, in which FIGS. 30(a) to 30(c) are top views and lateral views illustrating configurations of the fitting body and FIG. 30(d) is a front view and a lateral view illustrating a configuration of a mounting recess of the handle section.

FIG. 31 illustrate another configuration example of the fitting body, in which FIG. 31(a) is a lateral view illustrating a state in which wire member ends are mounted to the fitting body, FIG. 31(b) is a sectional view taken along the line B-B of FIG. 31(a), and FIG. 31(c) is a sectional view taken along the line C-C of FIG. 31(b).

FIG. 32 illustrate the fitting body of FIG. 31, in which FIG. 32(a) is a top view thereof, FIG. 32(b) is a lateral view thereof, and FIG. 32(c) is a sectional view taken along the line C-C of FIG. 32(a).

FIG. 33 illustrate a configuration in a case where a twist is imparted to (a part of) wire members forming a stirring section, in which FIG. 33(a) is a front view of the wire member, FIG. 33(b) is an explanatory view illustrating states of respective wire members forming the stirring section when viewed from an arrow C direction shown in FIG. 33(a), and FIG. 33(c) is an explanatory view illustrating a state of the wire member of FIG. 33(a) in a case where the twist is imparted, when viewed from a lateral side thereof.

FIG. 34 illustrate a stirrer obtained with use of the wire members of FIG. 33 to which the twist is imparted, in which FIG. 34(a) is a top view of the stirrer and FIG. 34(b) is a lateral view illustrating a state of the wire members of the stirrer when forming the stirring section (ends thereof are connected at connection plates).

FIG. 35 illustrate a configuration in a case where a twist is not imparted to the wire members forming the stirring section, in which FIG. 35(a) is a front view of the wire member, FIG. 35(b) is an explanatory view illustrating states of respective wire members forming the stirring section when viewed from an arrow E direction shown in FIG. 35(a), and FIG. 35(c) is an explanatory view illustrating a state of the wire member of FIG. 35(a) in a case where the twist is not imparted, when viewed from a lateral side thereof.

FIG. 36 illustrate a stirrer obtained with use of the wire members of FIG. 35 to which the twist is not imparted, in which FIG. 36(a) is a top view of the stirrer and FIG. 36(b) is a lateral view illustrating a state of the wire members of the stirrer when forming the stirring section.

FIG. 37 illustrate a fitting body of a stirrer according to a fifth embodiment, in which FIG. 37(a) is a top view thereof and FIG. 37(b) is a sectional view taken along the line B-B of FIG. 37(a).

FIG. 38 illustrate a handle section of the stirrer according to the fifth embodiment, in which FIG. 38(a) is a front view thereof and FIG. 38(b) is a lateral view thereof.

FIG. 39 illustrate a state in a manufacturing step (first step) of the stirrer according to the fifth embodiment, in which FIG. 39(a) is an explanatory view illustrating a state when viewed from a front side thereof and FIG. 39(b) is an explanatory view illustrating a state when viewed from a lateral side thereof.

FIG. 40 illustrate a state in a manufacturing step (second step) of the stirrer according to the fifth embodiment, in which FIG. 40(a) is an explanatory view illustrating a state when viewed from a front side thereof and FIG. 40(b) is an explanatory view illustrating when viewed from a lateral side thereof.

FIG. 41 illustrate a state in a manufacturing step (third step) of the stirrer according to the fifth embodiment, in which FIG. 41(a) is an explanatory view illustrating a state when viewed from a front side thereof and FIG. 41(b) is an explanatory view illustrating a state when viewed from a lateral side thereof.

FIG. 42 illustrate a main part (mounting structure part of wire member end) of the stirrer according to the fifth embodiment, in which FIG. 42(a) is an explanatory view illustrating a state when viewed from a front side thereof, FIG. 42(b) is an explanatory view illustrating a state when viewed from a lateral side thereof, and FIG. 42(c) is a sectional view taken along the line C-C of FIG. 42(a).

FIG. 43 illustrate a fitting body of a stirrer according to a sixth embodiment, in which FIG. 43(a) is a top view thereof and FIG. 43(b) is a sectional view taken along the line B-B of FIG. 43(a).

FIG. 44 illustrate a handle section of the stirrer according to the sixth embodiment, in which FIG. 44(a) is a front view thereof and FIG. 44(b) is a lateral view thereof.

FIG. 45 illustrate a state in a manufacturing step (first step) of the stirrer according to the sixth embodiment, in which FIG. 45(a) is an explanatory view illustrating a state when viewed from a front side thereof and FIG. 45(b) is an explanatory view illustrating a state when viewed from a lateral side thereof.

FIG. 46 illustrate a state in manufacturing steps (second and third steps) of the stirrer according to the sixth embodiment, in which FIG. 46(a) is an explanatory view illustrating a state when viewed from a front side thereof and FIG. 46(b) is an explanatory view illustrating a state of when viewed from a lateral side thereof.

FIG. 47 illustrate a state in a manufacturing step (fourth step) of the stirrer according to the sixth embodiment, in which FIG. 47(a) is an explanatory view illustrating a state when viewed from a front side thereof and FIG. 47(b) is an explanatory view illustrating a state when viewed from a lateral side thereof.

FIG. 48 illustrate a main part (mounting structure part of wire member end) of the stirrer according to the sixth embodiment, in which FIG. 48(a) is an explanatory view illustrating a state when viewed from a front side thereof, FIG. 48(b) is an explanatory view illustrating a state when viewed from a lateral side thereof, and FIG. 48(c) is a sectional view taken along the line C-C of FIG. 48(a).

FIG. 50 illustrate a state of the stirring section manufactured with use of the wire members of FIG. 49, in which FIG. 50(a) is an explanatory view illustrating a state when viewed from a front side thereof and FIG. 50(b) is an explanatory view illustrating a state when viewed from a lateral side thereof.

FIG. 52 illustrate a state of the stirring section manufactured with use of the wire members of FIG. 51, in which FIG. 52(a) is an explanatory view illustrating a state when viewed from a front side thereof and FIG. 52(b) is an explanatory view illustrating a state when viewed from a lateral side thereof.

FIG. 54 illustrate a state of the stirring section manufactured with use of the wire members of FIG. 53, in which FIG. 54(a) is an explanatory view illustrating a state when viewed from a front side thereof and FIG. 54(b) is an explanatory view illustrating a state when viewed from a lateral side thereof.

DESCRIPTION OF EMBODIMENTS

Hereinafter, modes for carrying out the present invention (hereinafter, simply referred to as "embodiments") are described with reference to the attached drawings.

First Embodiment

Figure 1:
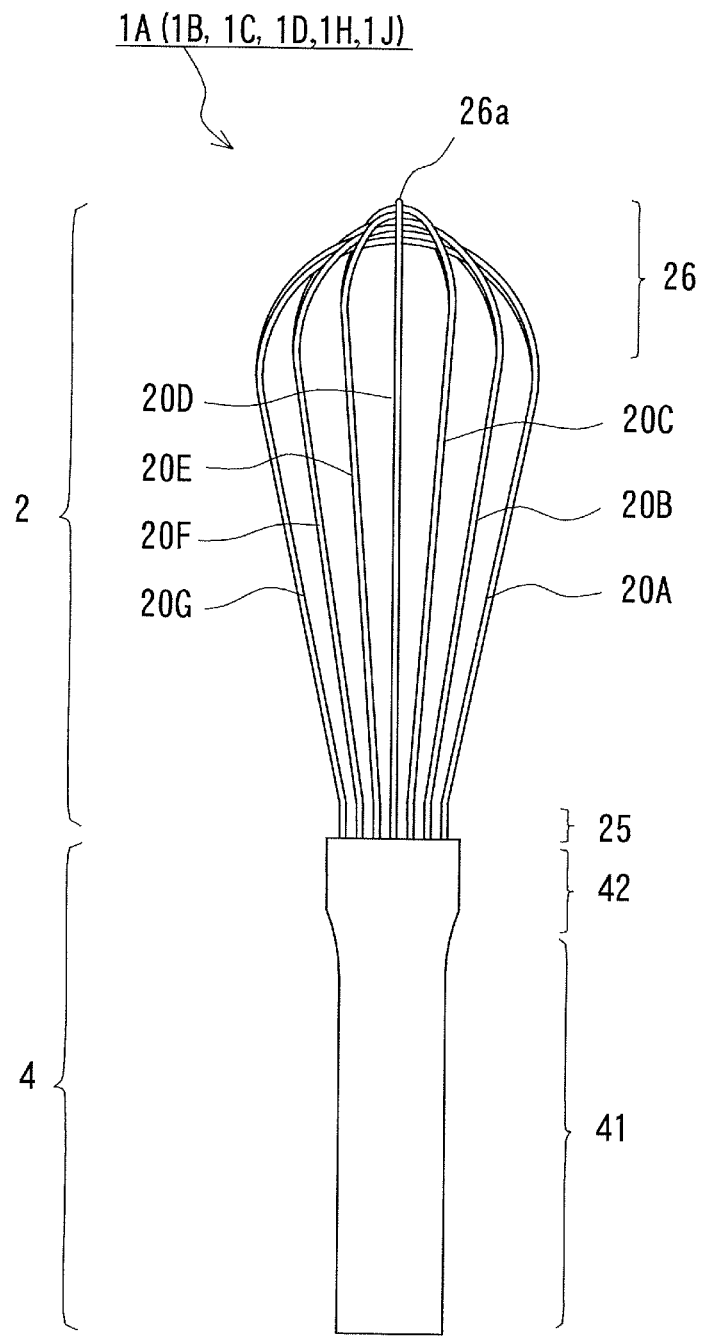
FIG. 1 is a front view of a stirrer according to a first embodiment (in addition, second and third embodiments).
Figure 2:
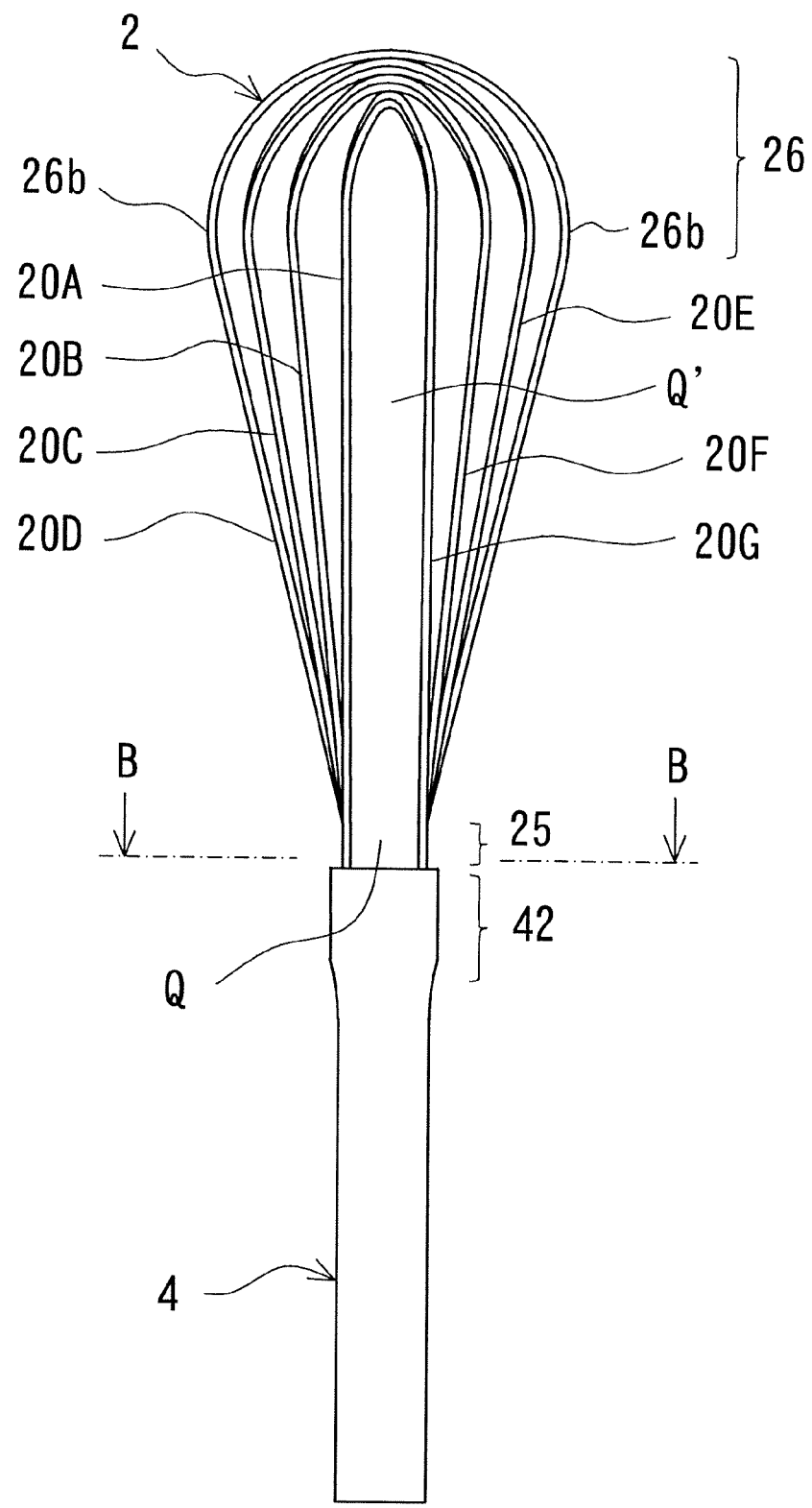
FIG. 2 is a lateral view of the stirrer of FIG. 1.
Figure 3:
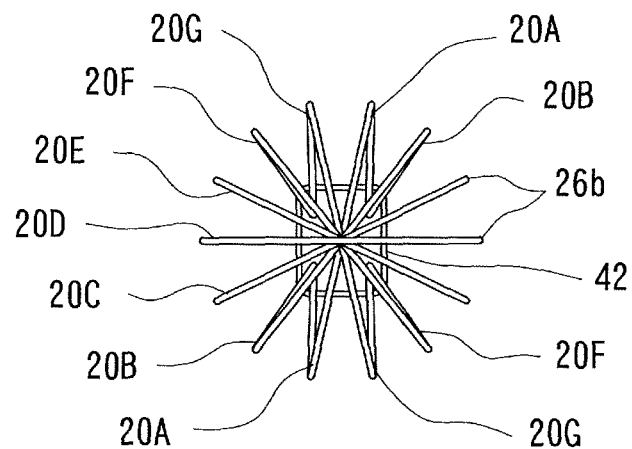
FIG. 3($a$) is a top view of FIG. 2, and FIG. 3($b$) is a sectional view taken along the line B-B of FIG. 2.
Figure 3:
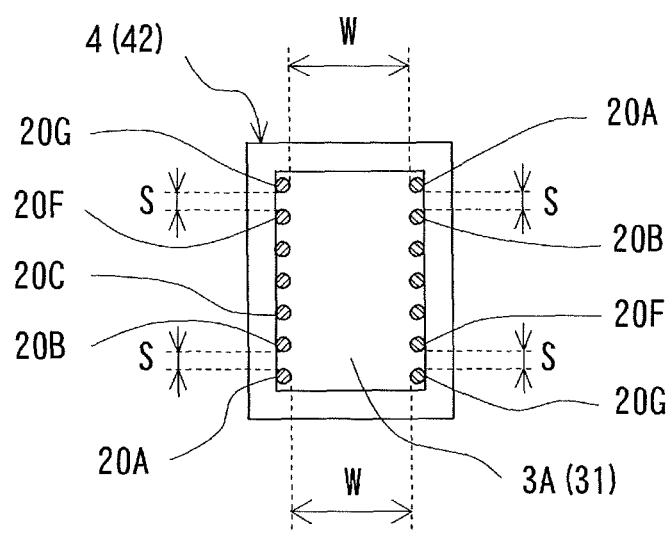
Figure 4:
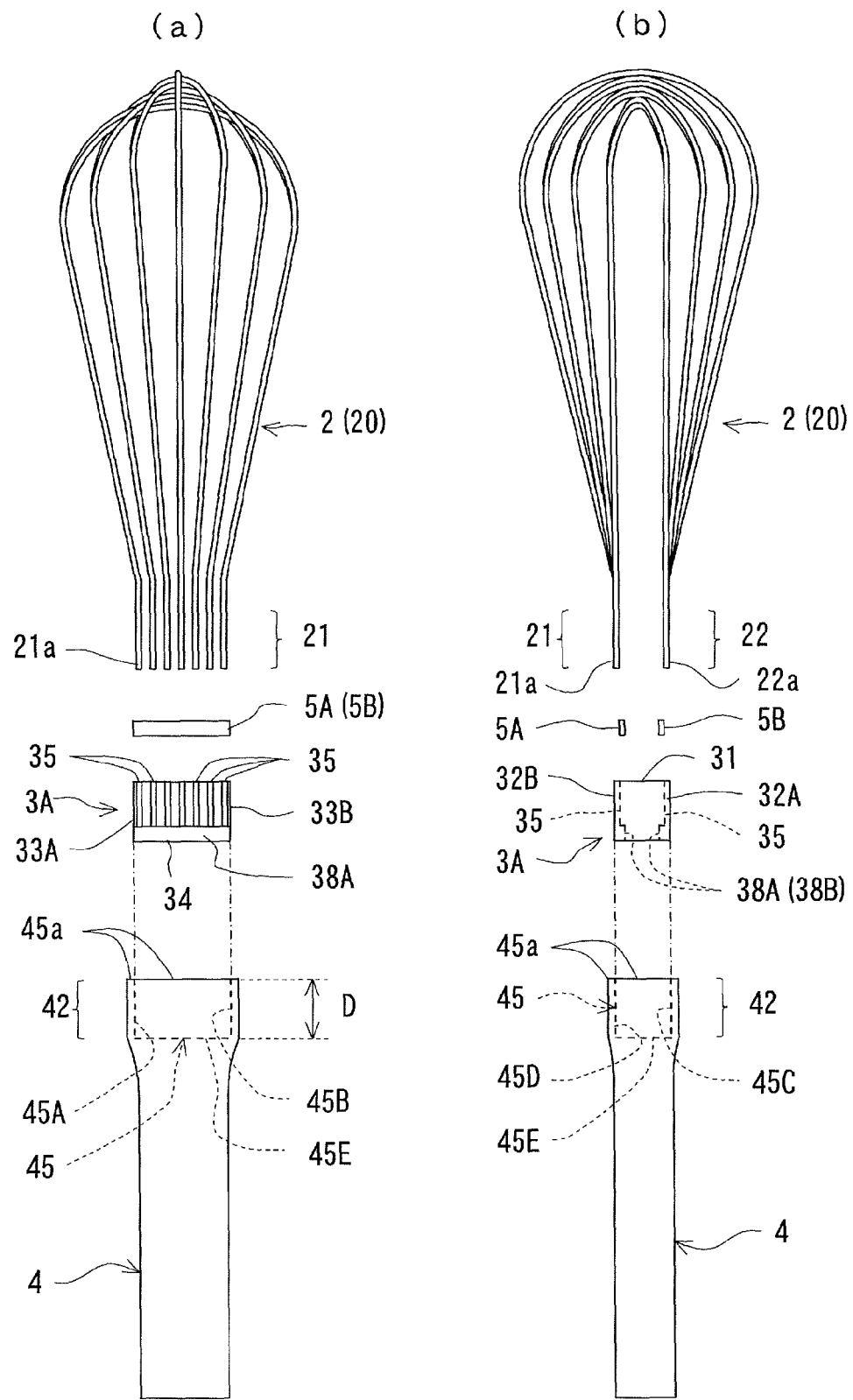
FIG. 4 illustrate an exploded state of the stirrer of FIG. 1, in which FIG. 4($a$) is an explanatory view illustrating a state when viewed from a front side thereof and FIG. 4($b$) is an explanatory view illustrating a state when viewed from a lateral side thereof.

FIGS. 1 to 4 illustrate a stirrer according to a first embodiment. FIG. 1 illustrates a state of the stirrer when viewed from a front side thereof, FIG. 2 illustrates a state of the stirrer when viewed from a right lateral side thereof, FIG. 3 illustrate a state of the stirrer of FIG. 2 when viewed from a top side thereof and a state of the stirrer when viewed at a cross section taken along the line B-B in the stirrer of FIG. 2, and FIG. 4 illustrate respective cases where an exploded state of the stirrer is viewed from two directions of a front side and a right lateral side thereof.

A stirrer 1A according to the first embodiment includes a stirring section 2 formed of a plurality of wire members 20, a fitting body 3A having grooves 35 formed therein, into which ends of the respective wire members 20 are fitted, and a handle section 4 including a mounting recess 45 in which the fitting body 3A is fitted and fixed under a state in which the ends of the respective wire members 20 are fitted into the grooves 35. The stirrer 1A is used as, for example, a cooking stirrer for stirring or whipping ingredients. The stirring section 2 is a section which is actually used in stirring operation, and the handle section 4 is a section of a handle which is held by the user of the stirrer 1A. Reference symbols 5A and 5B in FIG. 4 etc. represent a connection member formed of two connection plates for coupling terminal ends 21a and 22a of ends 21 and 22 of the respective wire members 20 thereto as described later.

The handle section 4 includes a bar-like handle main body 41 having a required length, and a mounting part 42 formed at one end of the handle main body 41, for mounting both the ends 21 and 22 of the wire members 20. The mounting part 42 includes a mounting recess (concave portion) 45 in a depressed state, which has a dimension and shape capable of fitting the fitting body 3A (in a state in which the ends of the wire members 20 are mounted to the fitting body 3A) thereinto.

In the first embodiment, as the handle section 4, there is used a handle section having a structure including the bar-shaped handle main body 41 having a shape of an elliptical column which has an elliptical cross section, the mounting part 42 which is obtained by extending the one end of the handle main body 41 having the elliptical column shape outward so that the end shape thereof is a substantially square shape, and the mounting recess 45 formed in the mounting part 42 as a recess formed of four inner wall surfaces and one bottom surface of a substantially square shape. As the handle main body 41, there is used a handle main body formed of a bar member having, for example, a length of 14 cm, and a cross section of the elliptical shape of 28 mm (long side)×23 mm (short side). The handle main body 41 does not have a hollow structure, and has a solid structure without a hollow space. The handle section 4 is formed into a required shape with use of a synthetic resin such as nylon, ABS, and polypropylene. Further, the handle section 4 including the mounting recess 45 is formed by, for example, a plastic injection molding method. Here, materials, dimensions, and the like of the handle main body 41 and the mounting part 42 can be arbitrarily selected depending on the intended use and conditions such as the usage environment, and are not particularly limited.

In the stirring section 2, the plurality of wire members 20 are bent into a folded shape and are arranged in a state in which the plurality of wire members 20 are caused to cross one another to be vertically shifted, so as to enable the stirring section 2 to exert a stirring action. Further, the stirring section 2 is formed by mounting and fixing both the ends 21 and 22 of the respective wire members 20 in a gathered state to the mounting part 42 of the handle section 4 via the fitting body 3A. Here, in principle, the ends 21 and 22 of the respective wire members 20 refer to an embedded part in a range which is not exposed to the outside when the ends 21 and 22 are mounted to the mounting part 42 of the handle section 4 via the fitting body 3A, but sometimes refer to a part in a range wider than above as an exception. The exception corresponds to, for example, end parts which are used for a sliding operation of the fitting body 3A performed when the end portions are fitted into the grooves 35 or through-holes 37 to be described later of the fitting body 3A, and which are provided linearly upright from an upper surface of the fitting body 3A. Further, all of the ends 21 and 22 are retained to have the same linear shape.

In the first embodiment, as the plurality of wire members 20, there are used seven stainless wire members 20A to 20G each having a diameter of 1.8 mm and a total length at the time of a linear shape of substantially 41 cm. Then, the seven stainless wire members 20A to 20G are mounted in the following states. The seven stainless wire members 20A to 20G are bent in a curved manner at substantially center portions thereof to obtain a folded shape, and then are arranged in a state in which the seven stainless wire members 20A to 20G are caused to cross one another at parts folded in a curved manner. Then, both the ends 21 and 22 (fourteen ends in total) substantially linearly extending downward in a vertical direction of the respective wire members 20 in the bent shape are fixed while being fitted to the mounting recess 45 of the mounting part 42 of the handle section 4 via the fitting body 3A. Here, when the wire members 20A to 20G are bent in a curved manner into a folded shape, for example, the dimension (height) from each of the ends 21 and 22 to a top portion 26a of a part (folded and bent part) 26 bent into the folded shape is substantially 16 cm.

Further, as for the mounting of both the ends 21 and 22 of the respective wire members 20A to 20G to the handle section 4, as illustrated in FIGS. 2 and 3(b), the respective ends 21 and 22 are arranged in an adjacent state while allocating the respective ends 21 and 22 into two opposing rows spaced with an interval. An interval W between the rows is set to have a larger dimension than an interval S between the ends 21 or 22 of the adjacent wire members in each row. The interval W is preferred to be set to have a dimension which enables at least (a cleaning operation part of) a cleaning tool such as an existing toothbrush, for cleaning, for example, the inner sides of the root parts of the respective wire members, to pass therethrough. In the first embodiment, the interval W is set within a range of 12 to 14 mm. The arrangement of the ends of the wire members 20A to 20G as described above is determined depending on the positions of the grooves 35 formed in the fitting body 3A as described later.

Figure 5:
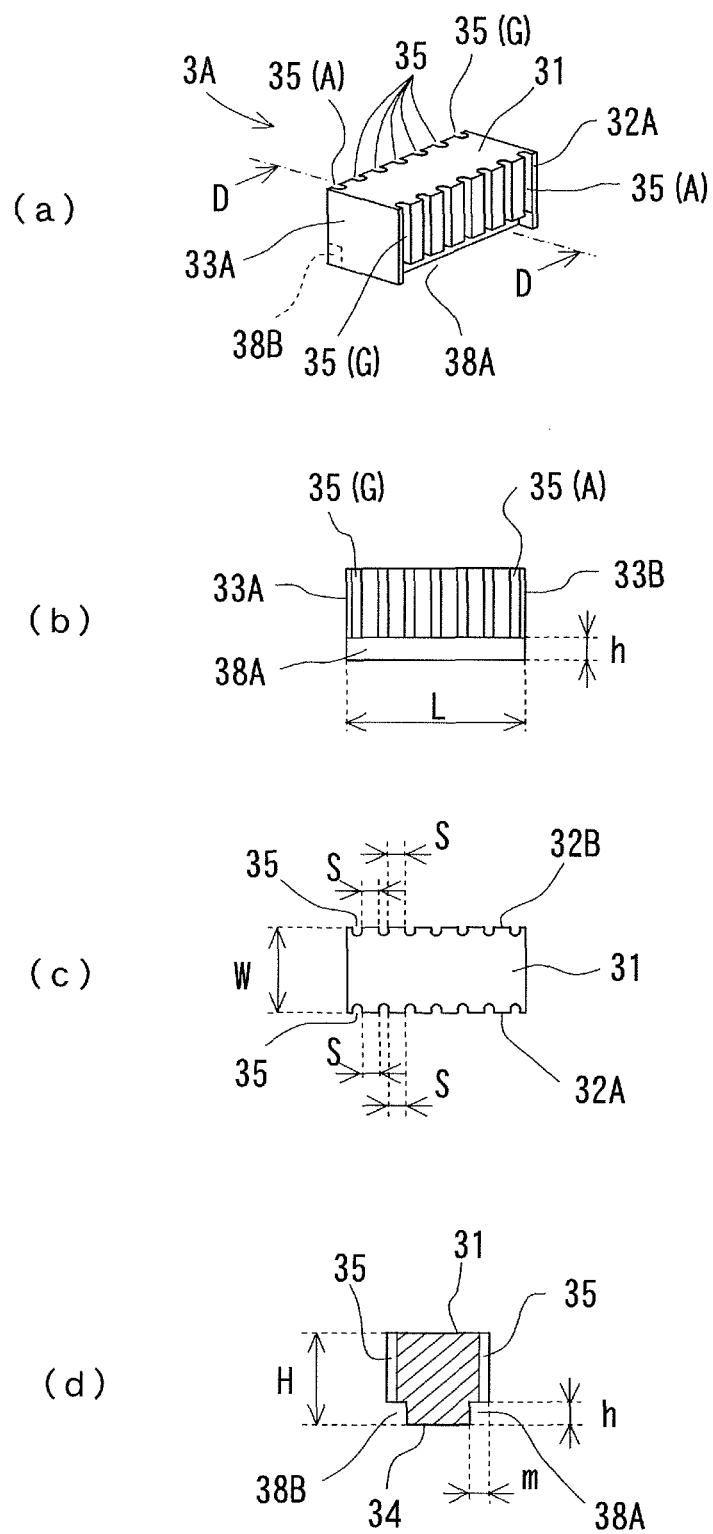
FIG. 5 illustrate a fitting body of the stirrer of FIG. 1, in which FIG. 5($a$) is a perspective view thereof, FIG. 5($b$) is a front view thereof, FIG. 5($c$) is a top view thereof, and FIG. 5($d$) is a sectional view taken along the line D-D of FIG. 5($a$).

As illustrated in FIGS. 4 and 5 etc., the fitting body 3A has a substantially rectangular parallelepiped shape in which the entirety thereof is long to one side. The plurality of grooves 35 linearly extending in the vertical direction are formed in two long-side lateral surface portions 32A and 32B continuous from long sides of an upper surface 31 of the fitting body 3A. Further, at corner portions of the fitting body 3A at which a bottom surface portion 34 and the two long-side lateral surface portions 32A and 32B intersect each other, housing recesses (space portions) 38A and 38B for housing the connection plates 5A and 5B are formed, respectively. The housing recesses (space portions) 38A and 38B are formed into a form in which the corner portions of the fitting body 3A are inwardly recessed (depressed).

First, as illustrated in FIG. 4, the fitting body 3A is set to have, in a substantially rectangular parallelepiped appearance shape thereof, a length (long-side distance between short-side lateral surface portions 33A and 33B) and a width (short-side distance between long-side lateral surface portions 32A and 32B), which have slightly smaller values than a dimension of the mounting recess 45 of the handle section 4 in a longitudinal direction (long-side distance of lateral wall surfaces 45A and 45B opposing in the longitudinal direction) and a dimension thereof in a short-side direction (short-side distance of lateral wall surfaces 45C and 45D opposing in the short-side direction), respectively. Further, the fitting body 3A is set to have, in the substantially rectangular parallelepiped appearance shape thereof, a height dimension H (FIG. 5(d): distance between the upper surface 31 and the bottom surface portion 34), which is substantially the same as a dimension of a depth D of the mounting recess 45 of the handle section 4 (distance between an upper end 45a and a bottom surface portion 45E).

With this, the fitting body 3A can be stored under a state in which the entirety thereof is fitted into the mounting recess 45 of the handle section 4 (except the housing recesses 38A and 38B) almost without a gap (see FIGS. 9(a) and 9(b)). Further, the fitting body 3A is stored under a state in which the upper surface 31 thereof has the same height as the upper end 45a of the mounting recess 45 and is not protruded (see FIGS. 9(a) and 9(b)).

The plurality of grooves 35 are provided for temporarily fixing parts of the ends 21 and 22 of the respective wire members 20 by fitting the respective ends 21 and 22 thereinto, and have a groove depth and a groove width with the same dimension as the outer diameter of the wire member 20. Of those, the width of an entrance portion of the groove 35 is set to have, from the viewpoint of retaining the ends 21 and 22 of the wire members inside the grooves 35 to maintain a watertight state, a smaller dimension than the dimension of the outer diameter of the wire member 20. Further, it is preferred that the depth of the groove 35 be set to have a dimension which enables the ends 21 and 22 of the wire members to be embedded inside the grooves when the ends 21 and 22 of the wire members are fitted into the grooves 35 and not protrude from the long-side lateral surface portions 32A and 32B.

Further, the grooves 35 are formed so as to be arranged in a state which meets the arrangement conditions of both the ends 21 and 22 of the respective wire members 20A to 20G. The grooves 35 in this embodiment are formed in each of the long-side lateral surface portions 32A and 32B of the fitting body 3A in a required number and with the same interval S. Further, all of the grooves 35 of the respective long-side lateral surface portions 32A and 32B are formed in an opposing state spaced with the interval W. The length of the groove 35 can be set as appropriate, but in the first embodiment, substantially corresponds to a length in the vertical direction of a part of the long-side lateral surface portions 32A and 32B which remains after removing the housing recesses 38A and 38B.

Each of the housing recesses 38A and 38B is a space for housing the connection plates 5A and 5B, which serve as a connection member for coupling the terminal ends 21a and 22a of the ends 21 and 22 of the respective wire members 20, together with the terminal ends 21a and 22a of the wire member ends so that the connection plates 5A and 5B are prevented from being protruded from the lateral surface portions and the bottom surface portion of the fitting body 3A. Lateral and vertical dimensions L and h of each of the housing recesses 38A and 38B are set to have, as illustrated in FIG. 5(b), substantially the same values as lateral (length) and vertical (height) dimensions of the connection plates 5A and 5B in a state in which the ends 21 and 22 of the wire members are connected thereto. Further, a dimension m of a depth of the housing recesses 38A and 38B (dimension in a direction parallel to the upper surface 31 of the fitting body 3A) is set to have substantially the same value as the total dimension of the thickness of the connection plates 5A and 5B and the outer diameter of the ends 21 and 22 of the wire member.

The fitting body 3A as described above is formed with use of a material of a synthetic resin such as nylon, ABS, and polypropylene, a metal, or other such materials. Further, the grooves 35 and the housing recesses 38A and 38B of the fitting body 3A are formed by, for example, a plastic injection molding method or a metal machining method.

The connection plates 5A and 5B are members for connecting the terminal ends 21a and 22a of the ends 21 and 22 of the respective wire members 20 by, for example, performing fixing at the inner parts thereof. The terminal ends 21a and 22a are parts of the ends in a range to be fixed to the connection plates 5A and 5B. Further, the inner parts of the terminal ends 21a and 22a refer to parts of the respective wire members 20 which are to be positioned, when the ends 21 and 22 are mounted to the handle section 4 via the fitting body 3A, not in an outer direction of the handle section 4 but in an inner direction facing a center portion of the handle section 4.

In the first embodiment, because the ends 21 and 22 of the plurality of wire members 20 are arranged in a two-row linearly allocated state as described above, the respective terminal ends 21a and 22a of the ends 21 and 22 present in the respective rows are allocated and fixed to any one of the two connection plates 5A and 5B having a flat plate (linear) shape following the above-mentioned two linear rows. Further, in the connection plates 5A and 5B of the first embodiment, the terminal ends 21a and 22a of the stainless wire members 20 are fixed thereto by welding, and hence a welding plate made of a similar material as stainless or the like is applied as the connection plates 5A and 5B. The connection plates 5A and 5B are fixed to the inner parts of the ends 21 and 22 of the wire members by a fixing method such as spot welding and argon welding. The size of the connection plates 5A and 5B is preferred to be as small as possible in dimension, and is only required to have a dimension of a degree capable of exerting a strength which enables firm fixing under a state in which the terminal ends 21a and 22a of the ends 21 and 22 of the respective wire members 20 are retained at the same interval as the arrangement interval at the time of mounting the wire members 20. In the first embodiment, as the connection plates 5A and 5B, for example, a plate-like (square bar) material having a dimension in lateral side (length), vertical side (height), and thickness of 23×3×2 mm is applied.

Next, manufacturing (assembly) steps of the stirrer 1A are described.

Figure 6:
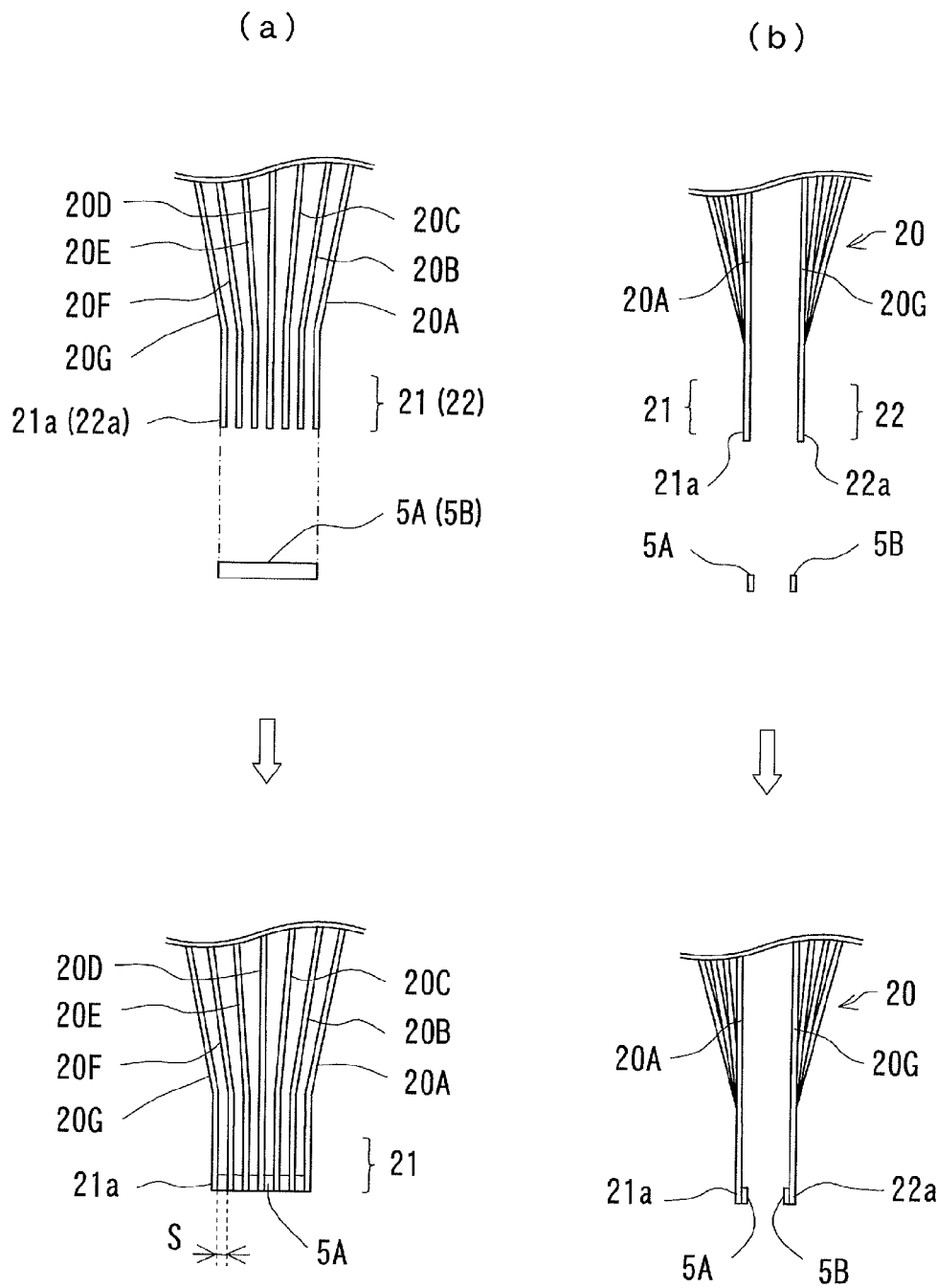
FIG. 6 illustrate a state in a manufacturing step (first step) of the stirrer according to the first embodiment, in which FIG. 6($a$) is an explanatory view illustrating a state when viewed from a front side thereof and FIG. 6($b$) is an explanatory view illustrating a state when viewed from a lateral side thereof.

First, as illustrated in an upper part of FIG. 6, the respective terminal ends 21a and 22a of the ends 21 and 22 of the respective wire members 20 (A to G) after being subjected to a process of bending into a folded shape as described above are welded and fixed to the connection plates 5A and 5B arranged on the inner sides of the wire member ends 21 and 22 (first step).

At this time, the respective wire members 20 (A to G) obtained after the bending process are retained in a state in which the respective wire members 20 having the total length adjusted in advance are fixed by a jig for locking the folded and bent part 26 of the stirring section 2 and the ends 21 and 22 of the respective wire members 20 so that the respective terminal ends 21a and 22a of the ends 21 and 22 are aligned with leading ends thereof arranged at intervals S on straight lines, and the welding is performed under this fixed state. The welding may be performed by, for example, spot welding (resistance welding). FIG. 6(a) illustrates a state when viewed from a front side, and FIG. 6(b) illustrates a state when viewed from a right lateral side. Note that, of the subsequent drawings, drawings in which segmentary drawings of (a) and (b) are correspondingly illustrated in a horizontal state represent a similar state.

With this first step, as illustrated in a lower part of FIG. 6, the respective terminal ends 21a and 22a of the ends 21 and 22 of the respective wire members 20 (A to G) are fixed and connected to the connection plates 5A and 5B under a state in which the ends 21 and 22 are arranged in a two-row linear state and the intervals between the adjacent terminal ends are retained at the same dimension as the interval S (FIG. 3(b)) for the arrangement of the wire member ends. At this time, the respective wire members 20(A to G) are arranged in a state in which the folded parts 26 are caused to cross one another to be vertically shifted at upper portions thereof, thereby simultaneously forming a head portion shape of the stirring section 2. Further, at this time, the dimension and shape of the connection plates 5A and 5B are maintained to substantially the same dimension as that before the welding.

Figure 7:
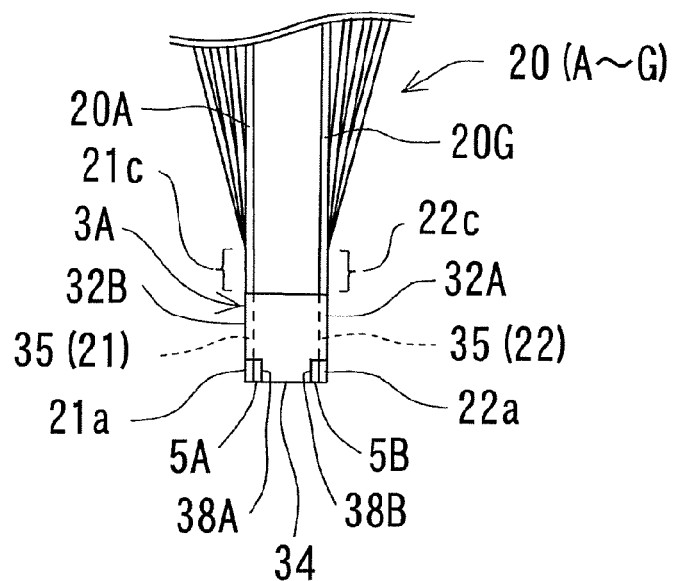
FIG. 7 illustrate a state in a manufacturing step (second step) of the stirrer according to the first embodiment, in which FIG. 7($a$) is an explanatory view illustrating a state when viewed from a lateral side thereof and FIG. 7($b$) is an explanatory view illustrating a state of another configuration example when viewed from a lateral side thereof.
Figure 7:
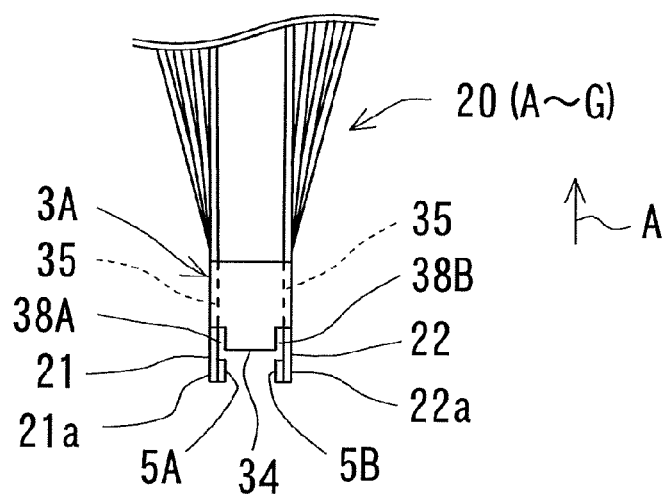

Subsequently, as illustrated in FIG. 7(a), linear end parts of the ends 21 and 22 of the respective wire members 20 (A to G) other than the terminal ends 21a and 22a connected to the connection plates 5A and 5B in the first step are fitted into the grooves 35 of the fitting body 3A, and the connection plates 5A and 5B are housed in the housing recesses 38A and 38B of the fitting body 3A together with the terminal ends 21a and 22a of the respective wire members 20 (A to G) connected to the connection plates 5A and 5B (second step).

In this case, the ends 21 and 22 of the respective wire members 20 (A to G) are connected at the terminal ends 21a and 22a thereof to the connection plates 5A and 5B, and hence, for example, the ends 21 and the ends 22 of the respective wire members connected to the respective connection plates 5A and 5B are pushed outward a little to obtain a state with an interval. Then, under a state in which the fitting body 3A is inserted between the ends 21 and 22 which are pushed outward to obtain the state with an interval, the operation of fitting the ends 21 and 22 of the respective wire members 20 into the respective grooves 35 and the operation of causing the terminal ends 21a and 22a thereof and the connection plates 5A and 5B to be housed (enter) into the housing recesses 38A and 38B can be performed while finely adjusting the positions of the respective parts. The operation of fitting the ends 21 and 22 of the respective wire members 20 into the respective grooves 35 can be performed by strongly pushing the ends 21 and 22 toward the inside of the respective grooves 35.

With this second step, as illustrated in FIG. 7(a), the ends 21 and 22 of the respective wire members 20 (A to G) are fitted into the respective grooves 35 of the fitting body 3A, and further, the terminal ends 21a and 22a of the ends 21 and 22 of the respective wire members 20 and the connection plates 5A and 5B are housed in the housing recesses 38A and 38B of the fitting body 3A. At this time, the ends 21 and 22 of the respective wire members 20 (A to G), which have been fitted into the respective grooves 35 of the fitting body 3A, are not protruded outward from the surfaces of the long-side lateral surface portions 32A and 32B of the fitting body 3A, in which the grooves 35 are formed. Further, the terminal ends 21a and 22a of the ends 21 and 22 of the respective wire members 20 and the connection plates 5A and 5B, which are housed in the housing recesses 38A and 38B, are both not protruded outward from the surfaces of both of the bottom surface portion 34 and the long-side lateral surface portions 32A and 32B of the fitting body 3A.

This second step can be carried out by, for example, performing an operation which goes through two stages as follows.

That is, as illustrated in FIG. 7(b), first, there is performed an operation (first stage operation) of fitting the ends 21 and 22 of the respective wire members 20 (A to G) (including the linear end parts above the end parts in a range to be embedded at the time of mounting) into the grooves 35 of the fitting body 3A so that the terminal ends 21a and 22a connected to the connection plates 5A and 5B are protruded from the bottom surface portion 34 of the fitting body 3A. At this stage, the terminal ends 21a and 22a of the ends 21 and 22 of the respective wire members 20 and the connection plates 5A and 5B are both not housed in the housing recesses 38A and 38B. After that, for example, under a state in which the fitting body 3A is positionally fixed, there is performed an operation (second stage operation) of pulling upward all of the wire members 20 (A to G) so as to slide in a direction along the length direction of the groove 35 (direction indicated by an arrow A). With this, the terminal ends 21a and 22a of the ends 21 and 22 of the respective wire members 20 and the connection plates 5A and 5B are both housed in the housing recesses 38A and 38B (FIG. 7(a)). Note that, the second stage operation may be changed into an operation of, under a state in which all of the wire members 20 (A to G) are positionally fixed, pulling downward the fitting body 3A so as to slide in a direction along the length direction of the groove 35 (direction opposite to the direction indicated by the arrow A).

Here, the linear ends 21 and 22 of the respective wire members 20 (A to G) are required to be shaped so as to include, in order to enable relative sliding operation between the fitting body 3 and the wire member ends 21 and 22 in the above-mentioned second step, in addition to the end parts in the range to be embedded into the fitting body 3 side when being mounted to (the grooves 35 and the like of) the fitting body 3, sliding operation parts 21c and 22c (FIG. 7(a) etc.) which linearly extend further above from the upper surface 31 of the fitting body 3 to enable the above-mentioned sliding operation. The sliding operation parts 21c and 22c also serve as root parts 25 to be described later.

Further, the length of the sliding operation parts 21c and 22c is preferred to be set within a range of substantially 20% to 120% of the entire height dimension (H) of the fitting body 3. When the dimension is smaller than 20% thereof, it becomes difficult to easily and reliably perform the sliding operation of the fitting body 3, for performing fitting of the wire members 20 into the grooves 35 and housing into the housing recesses 38A and 38B, and a welding operation of the connection plates 5A and 5B (to be described later). In contrast, when the dimension exceeds 120% thereof, the linear part of the root part 25 of the wire member 20 is too long, which may reduce the structural strength for supporting the stirring section 2. Therefore, there is a fear that the wire member is easily deformed. Further, when the sliding operation parts 21c and 22c of the wire members 20 (A to G) are set to have different lengths, the above-mentioned length of the sliding operation parts 21c and 22c may be adapted to the length of the wire member 20 of the respective wire members 20 (A to G), which has the sliding operation parts 21c and 22c in the minimum length.

Figure 8:
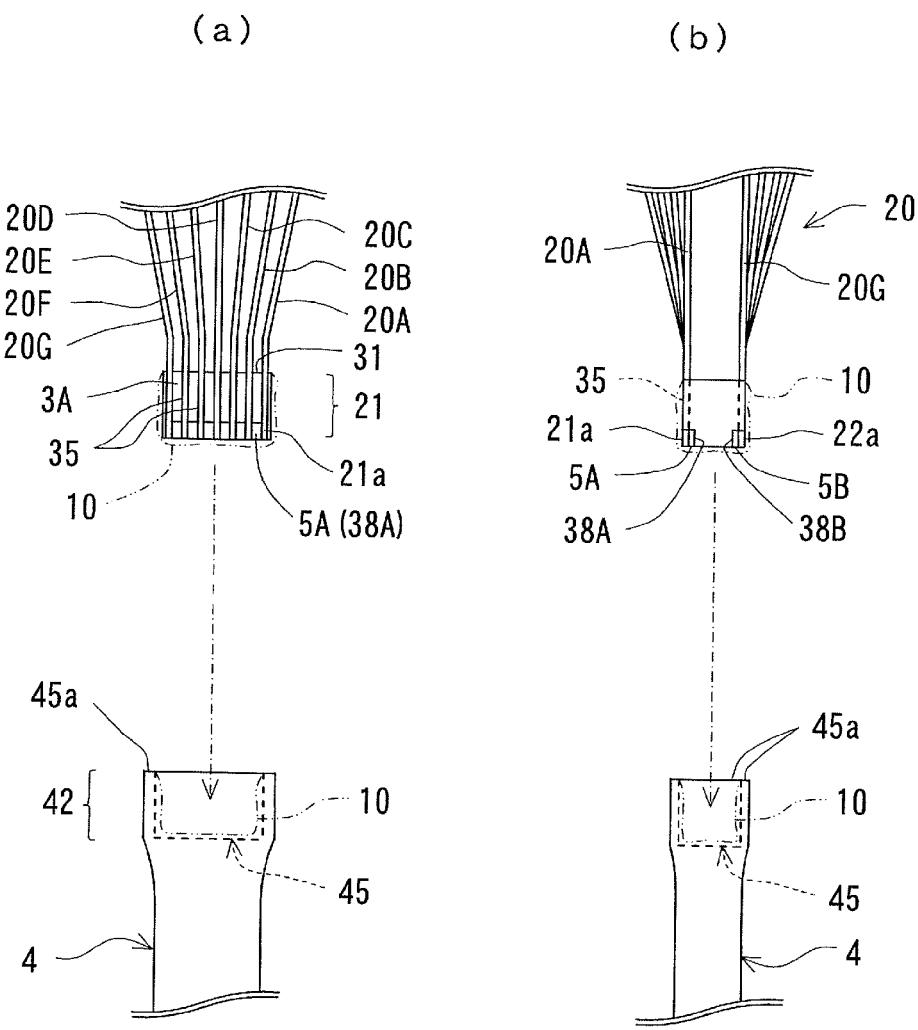
FIG. 8 illustrate a state in a manufacturing step (third step) of the stirrer according to the first embodiment, in which FIG. 8($a$) is an explanatory view illustrating a state when viewed from a front side thereof and FIG. 8($b$) is an explanatory view illustrating when viewed from a lateral side thereof.

Subsequently, as illustrated in FIG. 8, the fitting body 3A in a state in which, in the second step, the ends 21 and 22 of the respective wire members 20 (A to G) are fitted into the grooves 35 and a state in which the terminal ends 21a and 22a of the respective wire member ends 21 and 22 and the connection plates 5A and 5B are housed in the housing recesses 38A and 38B, is fitted and fixed to the mounting recess 45 of the mounting part 42 of the handle section 4 (third step).

In this case, as indicated by the two-dot chain line of FIG. 8, an adhesive 10 is applied to the four lateral surface portions 32A, 32B, 33A, and 33B and the bottom surface portion 34 of the fitting body 3A. Further, the adhesive 10 is also applied to the inner wall surface and the bottom surface of the mounting recess 45. Then, the operation of fitting the fitting body 3A to the mounting recess 45 is performed. In this case, when the fitting body 3A is fitted and inserted into the mounting recess 45 under a state in which the adhesive 10 is interposed therebetween, the redundant adhesive 10 leaks outside. Accordingly, the redundant adhesive is wiped off at the end. As the adhesive 10, for example, adhesives such as an epoxy-based adhesive, an urethane-based adhesive, and an unsaturated polyester-based adhesive may be used.

Figure 9:
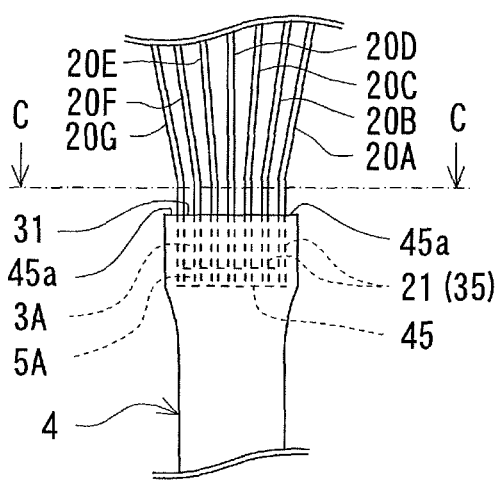
FIG. 9 illustrate a main part (mounting structure part of wire member end) of the stirrer according to the first embodiment, in which FIG. 9($a$) is an explanatory view illustrating a state when viewed from a front side thereof, FIG. 9($b$) is an explanatory view illustrating a state when viewed from a lateral side thereof, and FIG. 9($c$) is a sectional view taken along the line C-C of FIG. 9($a$).
Figure 9:
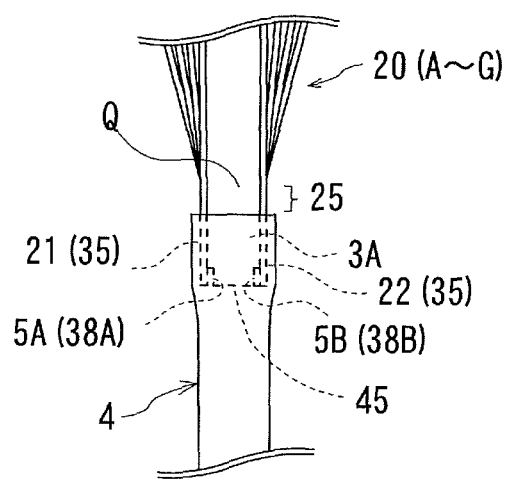
Figure 9:
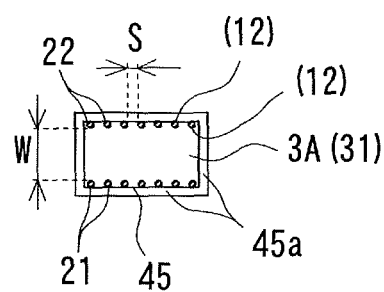

In this third step, when the adhesive 10 is cured to completely fix the fitting body 3A to the mounting recess 45, as illustrated in FIG. 9, the ends 21 and 22 of the respective wire members 20 (A to G) forming the stirring section 2 are mounted to (the mounting recess 45 of) the mounting part 42 of the handle section 4 via the fitting body 3A. With the above-mentioned steps, the stirrer 1A having the appearance as illustrated in FIGS. 1 to 3 is completed and obtained.

At this time, respective opposing parts among the mounting recess 45 of the handle section 4, the fitting body 3A, and the ends 21 and 22 of the respective wire members 20 (A to G) (bonding portions with respect to the opposed surfaces and parts) are adhered with the adhesive 10 to be firmly fixed to one another. Further, at those respective parts, an adhesion layer 12 made of the cured and remaining adhesive 10 is present (FIG. 9(c)), and thus there are no unnecessary gaps at those respective parts. As a result, the fitting body 3A is firmly fixed to the mounting recess 45 without a gap. Further, the ends 21 and 22 of the respective wire members 20 (A to G) are also firmly fixed to the directly opposing parts of (the grooves 35 of) the fitting body 3A and the mounting recess 45 without a gap. With this, parts serving as respective parts among the fitting body 3A, the ends 21 and 22 of the respective wire members, and the connection plates 5 are excellent in water-tightness.

Further, at this time, also respective opposing parts among the mounting recess 45 of the handle section 4, the housing recesses 38A and 38B of the fitting body 3A, the terminal ends 21a and 22a of the ends 21 and 22 of the respective wire members 20 (A to G), and the connection plates 5 are adhered with the adhesive 10 to be firmly fixed to one another. In addition, there are no unnecessary gaps therebetween, and thus excellent water-tightness can be obtained.

Further, the ends 21 and 22 of the respective wire members 20 (A to G) are mounted to the mounting part 42 of the handle section 4 under a state in which the ends 21 and 22 are arranged in accordance with the desired arrangement condition as described above via the grooves 35 of the fitting body 3A. That is, as illustrated in FIG. 9(c), the respective wire member ends 21 and 22 are allocated to and fitted into the respective grooves 35 of the fitting body 3A having the above-mentioned configuration, and thus are allocated so as to form two opposing rows spaced at the interval W. Further, (the ends of) the wire members in each row are arranged in an adjacent state at intervals S(<W).

Then, the stirrer 1A configured as described above is used as follows. When, for example, the ingredients to be cooked are mixed and stirred with liquid such as water, (the handle main body 41 of) the handle section 4 is held by a user. Then, mainly the folded and bent parts 26 of the wire members 20 of the stirring section 2 are put into the ingredients or the like, which are a stirring object contained in a container, and in this state, the stirrer 1A is moved in an arbitrary mixing direction. With this, the stirring object such as ingredients is stirred by receiving the stirring action of the stirring section 2.

Further, the stirring section 2 or the like of the stirrer 1A is cleaned after being used.

At this time, in the stirrer 1A, as illustrated in FIGS. 2 and 9(b), the ends 21 and 22 of the wire members 20 (A to G) forming the stirring section 2 are allocated with respect to the mounting part 42 of the handle section 4 so as to form two linear rows, and are linearly aligned in each row at equal intervals S while being arranged in an adjacent state. Further, in the stirrer 1A, the ends 21 and 22 of the wire members 20 in the respective rows are arranged in an opposing state while being spaced with the interval W having the dimension as described above. With this, on the inner side of the root parts 25 of the wire member ends, which first extend apart from the upper end of the mounting part 42 of the handle section 4, a space Q linearly extending in a pass-through state is present.

As illustrated in FIG. 2 etc., the above-mentioned space Q is present as a gap space Q' having a linear upright shape while maintaining the interval W between the two rows in a range from the upper end of the mounting part 42 of the handle section 4 up to at least an outermost part (26b) of the respective wire members 20 (A to G) forming the stirring section 2 when being bent into the folded shape. Further, the gap space Q' linearly extending long is formed by setting the wire members 20 (A and G) of the wire members 20 (A to G) forming the two linear rows, the wire members 20 (A and G) being arranged at both ends of the respective rows to face to each other, to be shaped so as to rise substantially parallel to each other while maintaining the interval W between the two rows. The gap space Q' is similarly present in the stirring section 2 of the stirrer 1 according to respective embodiments to be described later.

Therefore, when the root parts 25 of the respective wire members 20 (A to G) in the stirring section 2 are to be cleaned, the cleaning operation can be performed under a state in which a cleaning operation part (for example, a part provided with brush bristles) of a cleaning tool such as a toothbrush is inserted into the space Q. Particularly, when the interval W is set to 14 mm, the cleaning operation can be performed under a state in which the hand or finger is inserted into the space Q, and thus the cleaning operation can be performed by inserting a cleaning tool such as an existing nylon scrub brush and sponge scrub brush.

As a result, the inner parts of the root parts 25 of the respective wire members 20 (A to G) can be easily cleaned, and further, an end surface portion of the mounting part 42 of the handle section 4 (actually, the upper end 45a of the mounting recess 45 and the upper surface 31 of the fitting body 3A) can be easily cleaned. Further, in the stirring section 2, the above-mentioned gap space Q' shaped so as to linearly rise and extend is present, and hence the gap space Q' can be used as an operation space for performing the cleaning operation with use of the cleaning tool over the entire inner part of the stirring section 2. Thus, the cleaning operation can be more easily performed. In the stirring section 2, not only the cleaning of the inner parts of the root parts 25 of the respective wire members 20, but cleaning of the entire inner parts of the respective wire members 20 containing the gap space Q' can be easily performed.

Further, in the stirrer 1A, both in the stirring operation and the cleaning operation after the use, liquid such as water used in the operation does not pass between the upper end 45a of the mounting recess 45 of the handle section 4 and the root parts 25 of the respective wire members 20 (A to G) or between the root parts 25 and the grooves 35 of the fitting body 3A to enter inside the mounting recess 45 of the handle section. Particularly, even in a situation in which the stirring section 2 and the mounting part 42 of the handle section 4 are immersed into water for a long period of time, moisture does not pass between the grooves 35 of the fitting body 3A to penetrate therein by the capillary action along the ends 21 and 22 serving as the root parts 25 of the respective wire members 20 (A to G). Further, such a stirrer 1A which is excellent in so-called water-tightness can be manufactured relatively easily merely through the steps (first to third steps) with simple operation contents as described above.

Further, even when the stirrer 1A receives, at the time of the stirring operation or the cleaning operation, an external force such as deformation or vibration of the wire member 20 of the stirring section 2, unnecessary gaps are not generated between the grooves 35 of the fitting body 3A and the root parts 25 of the respective wire members 20, and further, an unnecessary gap is not generated between the upper end 45a of the mounting recess 45 of the handle section 4 and the fitting body 3A. In addition, the respective wire members 20 are not pulled out from the grooves 35 of the fitting body 3A.

Note that, in the third step, the operation is performed after the adhesive 10 is applied to both of the fitting body 3A and the mounting recess 45, but the operation may be performed after the adhesive 10 is applied to only one of the fitting body 3A and the mounting recess 45.

Second Embodiment

Figure 10:
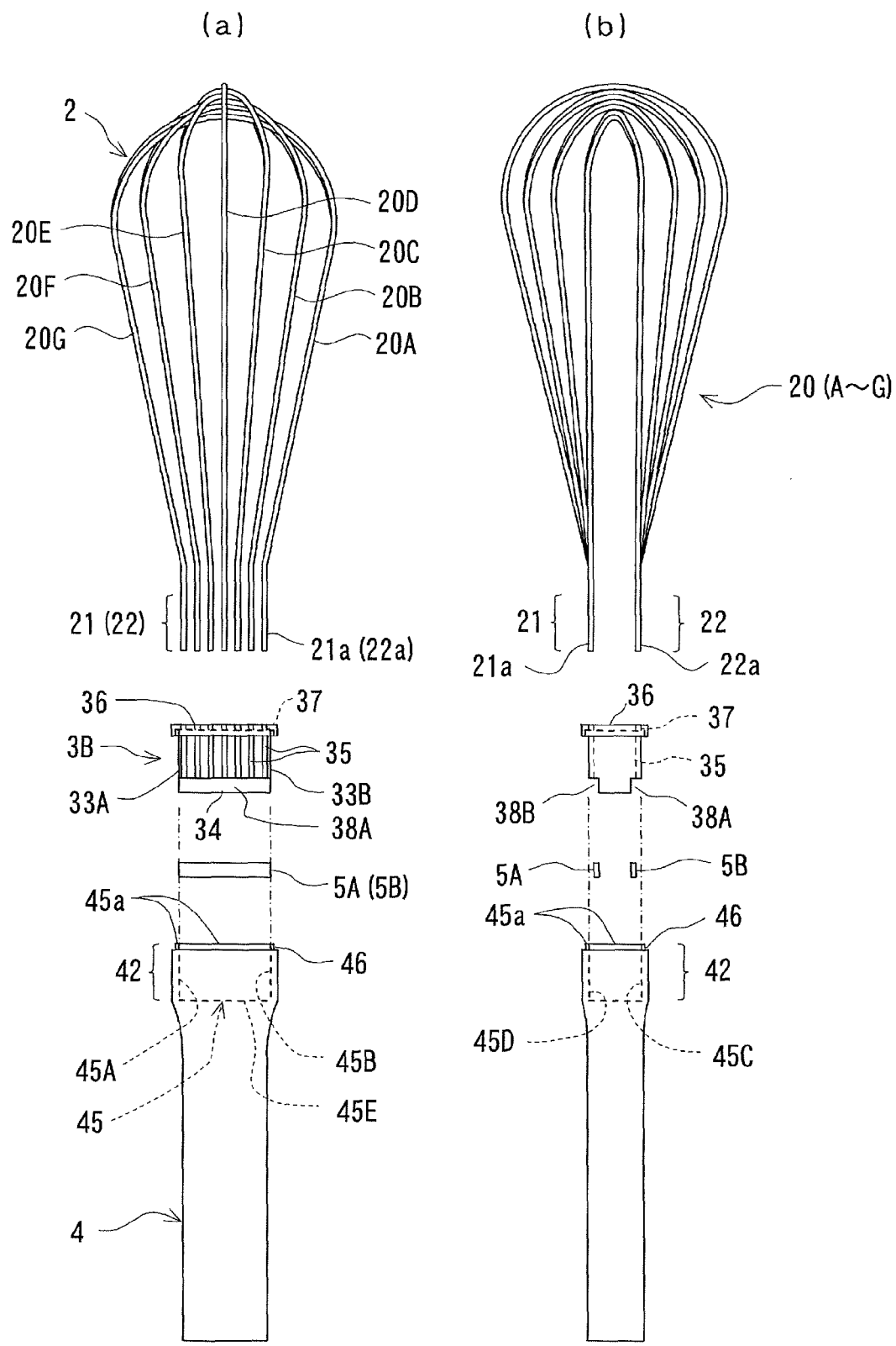
FIG. 10 illustrate an exploded state of a stirrer according to a second embodiment, in which FIG. 10($a$) is an explanatory view illustrating a state when viewed from a front side thereof and FIG. 10($b$) is an explanatory view illustrating a state when viewed from a lateral side thereof.
Figure 11:
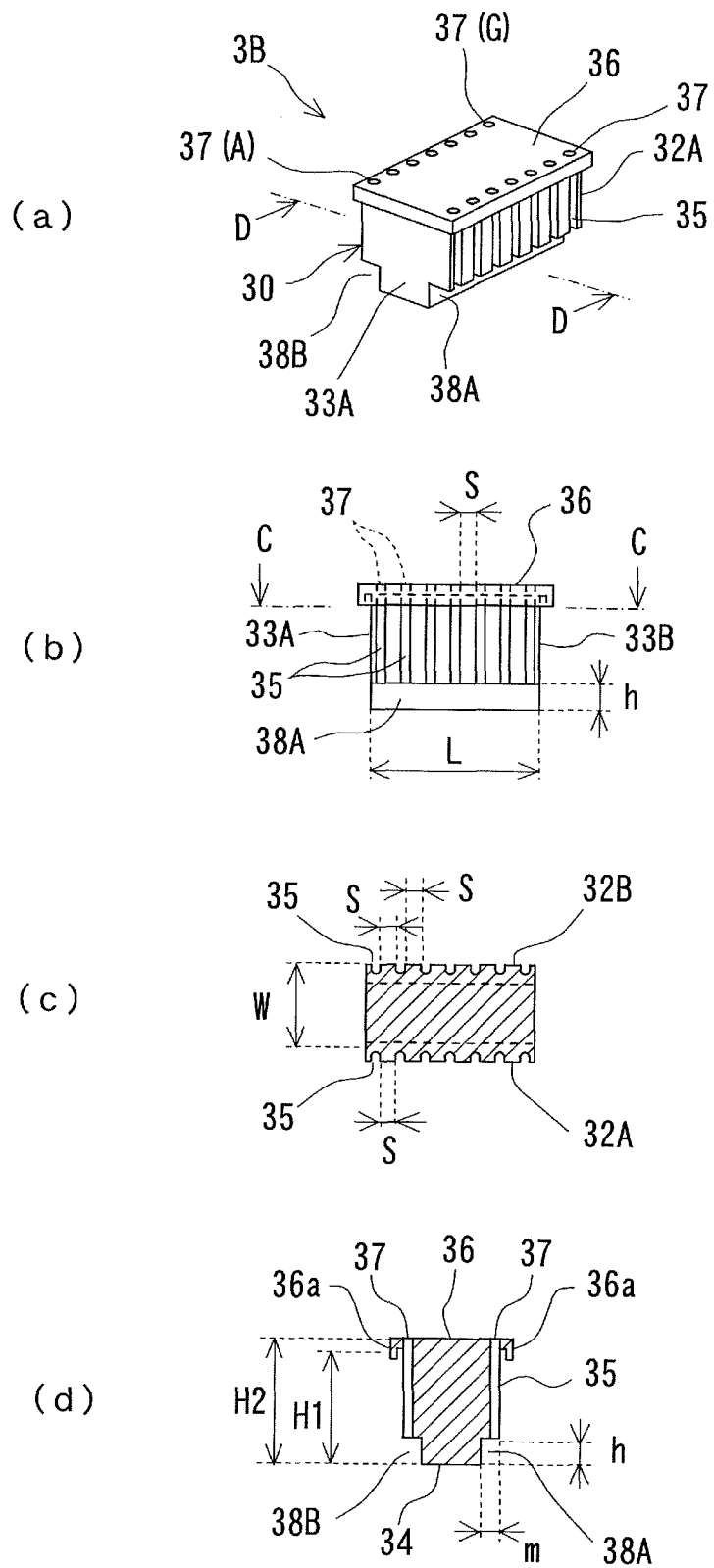
FIG. 11 illustrate a fitting body of the stirrer of FIG. 10, in which FIG. 11($a$) is a perspective view thereof, FIG. 11($b$) is a front view thereof, FIG. 11($c$) is a sectional view taken along the line C-C of FIG. 11($b$), and FIG. 11($d$) is a sectional view taken along the line D-D of FIG. 11($a$).

FIGS. 10 and 11 illustrate a stirrer according to a second embodiment of the present invention. FIG. 10 illustrate respective cases where an exploded state of the stirrer is viewed from two directions of a front side and a right lateral side thereof. FIG. 11 illustrate respective states of a fitting body forming the stirrer when viewed from various observing points.

A stirrer 1B according to the second embodiment applies, as the fitting body, a fitting body 3B which has a different configuration. Other configurations are the same as those of the stirrer 1A of the first embodiment described above. Therefore, the entire appearance of the stirrer 1B is the same as the stirrer 1A illustrated in FIGS. 1 and 2 except for the fitting body 3B.

That is, in the fitting body 3B, as illustrated in FIGS. 10 and 11 etc., a lid portion 36 for covering the upper end 45a of the mounting recess of the handle section 4 is additionally provided to the upper surface (31) of the fitting body 3A of the first embodiment. In the lid portion 36, a plurality of through-holes 37 continuous to the plurality of grooves 35, respectively, are formed. That is, the fitting body 3B has a mode in which, in addition to the grooves 35, the through-holes 37 are simultaneously formed. Also in the fitting body 3B, configuration parts other than the above-mentioned changed part have the common configuration as those of the fitting body 3A of the first embodiment.

The lid portion 36 has such an appearance that a flat plate having an area larger than the upper surface (31) of the fitting body 3A of the first embodiment is placed on the upper surface to be integrally formed therewith. However, actually, the lid portion 36 is formed integrally with a main body portion 30 other than the lid portion 36 (part in which the grooves 35 and the housing recesses 38A and 38B are formed).

Further, the lid portion 36 may be formed merely to protrude from the main body portion 30 of the fitting body 3B by a dimension overlapping the upper end 45a of the mounting recess 45 of the handle section 4 around the entire circumference of the main body portion 30, but in the second embodiment, from the viewpoint of further enhancing the adhesiveness with respect to the upper end 45a of the mounting recess, a fitting frame portion 36a is formed (FIG. 11(d)), which is to be fitted into a cutout portion 46 formed in an outer circumference portion of the upper end 45a of the mounting recess 45 of the handle section 4 to be bonded thereto so as to surround from outside. A height H1 of a recess on an inner side of the fitting frame portion 36a from the bottom surface portion 34 is set to have substantially the same dimension as the depth D (FIG. 4(a)) of the mounting recess 45. Further, a height H2 of the lid portion 36 from the bottom surface portion 34 is a dimension obtained by adding the thickness of the lid portion 36 to the depth D of the mounting recess 45.

The through-hole 37 has the same hole shape and hole diameter as the cross-sectional shape and the outer diameter of each of the ends 21 and 22 of the wire member 20. Further, from the viewpoint of enhancing the adhesiveness between the through-hole 37 and each of the ends 21 and 22 of the wire member 20, the hole diameter of the through-hole 37 may be set to have a dimension slightly smaller than the outer diameter of each of the wire member ends 21 and 22 as long as the ends 21 and 22 are insertable.

Next, steps of manufacturing the stirrer 1B applying the fitting body 3B are described.

Figure 12:
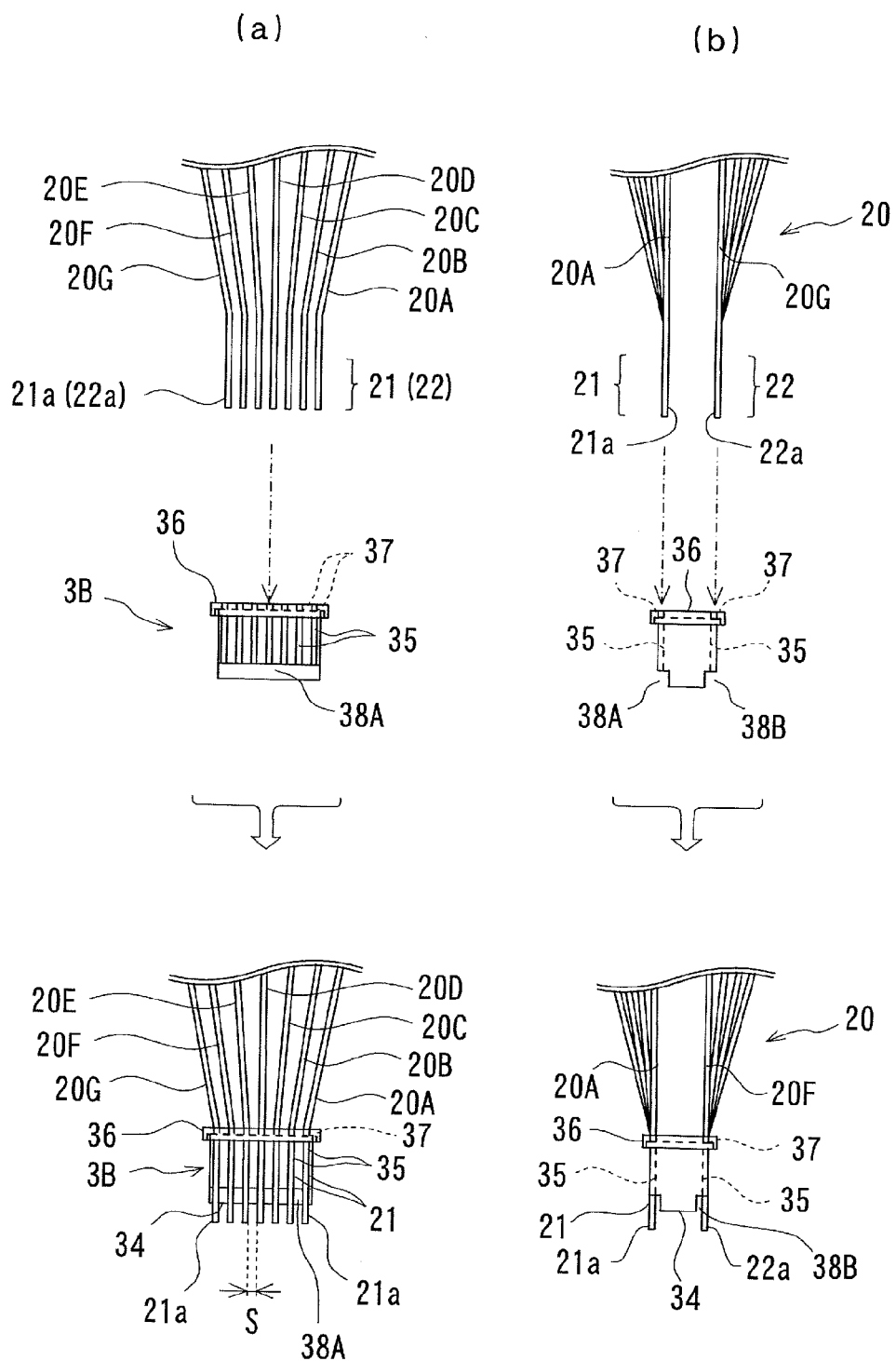
FIG. 12 illustrate a state in a manufacturing step (first step) of the stirrer according to the second embodiment, in which FIG. 12($a$) is an explanatory view illustrating a state when viewed from a front side thereof and FIG. 12($b$) is an explanatory view illustrating a state when viewed from a lateral side thereof.

First, as illustrated in FIG. 12, the ends 21 and 22 of the respective wire members 20 (A to G) after being subjected to a process of bending into a folded shape are fitted into the through-holes 37 and the grooves 35 of the fitting body 3B, and then the fitting body 3B is caused to slide in the direction of the folded and bent part 26 of the wire member 20, to thereby cause the terminal ends 21a and 22a of the respective wire member ends 21 and 22 to be spaced apart and protruded from the bottom surface portion 34 of the fitting body 3B (first step).

At this time, the ends 21 and 22 of the respective wire members 20 are caused to pass through the respective through-holes 37 of the fitting body 3B, and then fitted into the grooves 35 continuous to the respective through-holes 37. Further, the terminal ends 21a and 22a of the ends 21 and 22 of the respective wire members 20 are protruded from the grooves 35 of the fitting body 3B, and then are spaced apart and protruded from the bottom surface portion 34 of the fitting body 3B (lower part of FIG. 12). The protruding amount of the terminal ends 21a and 22a from the fitting body 3B at this time is only required to be an amount to be spaced apart and protruded from the fitting body 3B within a range capable of performing a connecting operation in a second step to be described later without any problem, and capable of preventing occurrence of damage of the fitting body 3B due to the connecting operation (for example, caused by sparks and the like generated during a welding operation or the like). The protruding amount differs depending on the height dimension of the connection plate 5 and the contents of the connecting operation, but, for example, it is preferred to ensure at least a value about half (50%) of the entire height H2 of the fitting body 3B. Therefore, the ends 21 and 22 of the respective wire members 20 are formed to include, in addition to the part in a range to be embedded at the time of mounting to the fitting body 3B as described above, a part (sliding operation parts 21c and 22c) formed so as to linearly extend further above the upper surface (lid portion 36) of the fitting body 3B. Further, the terminal ends 21a and 22a, which are protruded from the fitting body 3B, of the ends 21 and 22 of the adjacent wire members are substantially maintained at intervals S by the retention of the grooves 35.

Subsequently, as illustrated in an upper part of FIG. 13, the terminal ends 21a and 22a of the ends 21 and 22 of the respective wire members 20 (A to G) in a state spaced apart and protruded from the fitting body 3B are welded and fixed to the connection plates 5A and 5B arranged on the inner side thereof (second step).

Figure 13:
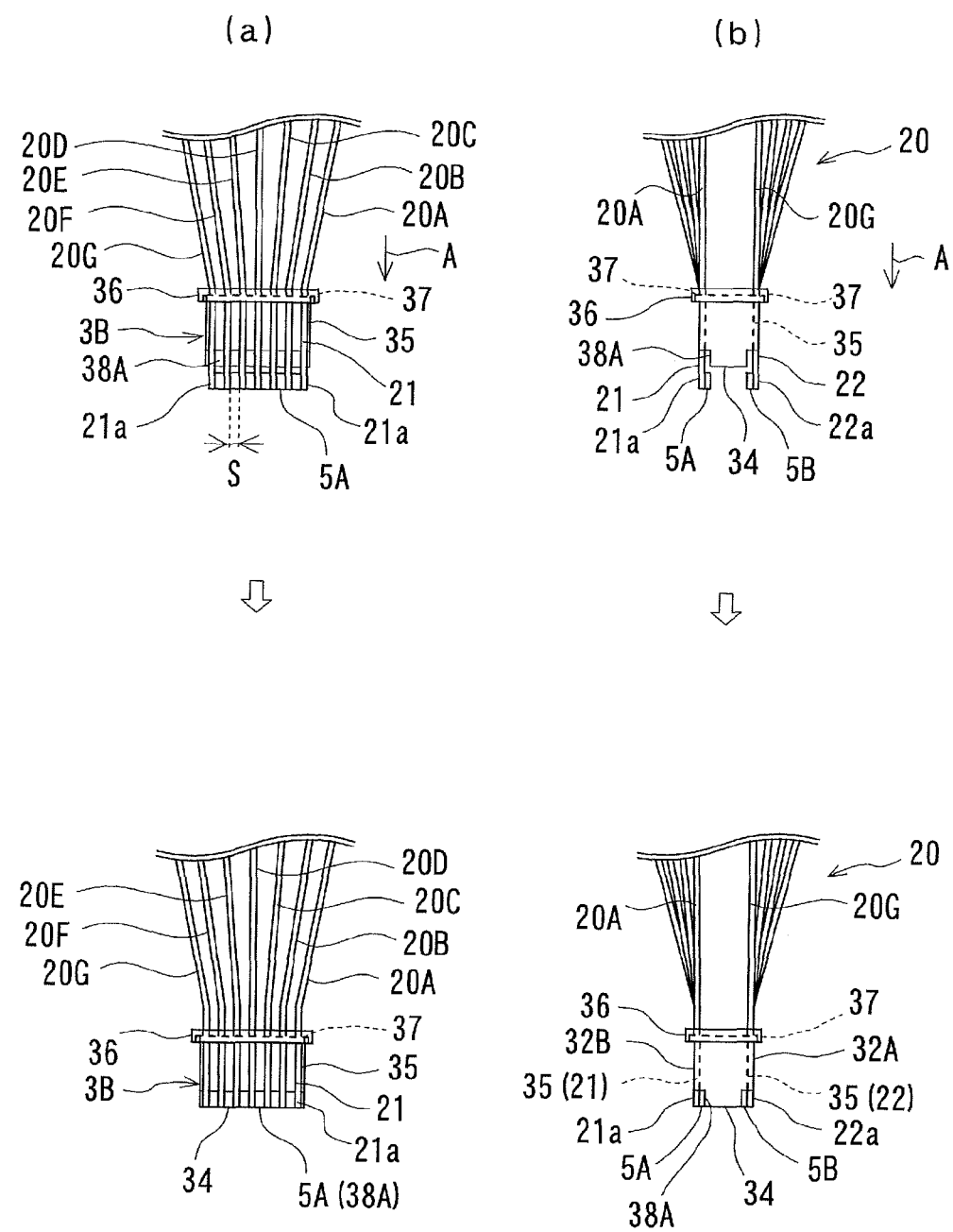
FIG. 13 illustrate a state in manufacturing steps (second and third steps) of the stirrer according to the second embodiment, in which FIG. 13($a$) is an explanatory view illustrating a state when viewed from a front side thereof and FIG. 13($b$) is an explanatory view illustrating when viewed from a lateral side thereof.

With this second step, as illustrated in an upper part of FIG. 13, the respective terminal ends 21a and 22a of the ends 21 and 22 of the respective wire members 20 (A to G) are fixed and connected to the connection plates 5A and 5B under a state in which the respective terminal ends 21a and 22a are arranged in a two-row linear state and the intervals between the adjacent terminal ends are retained at the same dimension as the interval S for the arrangement of the wire member ends 21 and 22. The connection plates 5A and 5B at this time are, similarly to the terminal ends 21a and 22a of the wire members 20, spaced apart and protruded from the bottom surface portion 34 of the fitting body 3B. Further, at this time, the respective wire members 20 (A to G) are arranged in a state in which the folded parts 26 are caused to cross one another to be vertically shifted at upper portions thereof, thereby simultaneously forming a head portion shape of the stirring section 2.

Subsequently, as illustrated in upper and lower parts of FIG. 13, for example, under a state in which the entire respective wire members 20 (A to G) are positionally fixed, the fitting body 3B is caused to slide with respect to the respective wire members 20 (A to G) in a direction indicated by an arrow A along the length direction of the groove 35 and the through-hole 37 to be pulled back (third step). With this, both of the terminal ends 21a and 22a of the ends 21 and 22 of the respective wire members 20 and the connection plates 5A and 5B are housed in the housing recesses 38A and 38B of the fitting body 3B.

Here, in the third step, under a state in which the fitting body 3B is positionally fixed, the entire respective wire members 20 (A to G) may be caused to slide with respect to the fitting body 3B along the length direction of the groove 35 and the through-hole 37 to be pulled back. That is, any one of the fitting body 3B and the respective wire members 20 may be positionally fixed, and the other thereof may be caused to slide with respect to the fixed member. This point is similar in a third step of a third embodiment and the like to be described later.

Further, in the third step, when the fitting body 3B is caused to slide with respect to the respective wire members 20 (A to G) in the direction indicated by the arrow A to be pulled back, an adhesive may be applied in advance to the ends 21 and 22 of the respective wire members 20 (A to G) in a state spaced apart and protruded from the fitting body 3B, and then the fitting body 3B may be caused to slide to be pulled back. With this, the adhesive applied to the ends 21 and 22 of the respective wire members 20 is carried and filled into the grooves 35 and the through-holes 37 of the fitting body 3B by the sliding operation. Thus, the adhesive enables firm bonding between the ends 21 and 22 of the respective wire members 20 and the grooves 35 and through-holes 37, thereby maintaining a no-gap state. As a result, the water-tightness between the fitting body 3B and the wire member ends 21 and 22 is enhanced.

From the viewpoint of ensuring this excellent water-tightness, the length of the ends 21 and 22 of the respective wire members 20 to be applied with the adhesive is preferred to be set to have at least substantially an equal value as the entire height H2 of the fitting body 3B (substantially 100% of the entire height). Therefore, the ends 21 and 22 of the respective wire members 20 are formed to include, in addition to the part in a range to be embedded at the time of mounting to the fitting body 3B as described above, the part (sliding operation parts 21c and 22c) formed so as to linearly extend further above the upper surface (lid portion 36) of the fitting body 3B. This point is similar in a second step in a case of adopting the sliding operation such as the first embodiment, and in the third step in the third embodiment or other embodiments to be described later.

Figure 14:
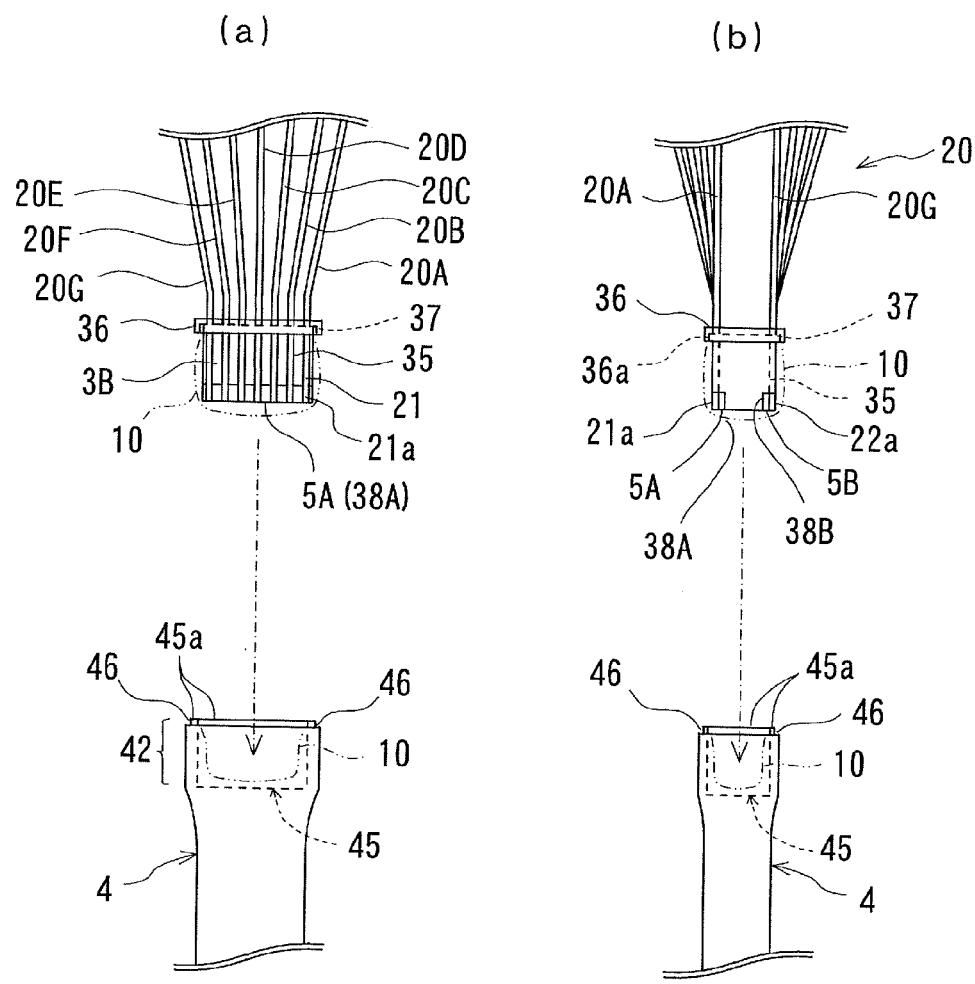
FIG. 14 illustrate a state in a manufacturing step (fourth step) of the stirrer according to the second embodiment, in which FIG. 14($a$) is an explanatory view illustrating a state when viewed from a front side thereof and FIG. 14($b$) is an explanatory view illustrating when viewed from a lateral side thereof.

Subsequently, as illustrated in FIG. 14, the fitting body 3B, which is in a state in which, in the third step, the ends 21 and 22 of the respective wire members 20 (A to G) are fitted into the grooves 35 and the through-holes 37 and a state in which the terminal ends 21a and 22a of the ends 21 and 22 and the connection plates 5A and 5B are housed in the housing recesses 38A and 38B, is fitted and fixed to the mounting recess 45 of the mounting part 42 of the handle section 4 (fourth step).

In this case, as indicated by the two-dot chain line of FIG. 14, the adhesive 10 is applied to the four lateral surface portions 32A, 32B, 33A, and 33B and the bottom surface portion 34 of the fitting body 3A, and to a fitting frame portion 36a of the lid portion 36 (FIGS. 10 and 11). Further, the adhesive 10 is also applied to the inner wall surfaces 45A, 45B, 45C, and 45D, the bottom surface 45E, and the upper end 45a of the mounting recess 45 of the handle section 4. Then, the operation of fitting the fitting body 3B to the mounting recess 45 is performed. At this time, the lid portion 36 of the fitting body 3B is bonded to the upper end 45a of the mounting recess 45 in a state of covering the upper end 45a. Further, at this time, the fitting frame portion 36a of the lid portion 36 is fitted into the cutout portion 46 at the outer circumference portion of the upper end 45a (FIGS. 15(a) and 15(b)).

In this fourth step, when the adhesive 10 is cured to completely fix the fitting body 3B to the mounting recess 45 of the handle section 4, as illustrated in FIG. 14, the ends 21 and 22 of the respective wire members 20 (A to G) forming the stirring section 2 are mounted to the mounting part 42 of the handle section 4 via the fitting body 3B. With the above-mentioned steps, the stirrer 1B having the appearance as illustrated in FIGS. 1 and 2 etc. is completed and obtained.

At this time, respective opposing parts among the mounting recess 45 of the handle section 4, the fitting body 3B, and the ends 21 and 22 of the respective wire members 20 (A to G) are adhered with the adhesive 10 to be firmly fixed to one another. Further, opposing parts between the lid portion 36 of the fitting body 3B and the upper end 45a of the mounting recess 45 are also adhered with the adhesive 10 to be firmly fixed to each other. Further, at those respective opposing parts, the adhesion layer 12 made of the penetrated and cured adhesive 10 is present (FIG. 15(c)), and thus there are no unnecessary gaps at those respective parts.

As a result, the fitting body 3B is firmly fixed to the mounting recess 45 of the handle section 4 and the upper end 45a of the mounting recess 45 without a gap. Further, the ends 21 and 22 of the respective wire members 20 (A to G) are firmly fixed to the directly opposing parts of (the grooves 35 and the through-holes 37 of) the fitting body 3B and the mounting recess 45 without a gap.

Further, at this time, also respective opposing parts among the mounting recess 45 of the handle section 4, the housing recesses 38A and 38B of the fitting body 3B, the terminal ends 21a and 22a of the ends 21 and 22 of the respective wire members 20 (A to G), and the connection plates 5A and 5B are adhered with the adhesive 10 to be firmly fixed to one another. In addition, there are no unnecessary gaps at those respective parts. Thus, the fitting body 3B obtains an excellent water-tightness.

Figure 15:
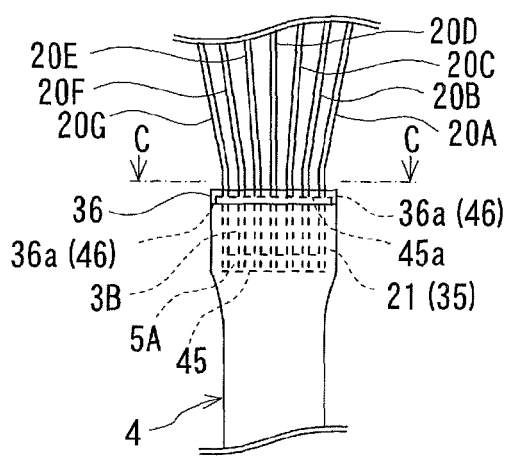
FIG. 15 illustrate a main part (mounting structure part of wire member end) of the stirrer according to the second embodiment, in which FIG. 15($a$) is an explanatory view illustrating a state when viewed from a front side thereof, FIG. 15($b$) is an explanatory view illustrating a state when viewed from a lateral side thereof, and FIG. 15($c$) is a sectional view taken along the line C-C of FIG. 15($a$).
Figure 15:
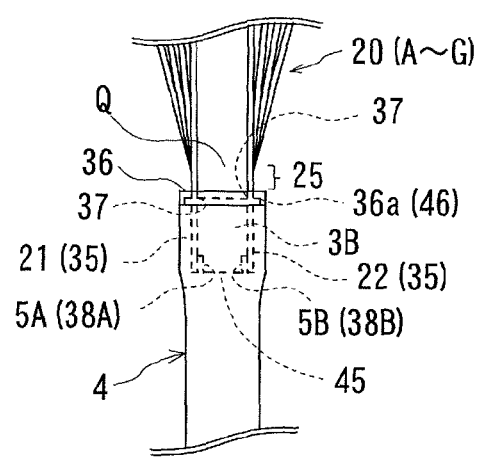
Figure 15:
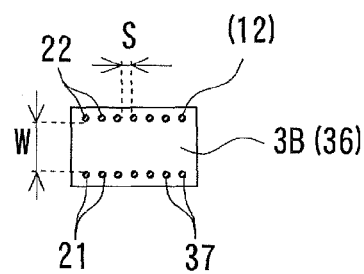

Further, the ends 21 and 22 of the respective wire members 20 (A to G) are mounted to the mounting part 42 of the handle section 4 under a state in which the ends 21 and 22 are arranged in accordance with the desired arrangement condition as described above via the grooves 35 and the through-holes 37 of the fitting body 3B. That is, as illustrated in FIG. 15(c), fitting of the wire members 20 is performed under a state in which the respective wire member ends 21 and 22 are allocated to particularly the respective through-holes 37 of the fitting body 3B having the above-mentioned configuration. Thus, the respective wire member ends 21 and 22 are allocated so as to form two opposing rows spaced with the interval W. Further, the respective wire member ends 21 and 22 in each row are arranged in an adjacent state at intervals S(<W).

Then, the stirrer 1B configured as described above is used similarly to the case of the stirrer 1A according to the first embodiment. Further, the stirring section 2 or the like of the stirrer 1B is cleaned after being used, similarly to the case of the stirrer 1A according to the first embodiment.

Further, in the stirrer n, both in the stirring operation and the cleaning operation after the use, liquid such as water used in the operation does not pass between the root parts 25 of the respective wire members 20 (A to G) and the through-holes 37 of the fitting body 3B to enter inside the mounting recess 45 of the handle section. Further, such a stirrer 1B which is excellent in so-called water-tightness can be manufactured relatively easily merely through the steps (first to fourth steps) with simple operation contents as described above.

Further, even when the stirrer 1B receives, at the time of the stirring operation or the cleaning operation after the use, an external force such as deformation or vibration of the wire member 20 of the stirring section 2, unnecessary gaps are not generated between the through-holes 37 or the grooves 35 of the fitting body 3A and the root parts 25 of the respective wire members 20, and further, an unnecessary gap is not generated between the upper end 45a of the mounting recess 45 of the handle section 4 and the lid portion 36 of the fitting body 3B. Further, the stirrer 1B applies, as the fitting body 3B, a fitting body which has the through-holes 37 in addition to the grooves 35 formed therein (in the lid portion 36). Therefore, in the stirrer 1B, the parts of the ends 21 and 22 of the respective wire members 20 to be retained by being inserted into the through-holes 37 of the fitting body 3B increase, and accordingly compared to the stirrer 1A of the first embodiment applying the fitting body 3A having only the grooves 35 formed therein, the fitting body 3B is retained more firmly. Thus, durability against the external force caused by the movement of the wire member 20 increases to prevent generation of unnecessary gaps, and the water-tightness is maintained long. In addition, the respective wire members 20 are not pulled out from the through-holes 37 of the fitting body 3B.

Note that, in the fourth step, the operation is performed after the adhesive 10 is applied to both of the fitting body 3B and the mounting recess 45, but the operation may be performed after the adhesive 10 is applied to only one of the fitting body 3B and the mounting recess 45.

Third Embodiment

Figure 16:
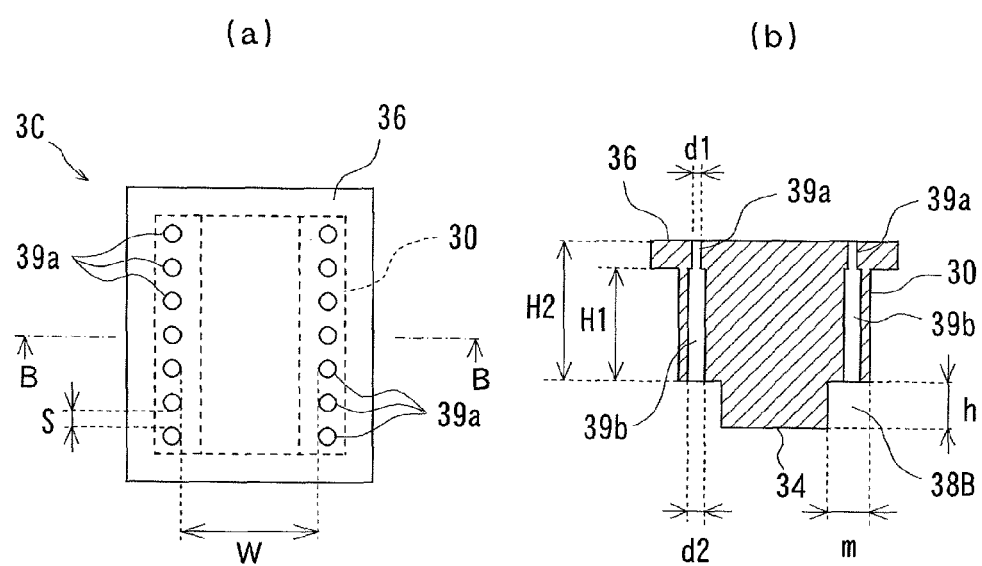
FIG. 16 illustrate a fitting body of a stirrer according to a third embodiment, in which FIG. 16($a$) is a top view thereof and FIG. 16($b$) is a sectional view taken along the line B-B of FIG. 16($a$).
Figure 17:
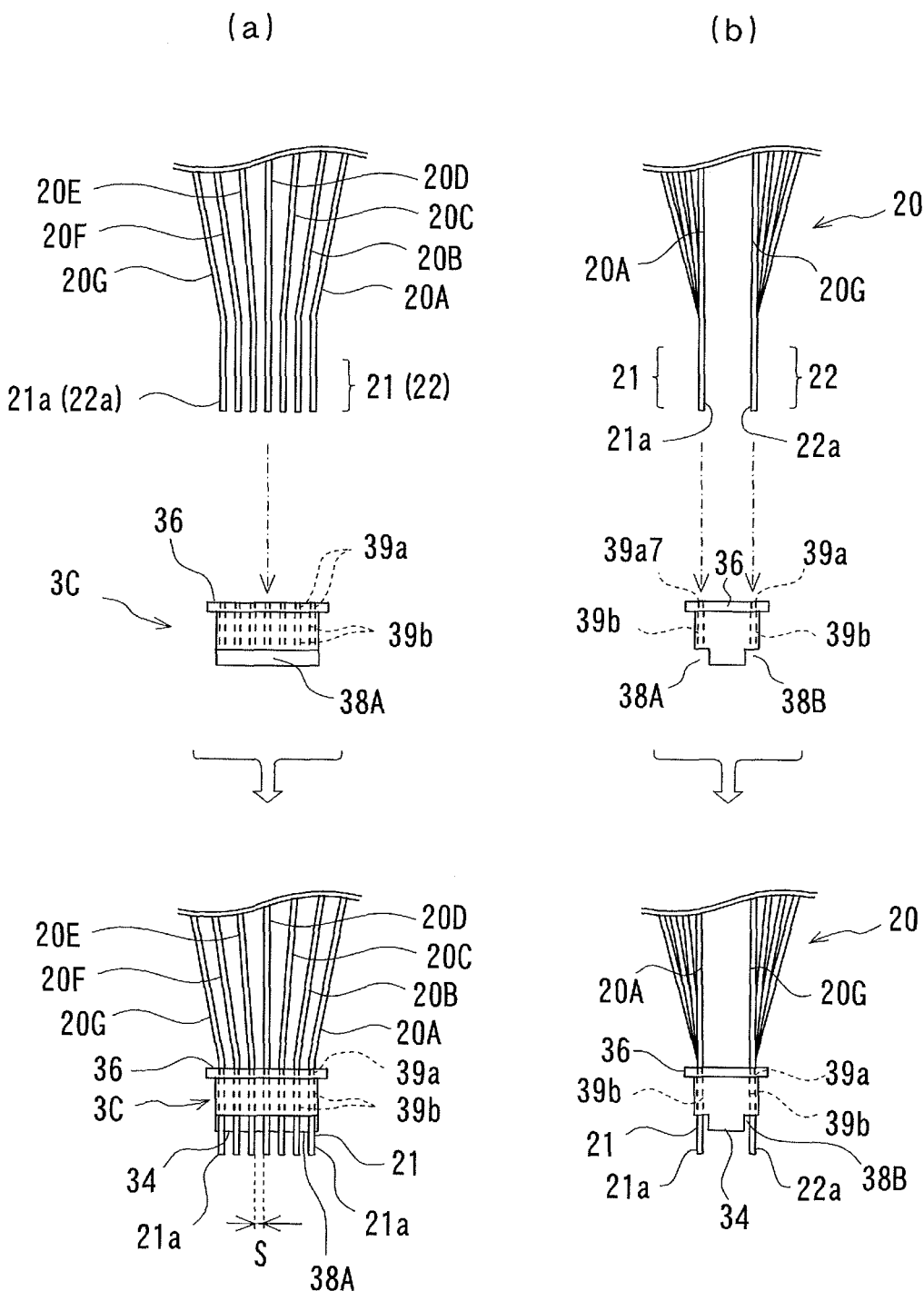
FIG. 17 illustrate a state in a manufacturing step (first step) of the stirrer according to the third embodiment, in which FIG. 17($a$) is an explanatory view illustrating a state when viewed from a front side thereof
Figure 18:
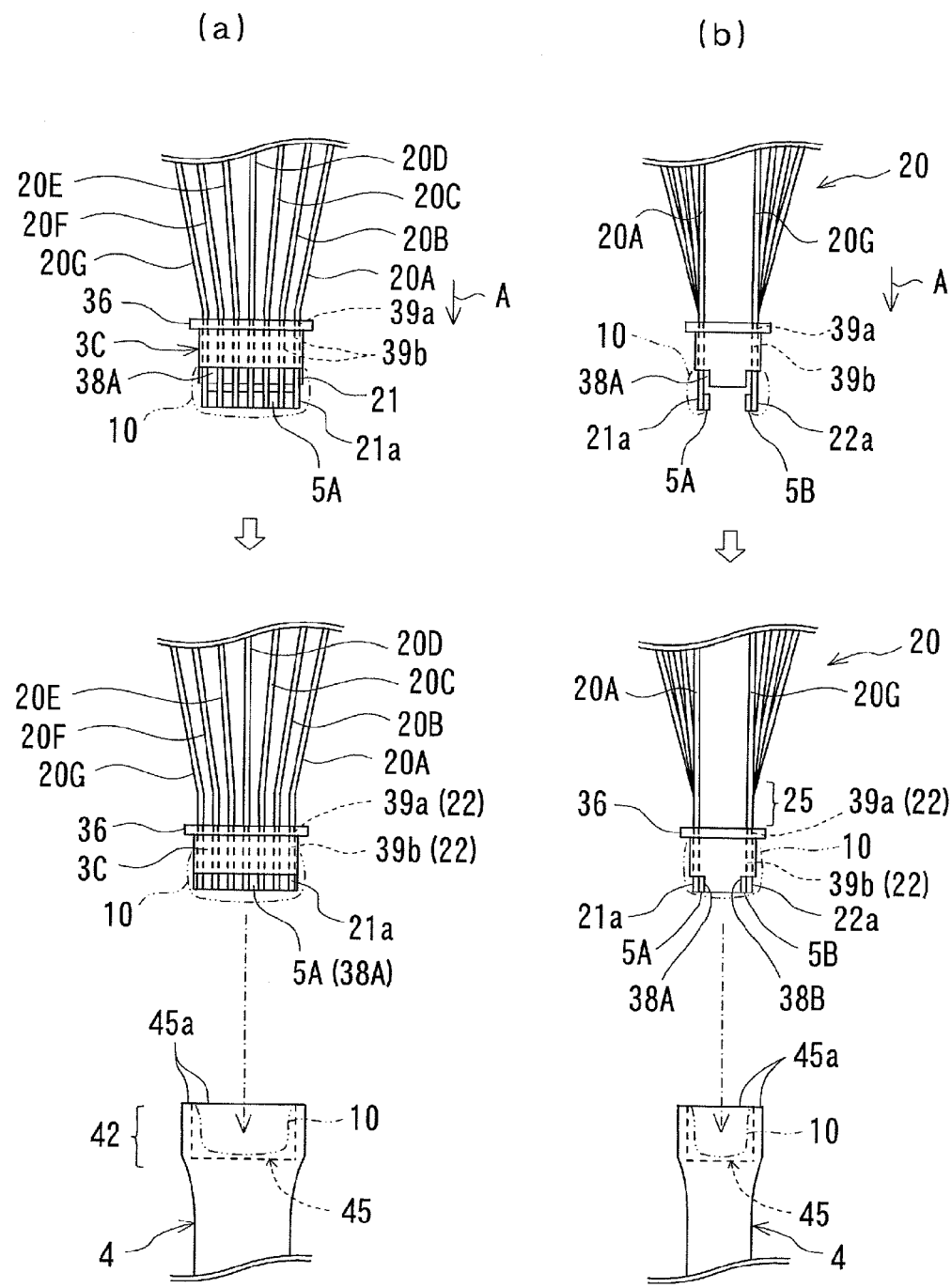

FIGS. 16 to 18 illustrate main parts of a stirrer according to a third embodiment of the present invention. FIG. 16 illustrate a fitting body of the stirrer, and FIGS. 17 and 18 illustrate main manufacturing steps of the stirrer.

A stirrer 1C according to the third embodiment applies, as the fitting body, a fitting body 3C which has a different configuration. Other configurations are the same as those of the stirrer 1B of the second embodiment described above. Therefore, the entire appearance of the stirrer 1C is the same as the stirrer 1A illustrated in FIGS. 1 and 2 except for the fitting body 3C.

That is, as illustrated in FIG. 16 etc., in the fitting body 3C, the grooves 35 and the through-holes 37 in the fitting body 3B of the second embodiment are changed to a plurality of through-holes 39 formed from the lid portion 36 so as to continuously pass through the main body portion 30 below the lid portion 36. That is, the fitting body 3C has a mode in which only the through-holes 39 are formed. In the fitting body 3C, configuration parts other than the above-mentioned changed part have the common configuration as those of the fitting body 3B of the second embodiment.

The through-hole 39 includes a first through-hole 39a corresponding to a part formed in the lid portion 36 and a second through-hole 39b corresponding to a part formed continuously to the first through-hole 39a in the main body portion 30 below the lid portion 36. Further, the first through-hole 39a is formed as a hole having the same hole shape and hole diameter d1 (the hole diameter d1 may be a slightly smaller diameter) as the cross-sectional shape and the outer diameter of each of the ends 21 and 22 of the wire member 20. On the other hand, the second through-hole 39b has the same cross-sectional shape as each of the ends 21 and 22 of the wire member 20 but has a hole diameter d2 in a dimension slightly larger than the outer diameter of the ends 21 and 22. Therefore, there is a relation that the hole diameter d2 of the second through-hole 39b is relatively larger than the hole diameter d1 of the first through-hole 39a (d2>d1).

By the way, the lid portion 36 of the fitting body 3C is different from the lid portion 36 of the fitting body 3B of the second embodiment, and does not include the fitting frame portion 36a (FIG. 11(d)). In this regard, the cutout portion 46 is not formed in the outer circumference portion of the upper end 45a of the mounting recess of the handle section 4.

Next, steps of manufacturing the stirrer 1C applying the fitting body 3C are described.

First, as illustrated in FIG. 17, the ends 21 and 22 of the respective wire members 20 (A to G) after being subjected to a process of bending into a folded shape are fitted into the through-holes 39 of the fitting body 3C, and then the fitting body 3C is caused to slide in the direction of the folded and bent part 26 of the wire member 20, to thereby cause the terminal ends 21a and 22a of the respective wire member ends 21 and 22 to be spaced apart and protruded from the bottom surface portion 34 of the fitting body 3C (first step).

At this time, the ends 21 and 22 of the respective wire members 20 are fitted by passing through the first through-holes 39a formed in the lid portion 36 of the fitting body 3C, and then passing through the second through-holes 39b continuous to the first through-holes 39a. In the fitting operation at this time of the ends 21 and 22 of the respective wire members 20 with respect to the through-holes 39, the hole diameter d1 of the first through-hole 39a has a dimension substantially the same as the outer diameter of the wire member 20, and hence the ends 21 and 22 receive a large friction resistance when passing through the first through-holes 39a. However, the hole diameter d2 of the second through-hole 39b has a dimension slightly larger than the outer diameter of the wire member 20, and hence the ends 21 and 22 do not receive a large friction resistance when passing through the second through-holes 39b. With this, after the respective wire member ends 21 and 22 pass through the first through-holes 39a, the respective wire member ends 21 and 22 can easily pass through the second through-holes 39b.

Subsequently, as illustrated in an upper part of FIG. 18, the terminal ends 21a and 22a of the ends 21 and 22 of the respective wire members 20 (A to G) in a state spaced apart and protruded from the fitting body 3C are welded and fixed to the connection plates 5A and 5B arranged on the inner side thereof (second step).

Subsequently, as illustrated in upper and middle parts of FIG. 18, for example, under a state in which the entire respective wire members 20 (A to G) are positionally fixed, the fitting body 3C is caused to slide with respect to the respective wire members 20 (A to G) in a direction indicated by an arrow A along the length direction of the through-holes 39 to be pulled back (third step). With this, both of the terminal ends 21a and 22a of the ends 21 and 22 of the respective wire members 20 and the connection plates 5A and 5B are housed in the housing recesses 38A and 38B of the fitting body 3C. In this third step, similar to the third step of the second embodiment, under a state in which the fitting body 3C is positionally fixed, the respective wire members 20 (A to G) may be caused to slide with respect to the fitting body 3C to be pulled back.

Further, the operation in the third step is performed after the adhesive 10 is applied to, as indicated by the two-dot chain line in an upper part of FIG. 18, the terminal ends 21a and 22a of the ends of the respective wire members 20 and the connection plates 5A and 5b, which are protruded from the fitting body 3C. With this, the adhesive 10 enters together with the wire member ends 21 and 22 inside particularly the second through-holes 39b (gap with respect to the wire member end 21 or 22) which have a relatively large hole diameter d2. Therefore, firm fixing can be obtained by the adhesion and an unexpected gap can be eliminated. With this, the fitting body 3C obtains an excellent water-tightness.

Subsequently, as illustrated in the middle part and a lower part of FIG. 18, the fitting body 3C, which is in a state in which, in the third step, the ends 21 and 22 of the respective wire members 20 (A to G) are fitted into the through-holes 39 and a state in which the terminal ends 21a and 22a of the ends 21 and 22 and the connection plates 5A and 5B are housed in the housing recesses 38A and 38B, is fitted and fixed to the mounting recess 45 of the mounting part 42 of the handle section 4 (fourth step).

In this case, as indicated by the two-dot chain line in the middle part of FIG. 18, the adhesive 10 is applied to the four lateral surface portions 32A, 32B, 33A, and 33B and the bottom surface portion 34 of the fitting body 3C, and to the fitting portion of the lid portion 36. Further, the adhesive 10 is also applied to the inner wall surfaces 45A, 45B, 45C, and 45D, the bottom surface 45E, and the upper end 45a of the mounting recess 45 of the handle section 4. Then, the operation of fitting the fitting body 3C to the mounting recess 45 is performed. At this time, the lid portion 36 of the fitting body 3C is bonded to the upper end 45a of the mounting recess 45 in a state of covering the upper end 45a.

In this fourth step, when the adhesive 10 is cured to completely fix the fitting body 3C to the mounting recess 45 of the handle section 4, the ends 21 and 22 of the respective wire members 20 (A to G) forming the stirring section 2 are mounted to the mounting part 42 of the handle section 4 via the fitting body 3C. With the above-mentioned steps, the stirrer 1C having the appearance as illustrated in FIGS. 1 and 2 etc. is completed and obtained.

Then, the stirrer 1C configured as described above is used similarly to the case of the stirrer 1B according to the second embodiment. Further, the stirring section 2 or the like of the stirrer 1C is cleaned after being used, similarly to the case of the stirrer 1B according to the second embodiment.

Further, in the stirrer 1C, both in the stirring operation and the cleaning operation, liquid such as water used in the operation does not pass between the root parts 25 of the respective wire members 20 (A to G) and the through-holes 39 of the fitting body 3C to enter inside the mounting recess 45 of the handle section.

In particular, in the fitting body 3C, the hole diameter d1 of the first through-hole 39a corresponding to the part formed in the lid portion 36 has a dimension substantially the same as (or smaller than) the outer diameter of the wire member 20. Therefore, no gap is generated between the first through-hole 39a and the end 21 or 22 of the wire member 20, and hence moisture does not penetrate from a gap therebetween by the capillary action. Further, the first through-hole 39a, which is formed in the lid portion 36 of the fitting body 3C and has substantially the same (or smaller) dimension as the outer diameter of the wire member 20, is set to have a through-hole length (length: part corresponding to height H2-H1) with a rate smaller with respect to the entire height dimension H2 of the fitting body 3C. Therefore, the friction resistance when the wire member 20 is fitted into the through-hole 39 of the fitting body 3C is small, and the fitting operation is facilitated. Therefore, an effect (manufacturing method effectiveness) that the fitting operation of the wire member 20 into the fitting body 3C can be simplified and the water-tightness of the fitting body 3C can be enhanced becomes very high. Thus, such a stirrer 1C which is excellent in so-called water-tightness can be manufactured relatively easily merely through the steps (first to fourth steps) with simple operation contents as described above.

Further, in the stirrer 1C, as the fitting body 3C, there is applied a fitting body including only the through-holes 39 having the same length as the height dimension H2 of the fitting body 3C. Therefore, in the stirrer 1C, the ends 21 and 22 of the respective wire members 20 are retained by being inserted into only the through-holes 39 having the same length as the height dimension H2 of the fitting body 3B. Accordingly, compared to the stirrer 1B of the second embodiment which applies the fitting body 3B including the grooves 35 and the through-holes 37 having a short length corresponding to the height dimension of the lid portion 36, the ends 21 and 22 are retained more firmly by the fitting body 3C. Thus, durability against the external force caused by the movement of the wire member 20 further increases to prevent generation of an unnecessary gap, and the water-tightness is maintained longer.

Further, even when the stirrer 1C receives, at the time of the stirring operation or the cleaning operation after the use, an external force such as deformation or vibration of the wire member 20 of the stirring section 2, unnecessary gaps are hardly generated between the through-holes 39 of the fitting body 3C and the root parts 25 of the respective wire members 20, and further, an unnecessary gap is hardly generated between the upper end 45a of the mounting recess 45 of the handle section 4 and the lid portion 36 of the fitting body 3C. In addition, the respective wire members 20 are not pulled out from the through-holes 39 of the fitting body 3C.

When a fitting body including only the through-holes 39 as in the fitting body 3C of the third embodiment is applied as the fitting body 3, the length of the through-hole 39 is preferably set to, regardless of presence or absence of the lid portion 36, a length of 3 to 30 times the diameter of the wire member 20, more preferably a length of 5 to 20 times the diameter thereof.

Here, when the length of the through-hole 39 is smaller than the length of 3 times the diameter of the wire member 20, during the use of the stirrer 1, a ratio that the stress concentrates to act on the through-hole 39 from the wire member 20 due to the swinging movement of the wire member 20 back and forth and around increases, and hence the hole diameter of the through-hole 39 may enlarge across the entire through-hole length to cause increase of the gap with respect to the wire member 20. Thus, it becomes difficult to maintain the excellent water-tightness. On the other hand, when the length of the through-hole 39 is larger than the length of 30 times the diameter of the wire member 20, a ratio that the stress concentrates to act on the through-hole 39 from the wire member 20 decreases, and hence, although the hole diameter of the through-hole 39 near the entrance may enlarge, the hole diameter does not enlarge across the entire length of the hole, which is preferred. However, it becomes difficult to insert the plurality of wire members 20 into the through-holes 39, and the sliding operation of the fitting body 3 and the like cannot be easily performed. When the wire member 20 having a diameter of 1.8 mm is used as in the third embodiment (similar in other embodiments), the length of the through-hole 39 of the fitting body 3C is preferably about 5 to 50 mm, more preferably in a range of about 9 to 36 mm.

Fourth Embodiment

Figure 19:
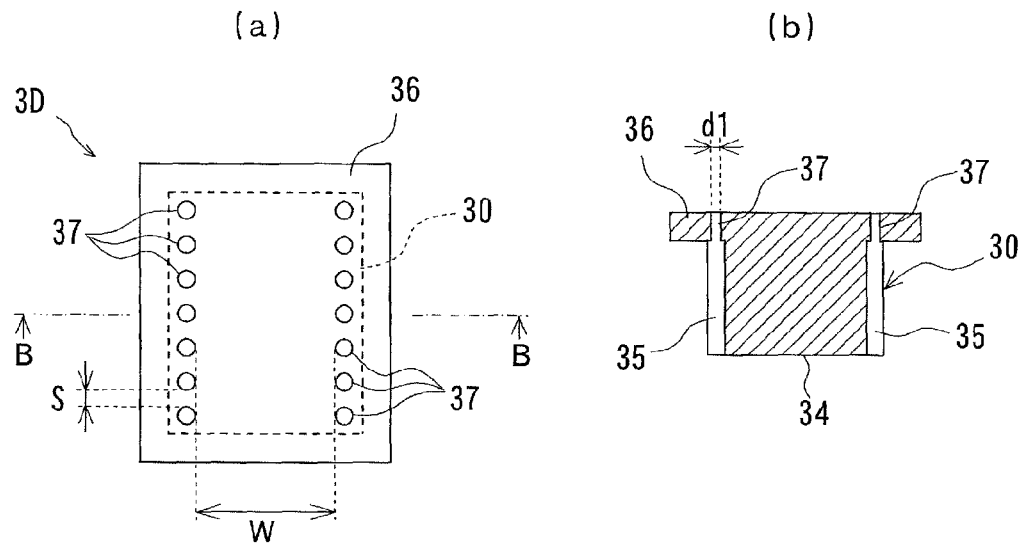
Figure 20:
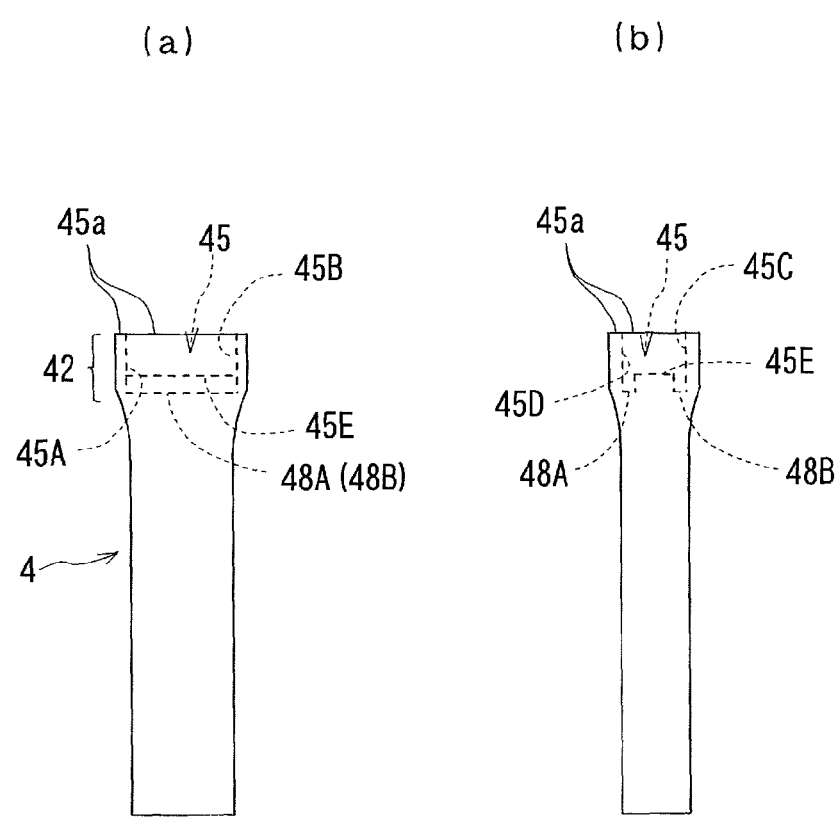
Figure 21:
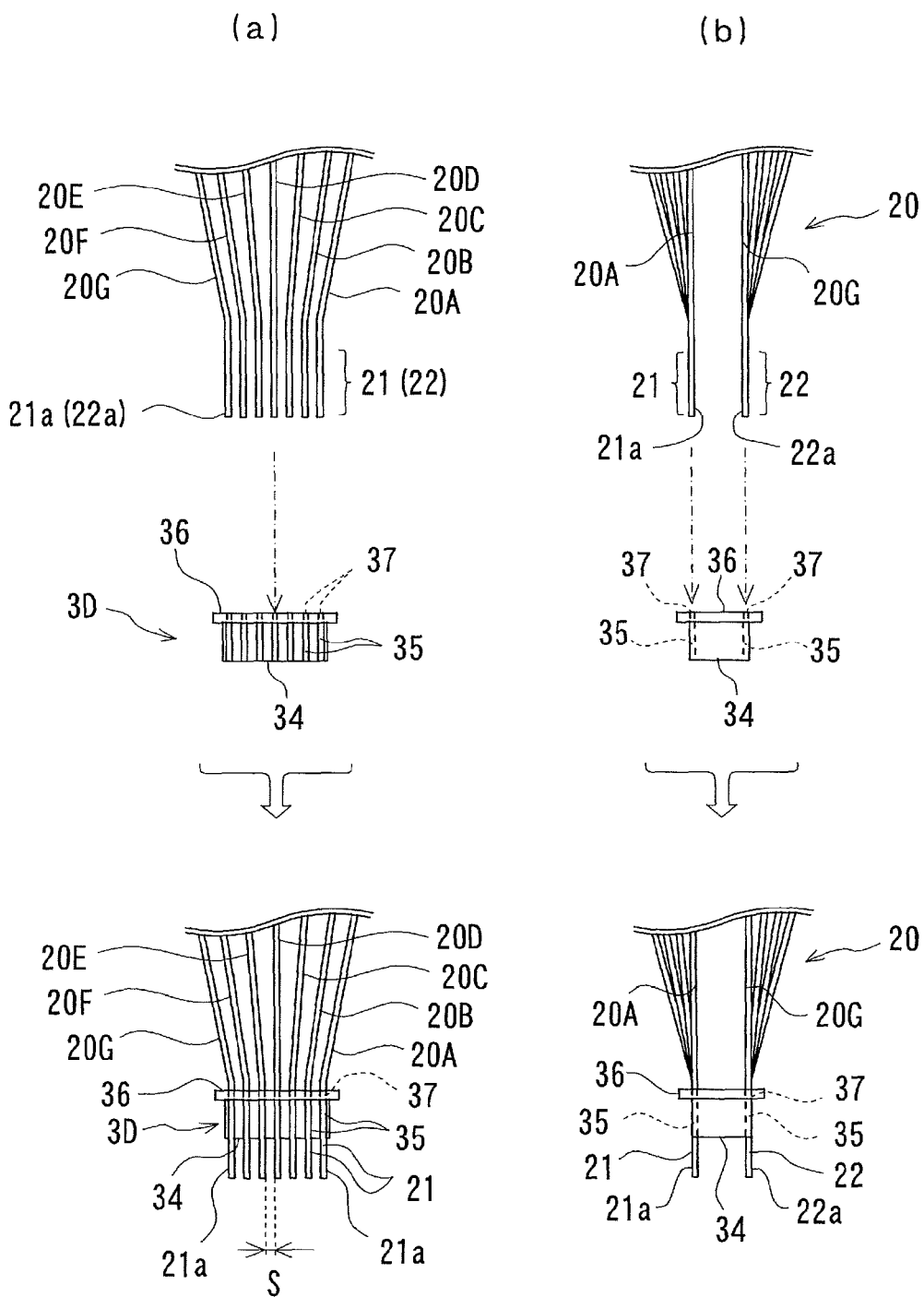
Figure 22:
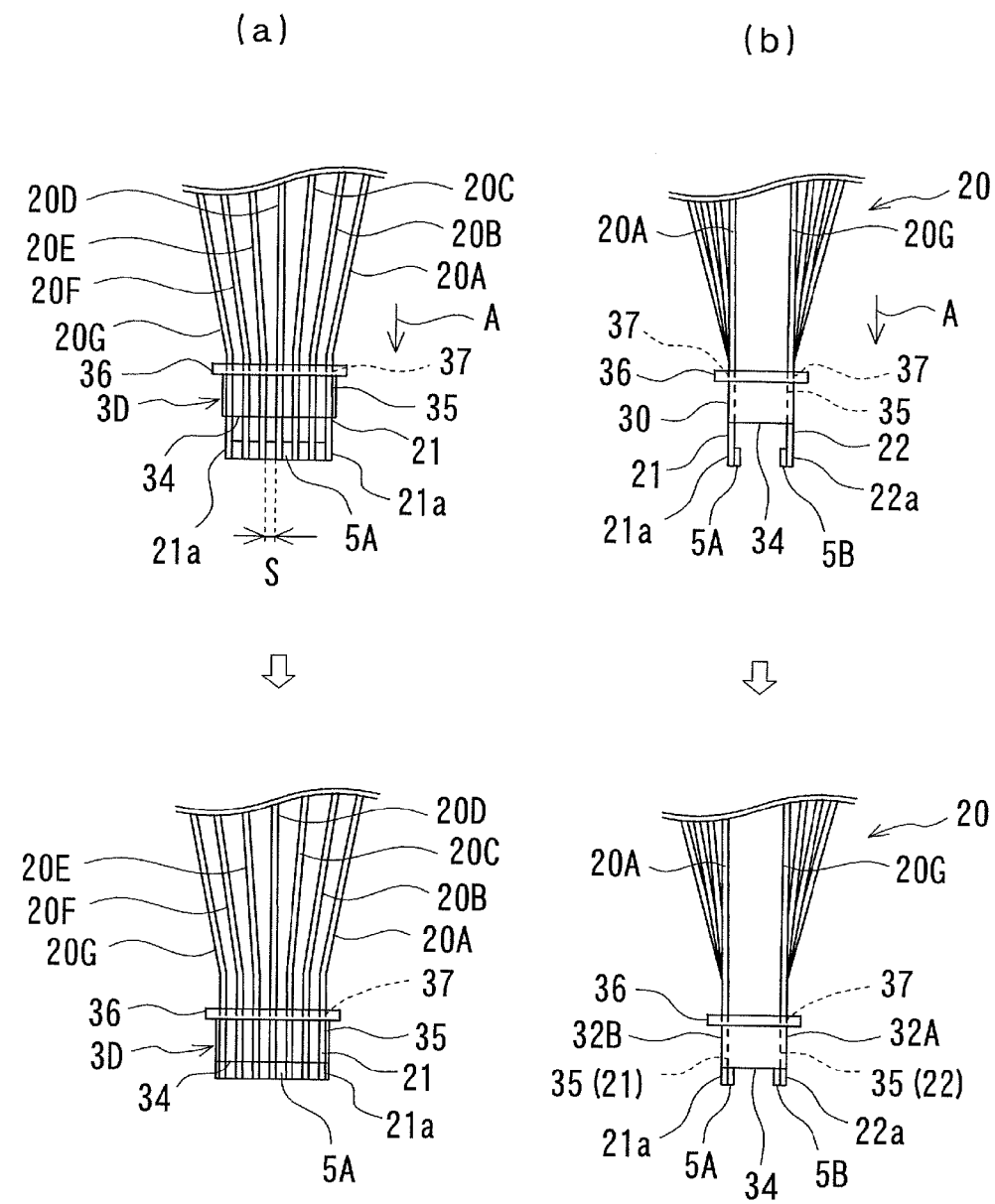
Figure 23:
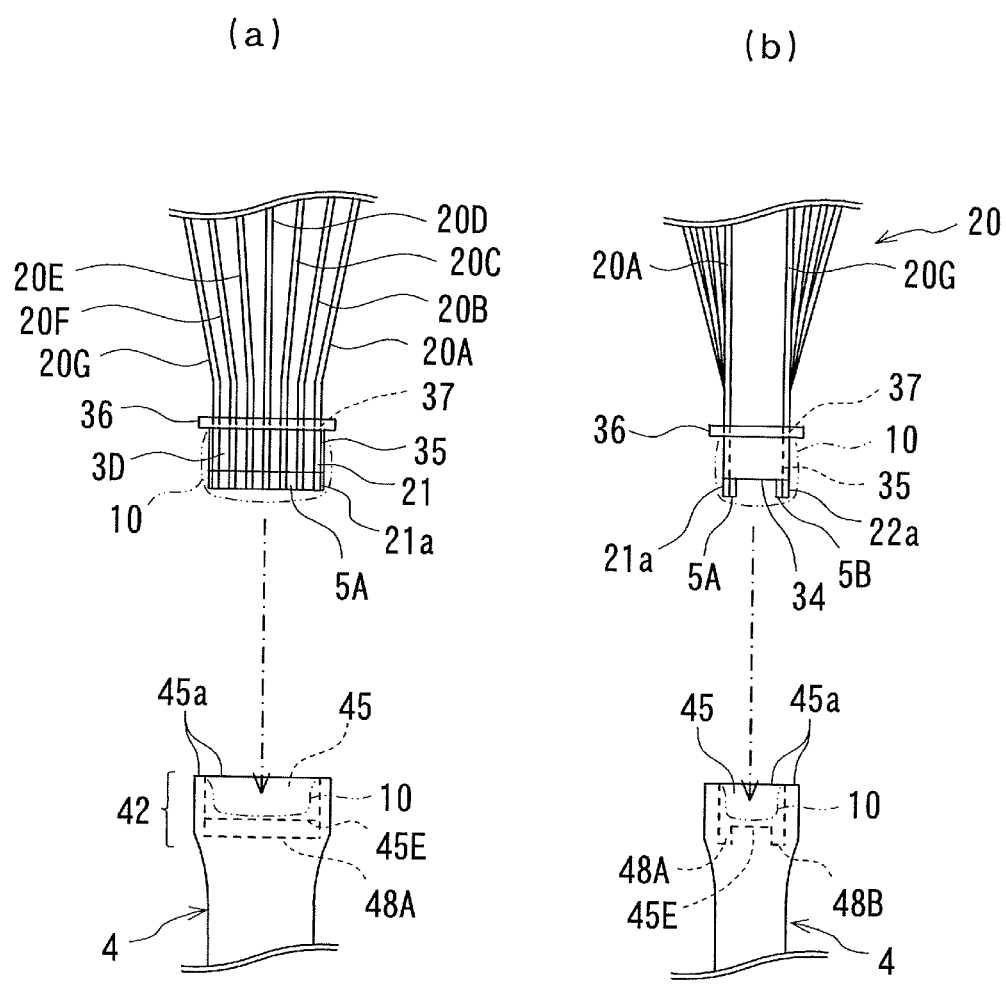
Figure 24:
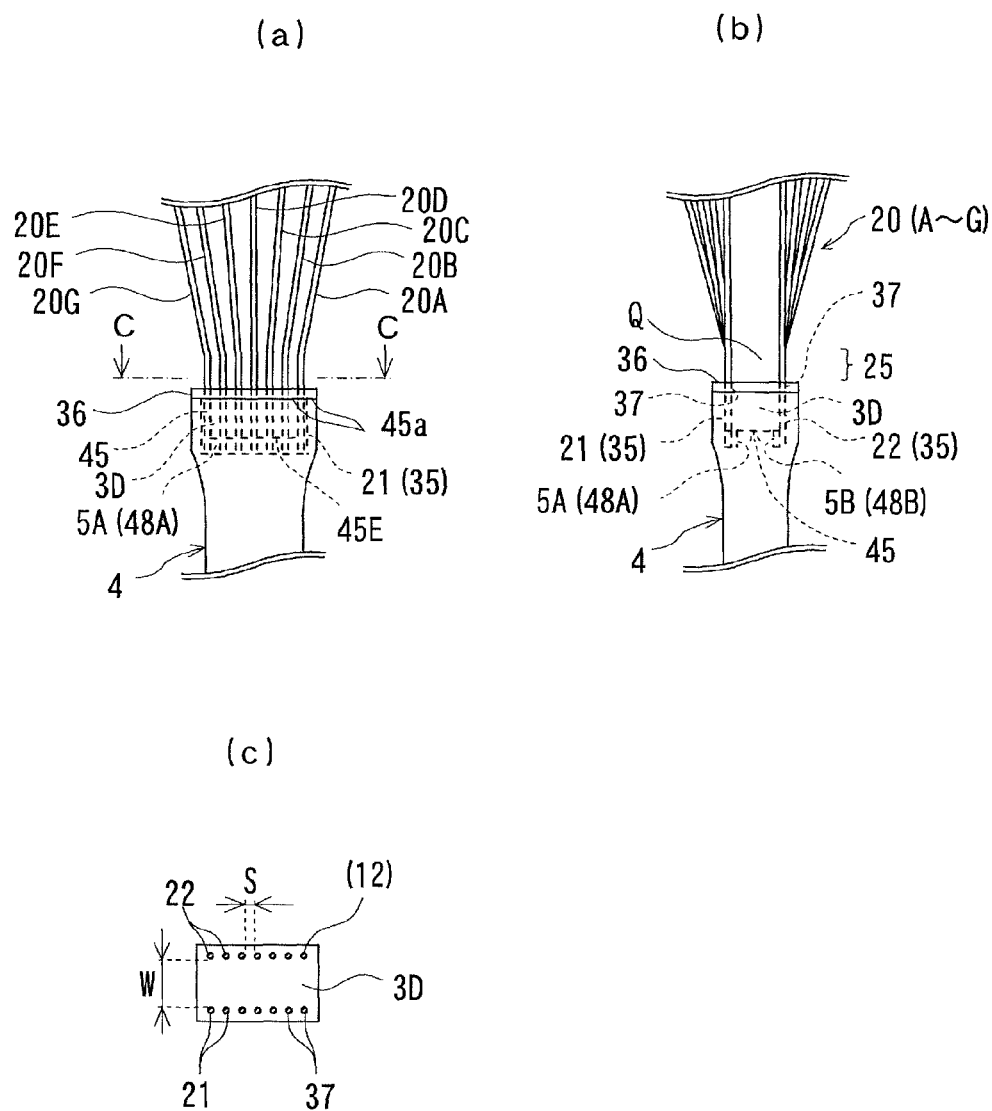

FIGS. 19 to 24 illustrate main parts of a stirrer according to a fourth embodiment. FIG. 19 illustrate a fitting body of the stirrer, FIG. 20 illustrate a handle section of the stirrer, FIGS. 21 to 23 illustrate main manufacturing steps of the stirrer, and FIG. 24 illustrate a part of the stirring section in a completed state.

A stirrer 1D according to the fourth embodiment applies, as the fitting body, a fitting body 3D which has a different configuration, and applies, as the handle section, a handle section 4 which has a different configuration. Other configurations are the same as those of the stirrer 1B of the second embodiment described above. Therefore, the entire appearance of the stirrer 1D is the same as the stirrer 1A illustrated in FIGS. 1 and 2 except for the fitting body 3D.

First, as illustrated in FIG. 19 etc., the fitting body 3D differs from the fitting body 3B of the second embodiment in that the housing recesses 38A and 38B (see FIG. 11) are not formed, but other configurations are substantially common thereto. That is, the fitting body 3D has a structure in which the lid portion 36 is formed at the upper portion of the main body portion 30 thereof, the lid portion 36 includes the plurality of through-holes 37, and the main body portion 30 includes the plurality of grooves 35 provided continuously to the respective through-holes 37. The main body portion 30 has a height set at a value smaller than the height of the main body portion in the fitting body 3B by the height of the connection plates 5A and 5B, but may have the same height as in the fitting body 3B. The grooves 35 and the through-holes 37 have the same configuration as those of the grooves 35 and the through-holes 37 in the fitting body 3B of the second embodiment. Further, the lid portion 36 differs from the lid portion 36 in the fitting body 3B of the second embodiment in that the fitting frame portion 36a (FIG. 11(d)) is not formed.

Further, the handle section 4 includes, as illustrated in FIG. 20 etc., housing recesses 48A and 48B along the long side of the bottom surface portion 45E of the mounting recess 45, for housing the connection plates 5A and 5B and (the terminal ends 21a and 22a of) the wire members 20. The housing recesses 48A and 48B are formed as recesses (grooves) extending downward than the depth D of the mounting recess 45. Further, the housing recesses 48A and 48B are formed in a dimension and shape minimum necessary for housing at least the connection plates 5A and 5B and (the terminal ends 21a and 22a of) the wire members 20. Particularly, the shape thereof is a rectangular parallelepiped shape corresponding to the shape of the rectangular parallelepiped connection plate 5.

Next, steps of manufacturing the stirrer 1D applying the fitting body 3D and the handle section 4 are described.

First, as illustrated in FIG. 21, the ends 21 and 22 of the respective wire members 20 (A to G) after being subjected to a process of bending into a folded shape are fitted into the through-holes 37 and the grooves 35 of the fitting body 3D, and then the fitting body 3D is caused to slide in the direction of the folded and bent part 26 of the wire member 20, to thereby cause the terminal ends 21a and 22a of the respective wire member ends 21 and 22 to be spaced apart and protruded from the bottom surface portion 34 of the fitting body 3D (first step).

Subsequently, as illustrated in an upper part of FIG. 22, the terminal ends 21a and 22a of the ends 21 and 22 of the respective wire members 20 (A to G) in a state spaced apart and protruded from the fitting body 3D are welded and fixed to the connection plates 5A and 5B arranged on the inner side thereof (second step).

Subsequently, as illustrated in upper and lower parts of FIG. 22, for example, under a state in which the entire respective wire members 20 (A to G) are positionally fixed, the fitting body 3D is caused to slide with respect to the respective wire members 20 (A to G) in a direction indicated by an arrow A along the length direction of the groove 35 and the through-hole 37 to be pulled back (third step). The connection plates 5A and 5B at this time are protruded from the bottom surface portion 34 of the fitting body 3D together with the terminal ends 21a and 22a of the wire members 20 because the connection plates 5A and 5B are brought into contact with the bottom surface portion 34 of the fitting body 3D to stop the sliding.

Subsequently, as illustrated in FIG. 23, the fitting body 3D, which is in a state in which, in the third step, the ends 21 and 22 of the respective wire members 20 (A to G) are fitted into the grooves 35 and the through-holes 37 and a state in which the terminal ends 21a and 22a of the ends 21 and 22 and the connection plates 5A and 5B are protruded from the bottom surface portion 34, is fitted and fixed to the mounting recess 45 of the mounting part 42 of the handle section 4 (fourth step). With this, as illustrated in FIG. 24, the terminal ends 21a and 22a of the ends 21 and 22 of the respective wire members 20 and the connection plates 5A and 5B, which have been in a state protruded from the bottom surface portion 34 of the fitting body 3D, are both housed in the housing recesses 48A and 48B formed in the mounting recess 45 of the handle section 4.

In this case, as indicated by the two-dot chain line of FIG. 23, the adhesive 10 is applied to the bonding portions among the four lateral surface portions 32A, 32B, 33A, and 33B and the bottom surface portion 34 of the fitting body 3D and the lid portion 36. Further, the adhesive 10 is also applied to the inner wall surfaces 45A, 45B, 45C, and 45D, the bottom surface 45E, and the upper end 45a of the mounting recess 45 of the handle section 4 and to the housing recesses 48A and 48B. Then, the operation of fitting the fitting body 3D to the mounting recess 45 is performed. At this time, the lid portion 36 of the fitting body 3B is bonded to the upper end 45a of the mounting recess 45 in a state of covering the upper end 45a.

In this fourth step, when the adhesive 10 is cured to completely fix the fitting body 3D to the mounting recess 45 of the handle section 4, as illustrated in FIG. 24, the ends 21 and 22 of the respective wire members 20 (A to G) forming the stirring section 2 are mounted to the mounting part 42 of the handle section 4 via the fitting body 3D. With the above-mentioned steps, the stirrer 1D having the appearance as illustrated in FIGS. 1 and 2 etc. is completed and obtained.

At this time, respective opposing parts among the mounting recess 45 of the handle section 4, the fitting body 3D, and the ends 21 and 22 of the respective wire members 20 (A to G) are adhered with the adhesive 10 to be firmly fixed to one another. Further, opposing parts between the lid portion 36 of the fitting body 3D and the upper end 45a of the mounting recess 45 are also adhered with the adhesive 10 to be f firmly f fixed to each other. Further, opposing parts among the connection plates 5A and 5B and the terminal ends 21a and 22a of the wire members, which are protruded from the bottom surface portion 34 of the fitting body 3D, and the housing recesses 48A and 48B of the mounting recess 45 are adhered with the adhesive 10 to be firmly fixed to one another. As described above, in those respective opposing parts, the adhesion layer 12 made of the penetrated and cured adhesive 10 is present (FIG. 24(c)), and thus there are no unnecessary gaps at those respective parts.

As a result, the fitting body 3D is firmly fixed to the mounting recess 45 of the handle section 4 and the upper end 45a of the mounting recess 45 without a gap. Further, the ends 21 and 22 of the respective wire members 20 (A to G) are firmly fixed to the directly opposing parts of (the grooves 35 and the through-holes 37 of) the fitting body 3D and the mounting recess 45 without a gap. Further, at this time, also respective opposing parts among the housing recesses 48A and 48B in the mounting recess 45 of the handle section 4, the terminal ends 21a and 22a of the ends 21 and 22 of the respective wire members 20 (A to G), and the connection plates 5A and 5B are adhered with the adhesive 10 to be firmly fixed to one another. In addition, there are no unnecessary gaps at those respective parts. Thus, the fitting body 3D obtains an excellent water-tightness.

Further, the ends 21 and 22 of the respective wire members 20 (A to G) are mounted to the mounting part 42 of the handle section 4 under a state in which the ends 21 and 22 are arranged in accordance with the desired arrangement condition as described above via the grooves 35 and the through-holes 37 of the fitting body 3D. That is, as illustrated in FIG. 24(c), fitting of the wire members 20 is performed under a state in which the respective wire member ends 21 and 22 are allocated to particularly the respective through-holes 37 of the fitting body 3D having the above-mentioned configuration. Thus, the respective wire member ends 21 and 22 are allocated so as to form two opposing rows spaced with the interval W. Further, the respective wire member ends 21 and 22 in each row are arranged in an adjacent state at intervals S(<W).

Then, the stirrer 1D configured as described above is used similarly to the case of the stirrer 1B according to the second embodiment. Further, the stirring section 2 or the like of the stirrer 1D is cleaned after being used, similarly to the case of the stirrer 1B according to the second embodiment.

Further, in the stirrer 1D, both in the stirring operation and the cleaning operation after the use, liquid such as water used in the operation does not pass between the root parts 25 of the respective wire members 20 (A to G) and the through-holes 37 of the fitting body 3D to enter inside the mounting recess 45 of the handle section. Further, such a stirrer 1D which is excellent in so-called water-tightness can be manufactured relatively easily merely through the steps (first to fourth steps) with simple operation contents as described above.

Further, even when the stirrer 1D receives, at the time of the stirring operation or the cleaning operation after the use, an external force such as deformation or vibration of the wire member 20 of the stirring section 2, unnecessary gaps are not generated between the through-holes 37 or the grooves 35 of the fitting body 3D and the root parts 25 of the respective wire members 20, and further, an unnecessary gap is not generated between the upper end 45a of the mounting recess 45 of the handle section 4 and the lid portion 36 of the fitting body 3D. Further, the terminal ends 21a and 22a of the respective wire members 20 are fixed, together with the connection plates 5A and 5B, to the housing recesses 48A and 48B in the mounting recess 45 of the handle section 4 in a state independent from the fitting body 3D. In addition, the respective wire members 20 are not pulled out from the through-holes 37 of the fitting body 3D.

Fifth Embodiment

Figure 37:
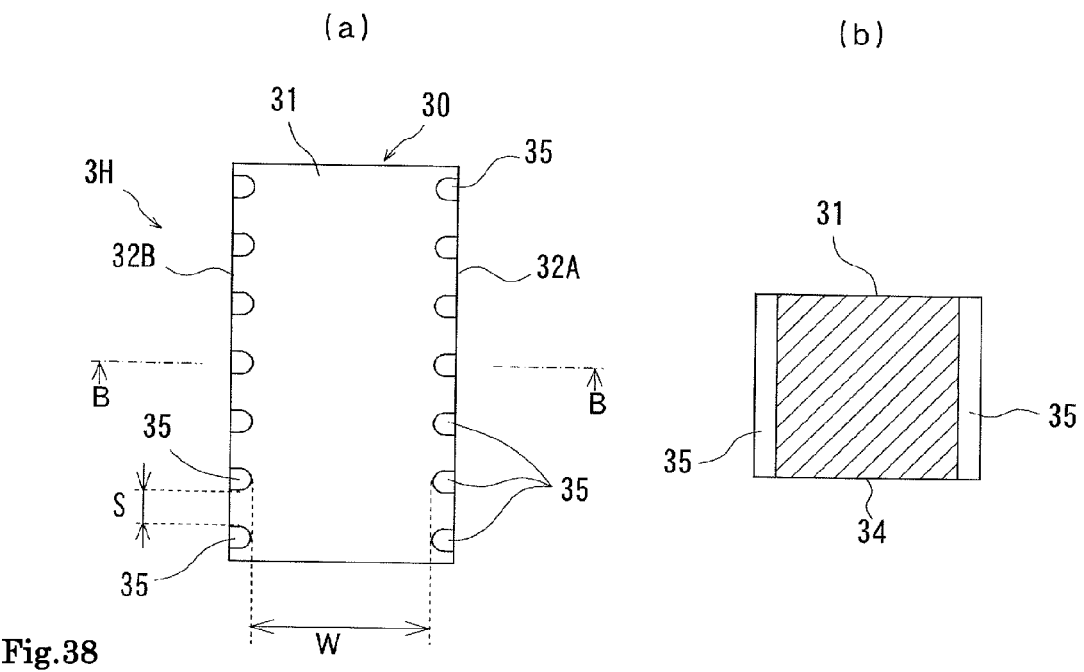
Figure 38:
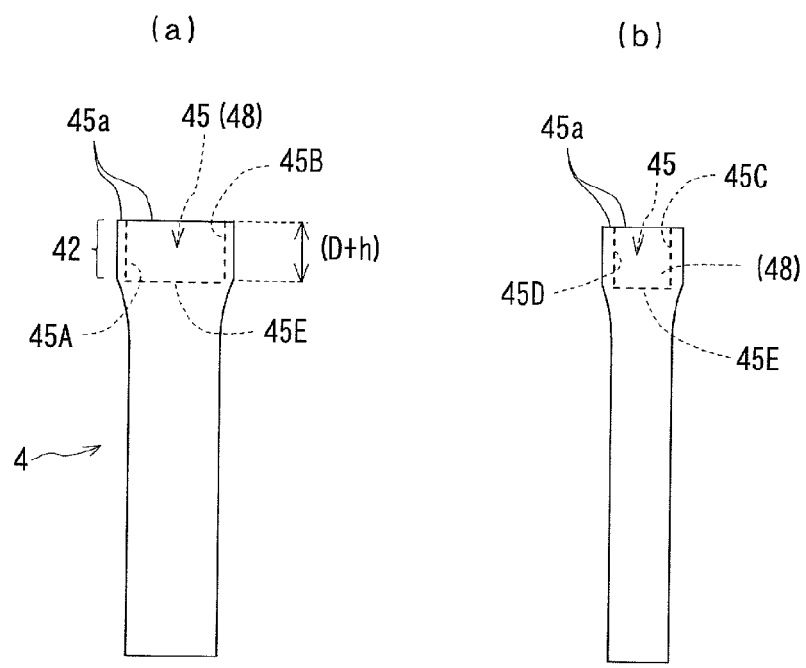
Figure 39:
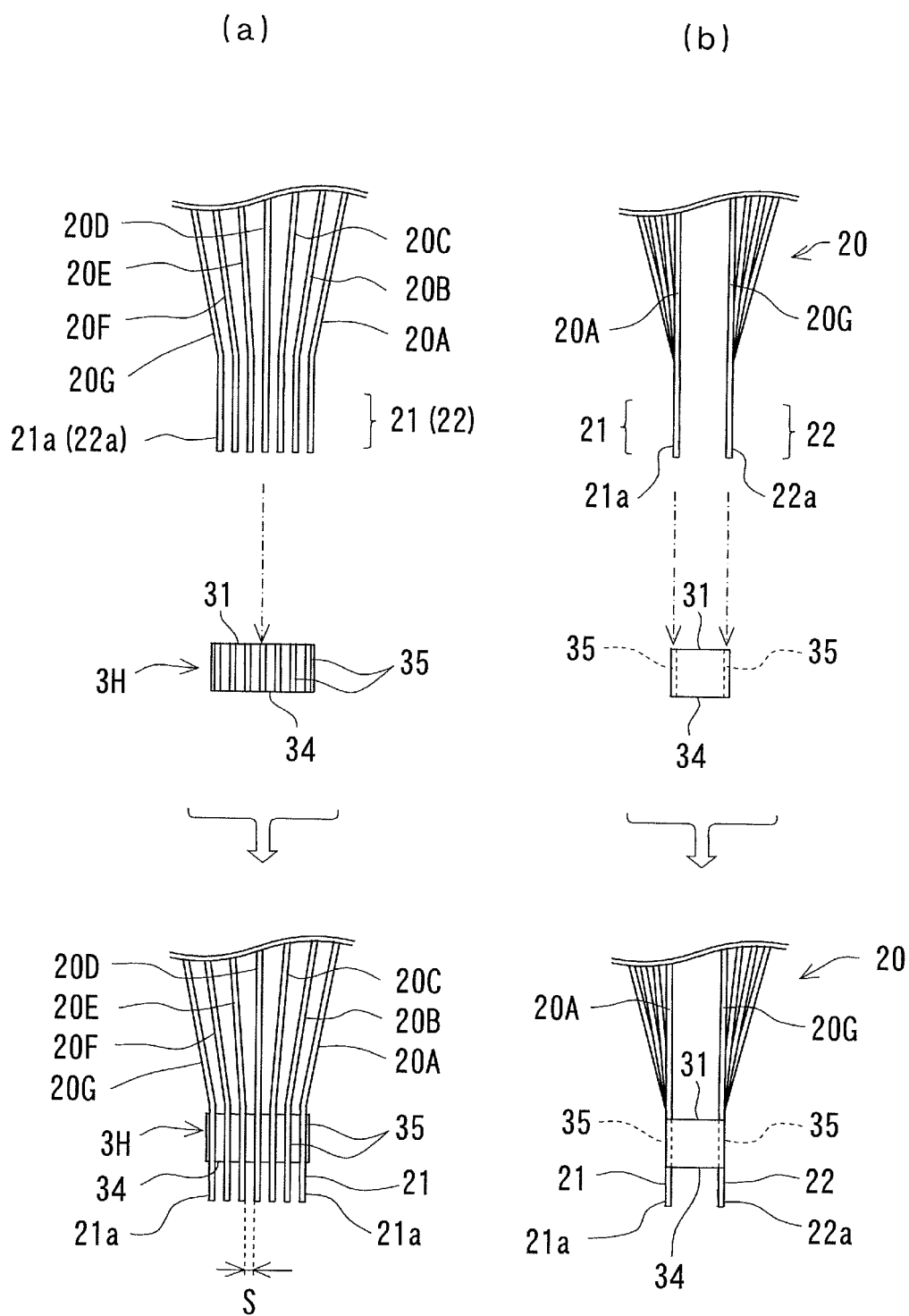
Figure 40:
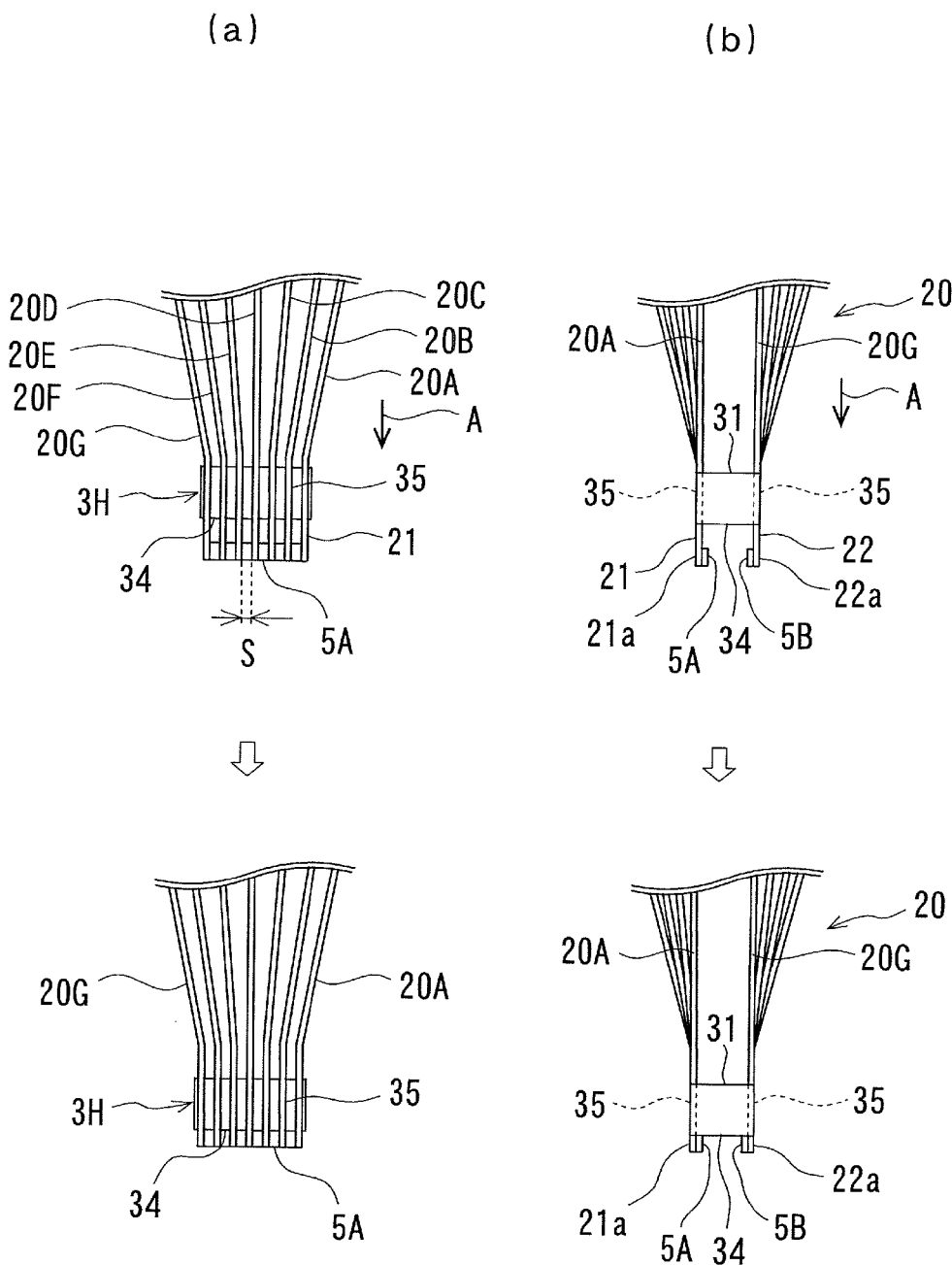
Figure 41:
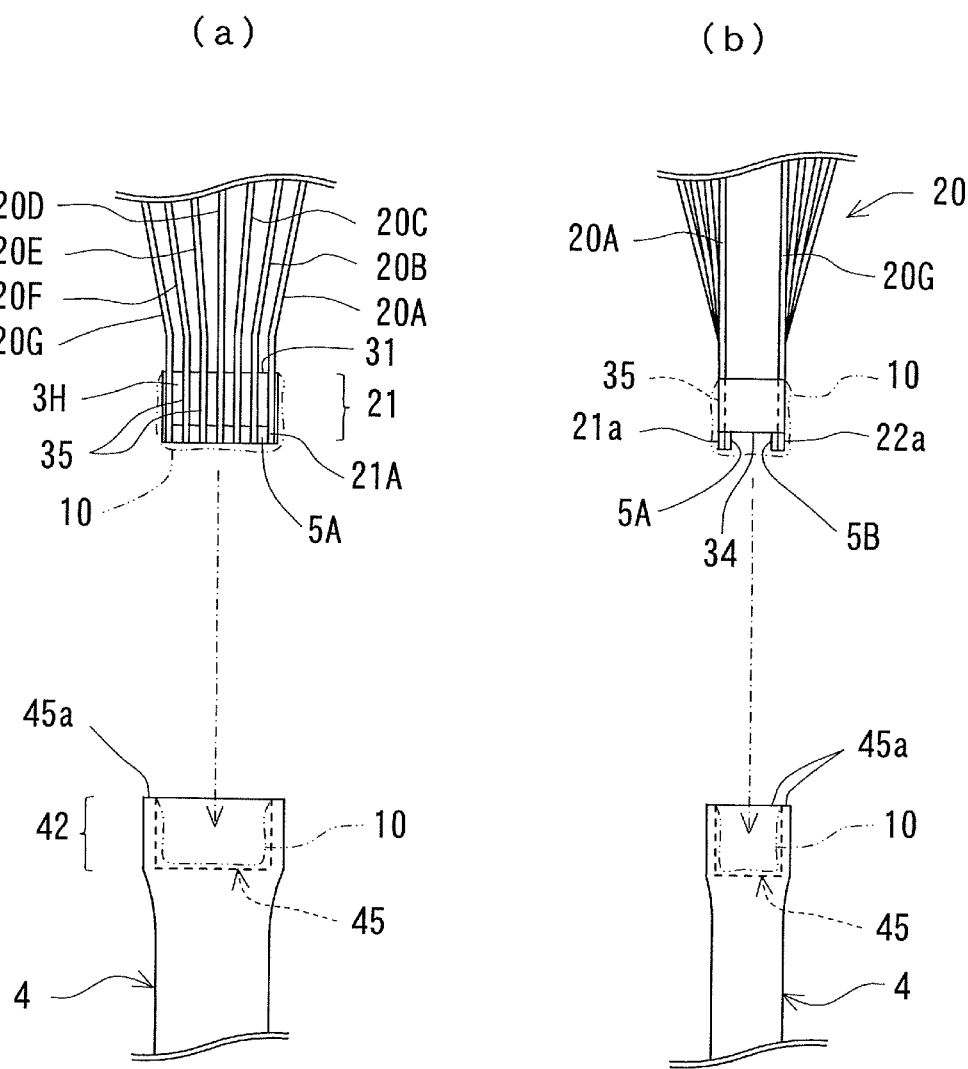
Figure 42:
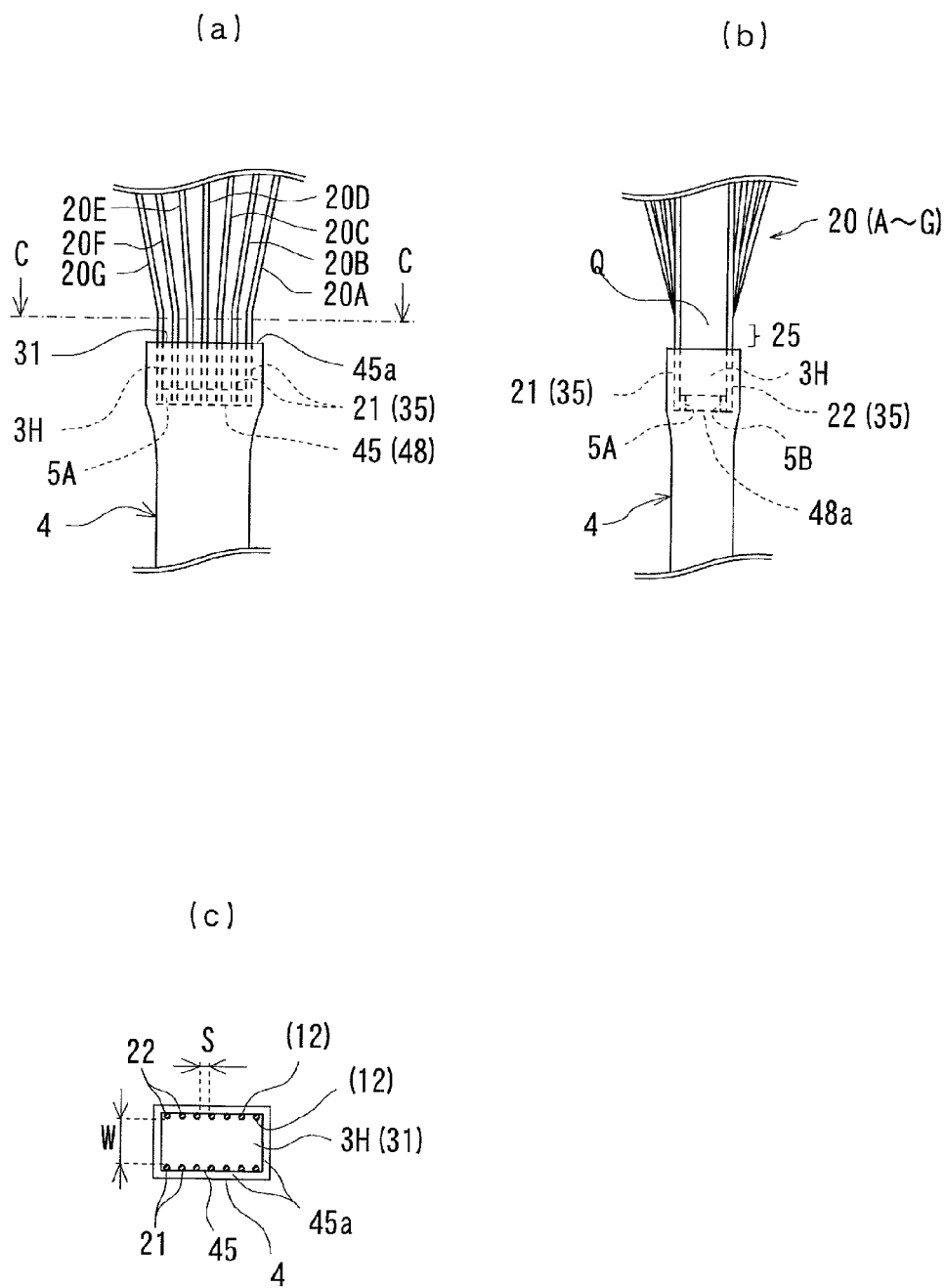

FIGS. 37 to 42 illustrate main parts of a stirrer according to a fifth embodiment. FIG. 37 illustrate a fitting body of the stirrer, FIG. 38 illustrate a handle section of the stirrer, FIGS. 39 to 41 illustrate main manufacturing steps of the stirrer, and FIG. 42 illustrate a part of the stirring section in a completed state.

A stirrer 1H according to the fifth embodiment applies, as the fitting body, a fitting body 3H which has a different configuration, and applies, as the handle section, a handle section 4 which has a different configuration. Other configurations are the same as those of the stirrer 1A of the first embodiment described above. Therefore, the entire appearance of the stirrer 1H is the same as the stirrer 1A illustrated in FIGS. 1 and 2 except for the fitting body 3H.

First, as illustrated in FIG. 37 etc., the fitting body 3H differs from the fitting body 3A of the first embodiment in that the housing recesses 38A and 38B (see FIG. 5) are not formed, but other configurations are substantially common thereto. That is, the fitting body 3H includes the plurality of grooves 35 (having a length extending across the entire region in the height direction) in the long-side lateral surface portions 32A and 32B of the main body portion 30. The main body portion 30 has a height set at the same value as the entire height H (FIG. 5(d)) of the fitting body 3A of the first embodiment, but may have a height set at a different value. The grooves 35 have the same configuration as those of the grooves 35 in the fitting body 3A of the first embodiment.

Further, the handle section 4 includes, as illustrated in FIG. 38 etc., the mounting recess 45 formed so as to include a part having a dimension and shape capable of housing the entire fitting body 3H, and a part having a depth enlarged by the height h (rectangular parallelepiped space) in order to house the connection plates 5A and 5B (having the height h) and (the terminal ends 21a and 22a of) the wire members 20, which are to be protruded from the bottom surface 34 of the fitting body 3H. That is, the recess part deepened by the height h forms a housing recess 48 for housing the connection plates 5A and 5B and the like.

Next, steps of manufacturing the stirrer 1H applying the fitting body 3H and the handle section 4 are described.

First, as illustrated in FIG. 39, the ends 21 and 22 of the respective wire members 20 (A to G) after being subjected to a process of bending into a folded shape are fitted into the grooves 35 of the fitting body 3H, and then the fitting body 3H is caused to slide in the direction of the folded and bent part 26 of the wire member 20, to thereby cause the terminal ends 21a and 22a of the respective wire member ends 21 and 22 to be spaced apart and protruded from the bottom surface portion 34 of the fitting body 3H (first step).

Subsequently, as illustrated in an upper part of FIG. 40, the terminal ends 21a and 22a of the ends 21 and 22 of the respective wire members 20 (A to G) in a state spaced apart and protruded from the fitting body 3H are welded and fixed to the connection plates 5A and 5B arranged on the inner side thereof (second step).

Subsequently, as illustrated in upper and lower parts of FIG. 40, for example, under a state in which the entire respective wire members 20 (A to G) are positionally fixed, the fitting body 3H is caused to slide with respect to the respective wire members 20 (A to G) in a direction indicated by an arrow A along the length direction of the groove 35 to be pulled back (third step). The connection plates 5A and 5B at this time are protruded from the bottom surface portion 34 of the fitting body 3H together with the terminal ends 21a and 22a of the wire members 20 because the connection plates 5A and 5B are brought into contact with the bottom surface portion 34 of the fitting body 3H to stop the sliding.

Subsequently, as illustrated in FIG. 41, the fitting body 3H, which is in a state in which, in the third step, the ends 21 and 22 of the respective wire members 20 (A to G) are fitted into the grooves 35 and a state in which the terminal ends 21a and 22a of the ends 21 and 22 and the connection plates 5A and 5B are protruded from the bottom surface portion 34, is fitted and fixed to the mounting recess 45 of the mounting part 42 of the handle section 4 (fourth step). With this, as illustrated in FIGS. 42(a) and 42(b), the terminal ends 21a and 22a of the ends 21 and 22 of the respective wire members 20 and the connection plates 5A and 5B, which have been in a state protruded from the bottom surface portion 34 of the fitting body 3H, are both housed in the housing recess 48 formed at the bottom part of the mounting recess 45 of the handle section 4 by merely extending the mounting recess 45 in the depth direction.

In this case, as indicated by the two-dot chain line of FIG. 41, the adhesive 10 is applied to the four lateral surface portions 32A, 32B, etc. and the bottom surface portion 34 of the fitting body 3H, and to the inner wall surfaces and the bottom surface of the mounting recess 45 of the handle section 4. Then, the operation of fitting the fitting body 3H to the mounting recess 45 is performed.

In this fourth step, when the adhesive 10 is cured to completely fix the fitting body 3H to the mounting recess 45 of the handle section 4, as illustrated in FIG. 42, the ends 21 and 22 of the respective wire members 20 (A to G) forming the stirring section 2 are mounted to the mounting part 42 of the handle section 4 via the fitting body 3H. With the above-mentioned steps, the stirrer 1H having the appearance as illustrated in FIGS. 1 and 2 etc. is completed and obtained.

At this time, respective opposing parts among the mounting recess 45 of the handle section 4, the fitting body 3H, and the ends 21 and 22 of the respective wire members 20 (A to G) are adhered with the adhesive 10 to be firmly fixed to one another. Further, opposing parts among the connection plates 5A and 5B and the terminal ends 21a and 22a of the wire members, which are protruded from the bottom surface portion 34 of the fitting body 3H, and the housing recess 48 serving as the bottom part of the mounting recess 45 are also adhered with the adhesive 10 to be firmly fixed to one another. In this manner, at those respective opposing parts, the adhesion layer 12 made of the penetrated and cured adhesive 10 is present (FIG. 42(c)), and thus there are no unnecessary gaps at those respective parts.

As a result, the fitting body 3H is firmly fixed to the mounting recess 45 of the handle section 4 and the upper end 45a of the mounting recess 45 without a gap. Further, the ends 21 and 22 of the respective wire members 20 (A to G) are firmly fixed to the directly opposing parts of (the grooves 35 of) the fitting body 3H and the mounting recess 45 without a gap. Further, at this time, also respective opposing parts among the housing recess 48 serving also as the bottom part of the mounting recess 45 of the handle section 4, the terminal ends 21a and 22a of the ends 21 and 22 of the respective wire members 20 (A to G), and the connection plates 5A and 5B are adhered with the adhesive 10 to be firmly fixed to one another. In addition, there are no unnecessary gaps at those respective parts. Thus, the fitting body 3H ensures water-tightness.

Note that, the housing recess 48 of the handle section 4 does not have a shape corresponding to the shape of the connection plate 5 and the like, and has a shape of merely extending the mounting recess 45 of the handle section 4 in the depth direction, and hence there is a space part 48a in the housing recess 48 between the connection plates 5A and 5B, at which the connection plate 5 and the like are absent (FIG. 42(b)). However, this space part 48a is finally filled (embedded) through formation of the adhesion layer 12 with the adhesive 10.

Further, the ends 21 and 22 of the respective wire members 20 (A to G) are mounted to the mounting part 42 of the handle section 4 under a state in which the ends 21 and 22 are arranged in accordance with the desired arrangement condition as described above via the grooves 35 of the fitting body 3H. That is, as illustrated in FIG. 42(c), fitting of the wire members 20 is performed under a state in which the respective wire member ends 21 and 22 are allocated to particularly the grooves 35 of the fitting body 3H having the above-mentioned configuration. Thus, the respective wire member ends 21 and 22 are allocated so as to form two opposing rows spaced with the interval W. Further, the respective wire member ends 21 and 22 in each row are arranged in an adjacent state at intervals S(<W).

Then, the stirrer 1H configured as described above is used similarly to the case of the stirrer 1A according to the first embodiment. Further, the stirring section 2 or the like of the stirrer 1H is cleaned after being used, similarly to the case of the stirrer 1A according to the first embodiment.

Further, in the stirrer 1H, both in the stirring operation and the cleaning operation after the use, liquid such as water used in the operation does not pass between the root parts 25 of the respective wire members 20 (A to G) and the grooves 35 of the fitting body 3H to enter inside the mounting recess 45 of the handle section. Further, such a stirrer 1H which is excellent in so-called water-tightness can be manufactured relatively easily merely through the steps (first to fourth steps) with simple operation contents as described above.

Further, even when the stirrer 1H receives, at the time of the stirring operation or the cleaning operation after the use, an external force such as deformation or vibration of the wire member 20 of the stirring section 2, unnecessary gaps are not generated between the grooves 35 of the fitting body 3H and the root parts 25 of the respective wire members 20. Further, the terminal ends 21a and 22a of the respective wire members 20 are fixed, together with the connection plates 5A and 5B, to the housing recess 48, which is a wide space and serves as the bottom part of the mounting recess 45 of the handle section 4, in a state independent from the fitting body 3H. In addition, the respective wire members 20 are not pulled out from the grooves 35 of the fitting body 3H.

Sixth Embodiment

Figure 43:
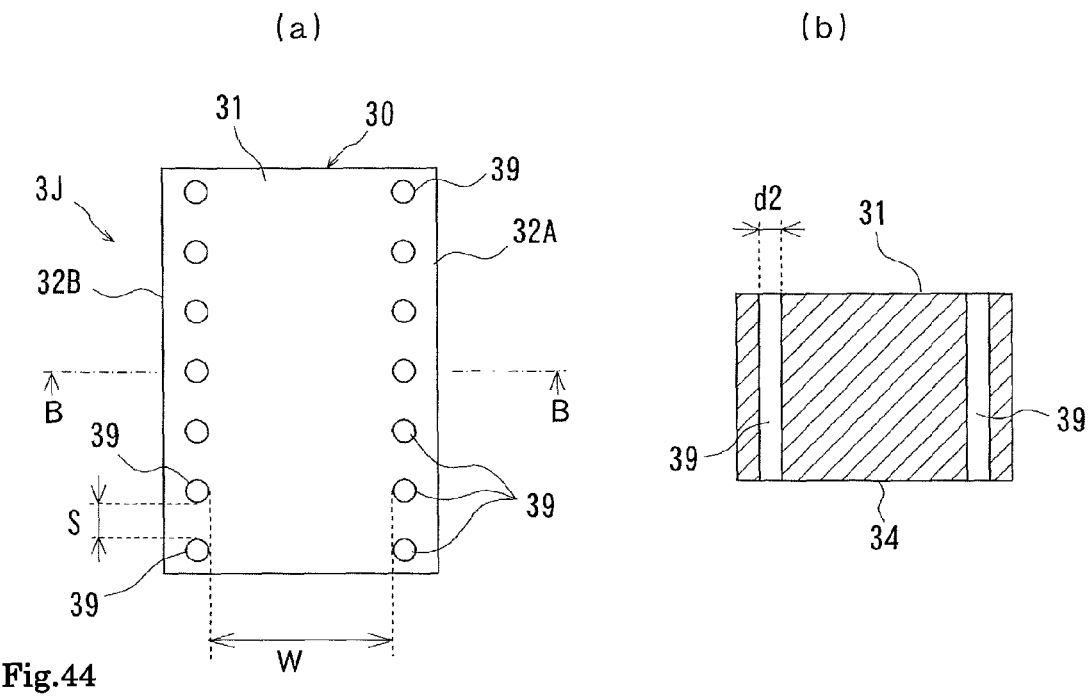
Figure 44:
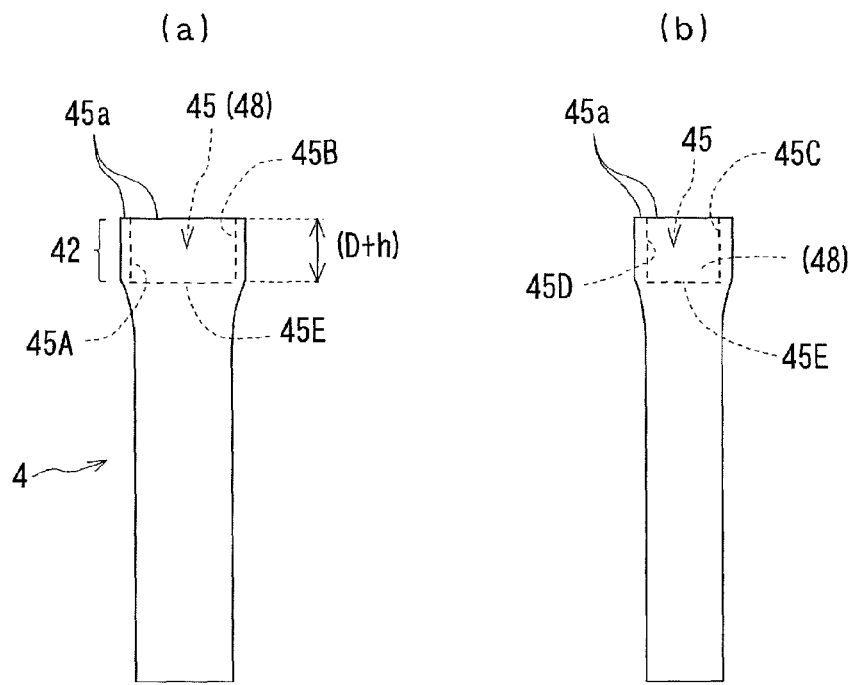
Figure 45:
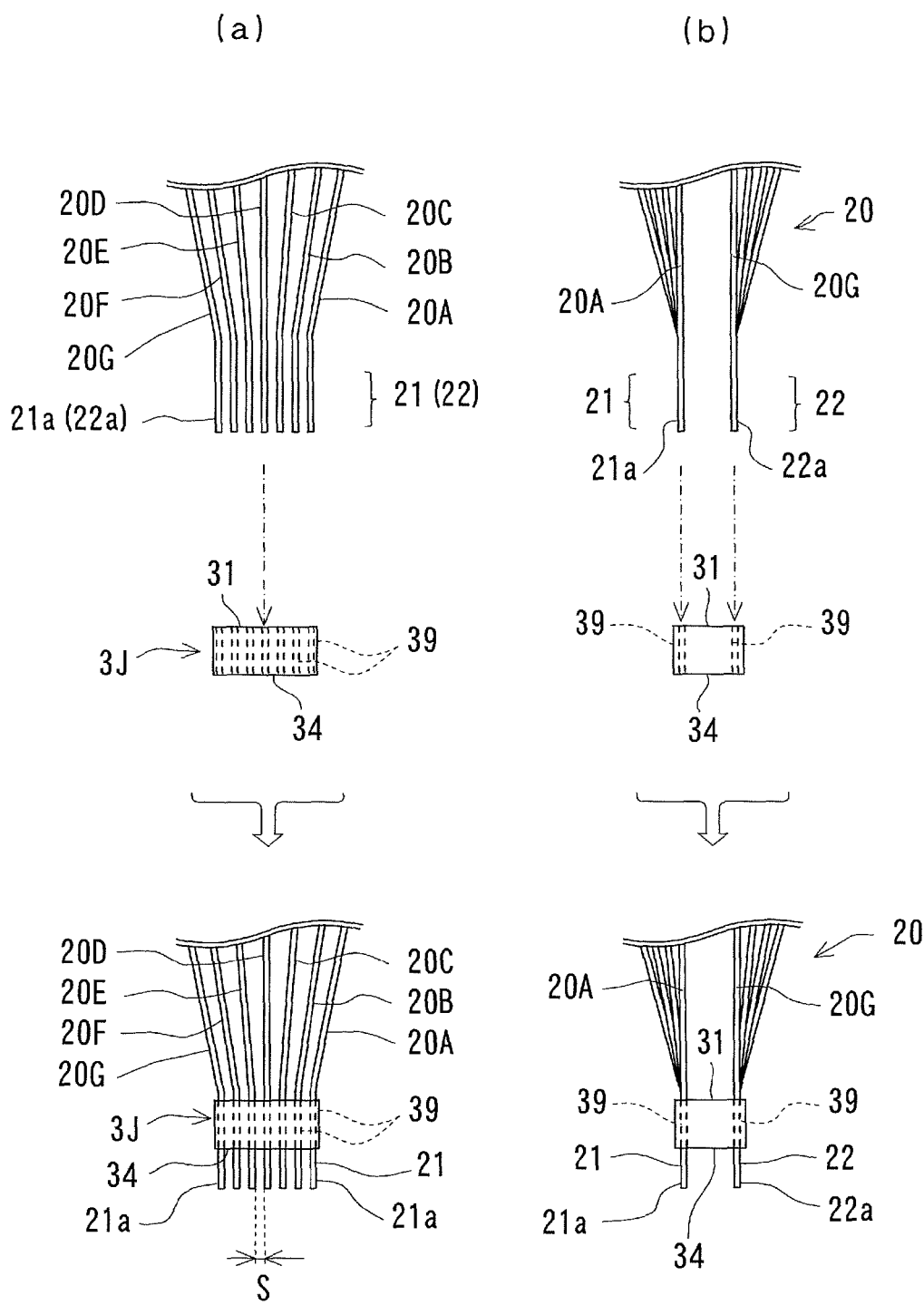
Figure 46:
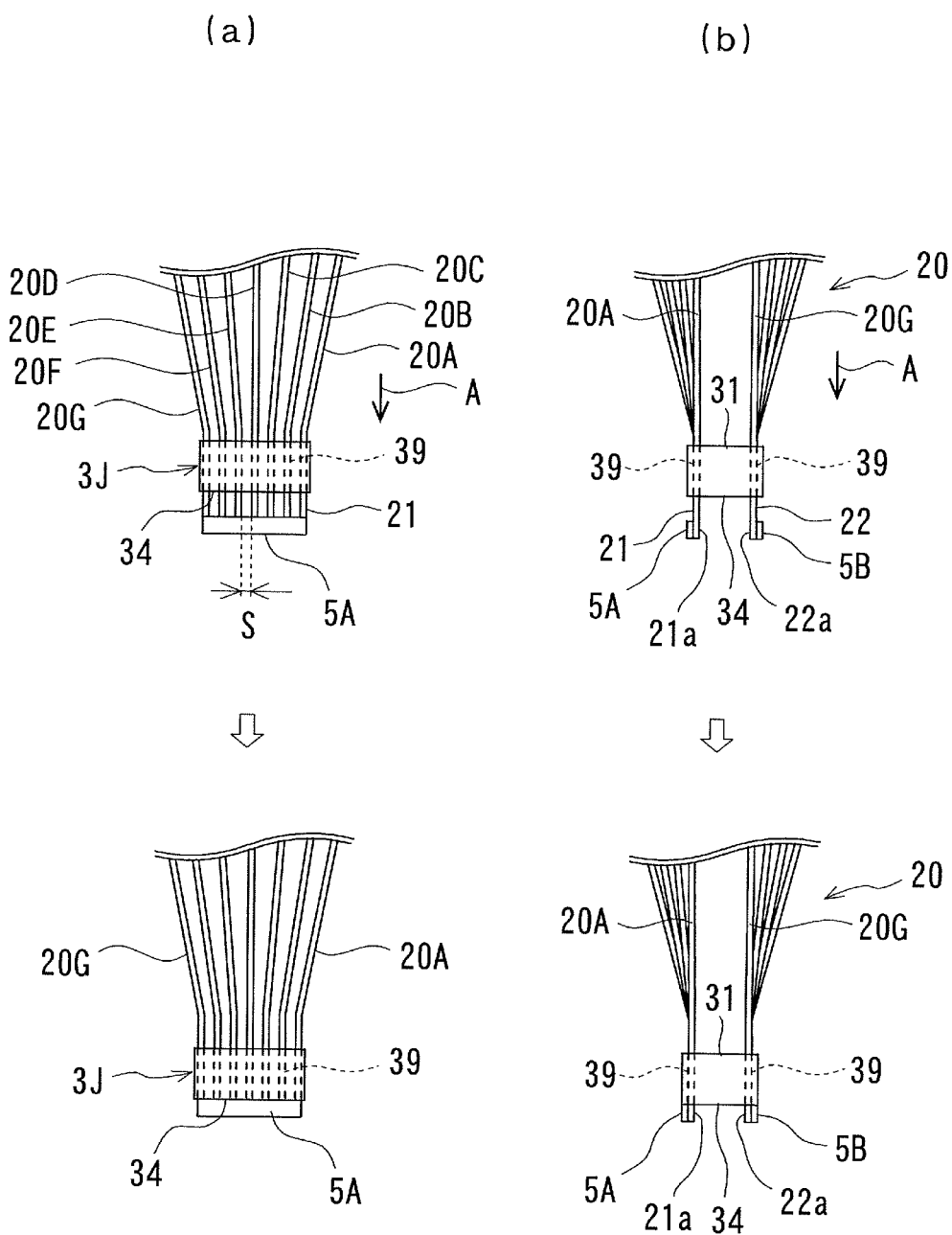
Figure 47:
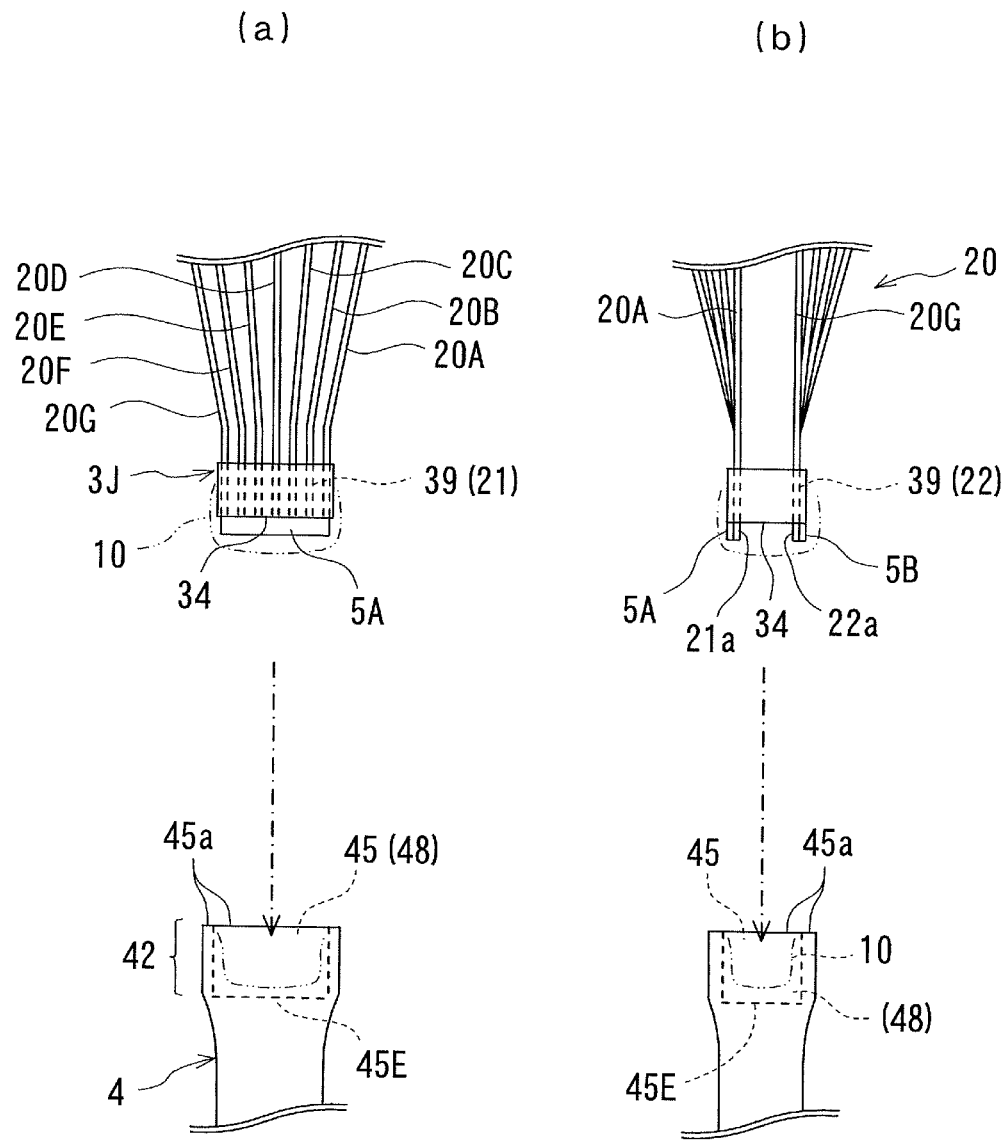
Figure 48:
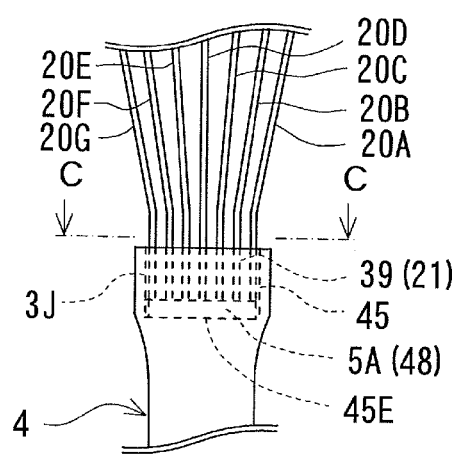
Figure 48:
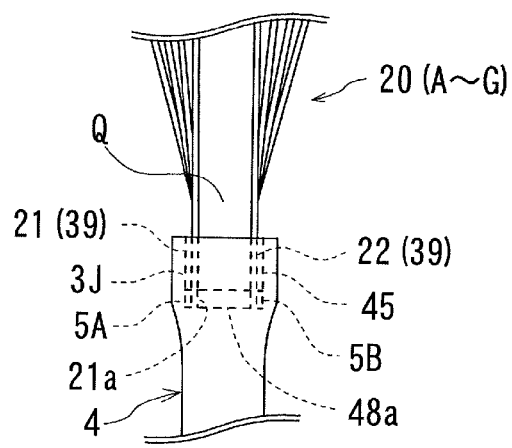
Figure 48:
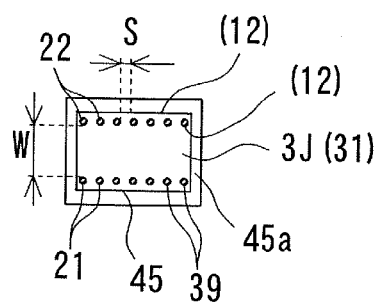

FIGS. 43 to 48 illustrate main parts of a stirrer according to a sixth embodiment. FIG. 43 illustrate a fitting body of the stirrer, FIG. 44 illustrate a handle section of the stirrer, FIGS. 45 to 47 illustrate main manufacturing steps of the stirrer, and FIG. 48 illustrate a part of the stirring section in a completed state.

A stirrer 1J according to the sixth embodiment applies, as the fitting body, a fitting body 3J which has a different configuration, and applies, as the handle section, a handle section 4 which has a different configuration. Other configurations are the same as those of the stirrer 1H of the fifth embodiment described above. Therefore, the entire appearance of the stirrer 1J is the same as the stirrer 1A illustrated in FIGS. 1 and 2 except for the fitting body 3J.

First, as illustrated in FIG. 43 etc., the fitting body 3J differs from the fitting body 3A of the first embodiment in that the housing recesses 38A and 38B (see FIG. 5) are not formed and that through-holes 39 are formed instead of the grooves 35, but other configurations are substantially common thereto. That is, the fitting body 3J includes the plurality of through-holes 39 (having a length extending across the entire region in the height direction) in the vicinity of the inner side of the long-side lateral surface portions 32A and 32B of the main body portion 30. The main body portion 30 has a height set at the same value as the entire height H (FIG. 5(d)) of the fitting body 3A of the first embodiment, but may have a height set at a different value. The through-holes 39 have the same configuration as those of the through-hole 39b in the fitting body 3C of the third embodiment. The hole diameter d2 thereof is set at the same hole diameter d2 as the through-hole 39b.

Further, the handle section 4 includes, as illustrated in FIG. 44 etc., similarly to the handle section 4 of the fifth embodiment, the mounting recess 45 formed so as to include a part having a dimension and shape capable of housing the entire fitting body 3J, and a part having a depth enlarged by the height h (rectangular parallelepiped space) in order to house the connection plates 5A and 5B (having the height h) and (the terminal ends 21a and 22a of) the wire members 20, which are to be protruded from the bottom surface 34 of the fitting body 3J. That is, the recess part (bottom part) deepened by the height h forms a housing recess 48 for housing the connection plates 5A and 5B and the like.

Next, steps of manufacturing the stirrer 1J applying the fitting body 3J and the handle section 4 are described.

First, as illustrated in FIG. 45, the ends 21 and 22 of the respective wire members 20 (A to G) after being subjected to a process of bending into a folded shape are inserted and fitted into the through-holes 39 of the fitting body 3J, and then the fitting body 3J is caused to slide in the direction of the folded and bent part 26 of the wire member 20, to thereby cause the terminal ends 21a and 22a of the respective wire member ends 21 and 22 to be spaced apart and protruded from the bottom surface portion 34 of the fitting body 3J (first step).

Subsequently, as illustrated in an upper part of FIG. 46, the terminal ends 21a and 22a of the ends 21 and 22 of the respective wire members 20 (A to G) in a state spaced apart and protruded from the fitting body 3J are welded and fixed to the connection plates 5A and 5B arranged on the outer side thereof (second step).

Subsequently, as illustrated in upper and lower parts of FIG. 46, for example, under a state in which the entire respective wire members 20 (A to G) are positionally fixed, the fitting body 3J is caused to slide with respect to the respective wire members 20 (A to G) in a direction indicated by an arrow A along the length direction of the through-hole 39 to be pulled back (third step). The connection plates 5A and 5B at this time are protruded from the bottom surface portion 34 of the fitting body 3J together with the terminal ends 21a and 22*a* of the wire members 20 because the connection plates 5A and 5B are brought into contact with the bottom surface portion 34 of the fitting body 3J to stop the sliding.

Subsequently, as illustrated in FIG. 47, the fitting body 3J, which is in a state in which, in the third step, the ends 21 and 22 of the respective wire members 20 (A to G) are fitted into the through-holes 39 and a state in which the terminal ends 21*a* and 22*a* of the ends 21 and 22 and the connection plates 5A and 5B are protruded from the bottom surface portion 34, is fitted and fixed to the mounting recess 45 of the mounting part 42 of the handle section 4 (fourth step). With this, as illustrated in FIGS. 48(*a*) and 48(*b*), the terminal ends 21*a* and 22*a* of the ends 21 and 22 of the respective wire members 20 and the connection plates 5A and 5B, which have been in a state protruded from the bottom surface portion 34 of the fitting body 3J, are both housed in the housing recess 48 formed at the bottom part of the mounting recess 45 of the handle section 4 by merely extending the mounting recess 45.

In this case, as indicated by the two-dot chain line of FIG. 47, the adhesive 10 is applied to the bonding portions among the four lateral surface portions 32A, 32B, 33A, and 33B and the bottom surface portion 34 of the fitting body 3J. Further, the adhesive 10 is also applied to the inner wall surfaces 45A, 45B, 45C, and 45D and the bottom surface 45E of the mounting recess 4 of the handle section 4. Then, the operation of fitting the fitting body 3J to the mounting recess 45 is performed. In this case, for example, at the time point at which the connection plate 5 or the like protruding from the bottom surface portion 34 of the fitting body 3J is brought into contact with the bottom surface 45E of the mounting recess 45, the operation of fitting the fitting body 3J is completed. With this, similarly to the case of the fifth embodiment, the connection plate 5 and the terminal ends 21*a* and 22*a* of the wire members are housed in the housing recess 48 present on the bottom surface 45E side of the mounting recess 45.

In this fourth step, when the adhesive 10 is cured to completely fix the fitting body 3J to the mounting recess 45 of the handle section 4, as illustrated in FIG. 48, the ends 21 and 22 of the respective wire members 20 (A to G) forming the stirring section 2 are mounted to the mounting part 42 of the handle section 4 via the fitting body 3J. With the above-mentioned steps, the stirrer 1J having the appearance as illustrated in FIGS. 1 and 2 etc. is completed and obtained.

At this time, respective opposing parts among the mounting recess 45 of the handle section 4, the fitting body 3J, and the ends 21 and 22 of the respective wire members 20 (A to G) are adhered with the adhesive 10 to be firmly fixed to one another. Further, opposing parts among the connection plates 5A and 5B and the terminal ends 21*a* and 22*a* of the wire members, which are protruded from the bottom surface portion 34 of the fitting body 3J, and the housing recess 48 serving also as the bottom part of the mounting recess 45 are adhered with the adhesive 10 to be firmly fixed to one another. As described above, at those respective opposing parts, the adhesion layer 12 made of the penetrated and cured adhesive 10 is present (FIG. 48(*c*)), and thus there are no unnecessary gaps at those respective parts.

As a result, the fitting body 3J is firmly fixed to the mounting recess 45 of the handle section 4 and the upper end 45*a* of the mounting recess 45 without a gap. Further, the ends 21 and 22 of the respective wire members 20 (A to G) are firmly fixed to the directly opposing parts of (the through-holes 39 of) the fitting body 3J and the mounting recess 45 without a gap. Further, at this time, also respective opposing parts among the housing recess 48 serving also as the bottom part of the mounting recess 45 of the handle section 4, the terminal ends 21*a* and 22*a* of the ends 21 and 22 of the respective wire members 20 (A to G), and the connection plates 5A and 5B are adhered with the adhesive 10 to be firmly fixed to one another. In addition, there are no unnecessary gaps at those respective parts. Thus, the fitting body 3J ensures water-tightness. Note that, the housing recess 48 of the handle section 4 does not have a shape corresponding to the shape of the connection plate 5 and the like, and has a shape of merely extending the mounting recess 45 of the handle section 4 in the depth direction, and hence, similarly to the case of the fifth embodiment, there is the space part 48*a* in the housing recess 48 between the connection plates 5A and 5B, at which the connection plate 5 and the like are absent (FIG. 48(*b*)). However, this space part 48*a* is finally filled (embedded) through formation of the adhesion layer 12 with the adhesive 10.

Further, the ends 21 and 22 of the respective wire members 20 (A to G) are mounted to the mounting part 42 of the handle section 4 under a state in which the ends 21 and 22 are arranged in accordance with the desired arrangement condition as described above via the through-holes 39 of the fitting body 3J. That is, as illustrated in FIG. 48(*c*), fitting of the wire members 20 is performed under a state in which the respective wire member ends 21 and 22 are allocated to particularly the through-holes 39 of the fitting body 3J having the above-mentioned configuration. Thus, the respective wire member ends 21 and 22 are allocated so as to form two opposing rows spaced with the interval W. Further, the respective wire member ends 21 and 22 in each row are arranged in an adjacent state at intervals S(<W).

Then, the stirrer 1J configured as described above is used similarly to the case of the stirrer 1A according to the first embodiment. Further, the stirring section 2 or the like of the stirrer 1J is cleaned after being used, similarly to the case of the stirrer 1A according to the first embodiment.

Further, in the stirrer 1J, both in the stirring operation and the cleaning operation after the use, liquid such as water used in the operation does not pass between the root parts 25 of the respective wire members 20 (A to G) and the through-holes 39 of the fitting body 3J to enter inside the mounting recess 45 of the handle section. Further, such a stirrer 1J which is excellent in so-called water-tightness can be manufactured relatively easily merely through the steps (first to fourth steps) with simple operation contents as described above.

Further, even when the stirrer 1J receives, at the time of the stirring operation or the cleaning operation after the use, an external force such as deformation or vibration of the wire member 20 of the stirring section 2, unnecessary gaps are not generated between the through-holes 39 of the fitting body 3J and the root parts 25 of the respective wire members 20. Further, the terminal ends 21*a* and 22*a* of the respective wire members 20 are fixed, together with the connection plates 5A and 5B, to the housing recess 48, which is a wide space and serves as the bottom part of the mounting recess 45 of the handle section 4, in a state independent from the fitting body 3J. In addition, the respective wire members 20 are not pulled out from the through-holes 39 of the fitting body 3J.

(Evaluation Test)

Here, the following evaluation test was performed with use of the stirrer 1B according to the second embodiment. First, test 1 was performed for examining the weight change of the stirrer 1B when an unused (no-load) new stirrer was subjected to water immersion and hot water (boiled water) immersion. In addition, test 2 was performed for examining the weight change of the stirrer 1B when a stirrer, which had been subjected to application of a certain deformation load, was subjected to water immersion and hot water immersion.

In the water immersion, 15 liters of water (water temperature of 25° C.) is poured into a cylindrical pail having the inner diameter of 285 mm, the height of 350 mm, and the volume of 20 liters. Then, the stirrer 1B as a specimen is left therein for a certain time period (1 hour and 4 hours) under a state in which the attitude is set so that the stirring section 2 is down and the entire stirrer is immersed into the water. In the hot water immersion, 10 liters of water poured into a pot for boiling having the inner diameter of 320 mm, the height of 160 mm, and the volume of 13 liters is boiled. Under this state, the stirrer 1B as a specimen is immersed into the hot water in the same attitude as in the case of the water immersion, and is left for the same certain time period. The measurement of the weight of the new stirrer 1B as the specimen was performed by measuring the weight of the specimen before immersion with weighing equipment (minimum scale of 0.1 g), and by measuring the weight of the specimen, which has been taken out after the water immersion and the hot water immersion and had its moisture sufficiently wiped with a waste cloth, with the same weighing equipment. Table 1 shows the results of test 1 at this time (increase/decrease amount of weight).

Figure 25:
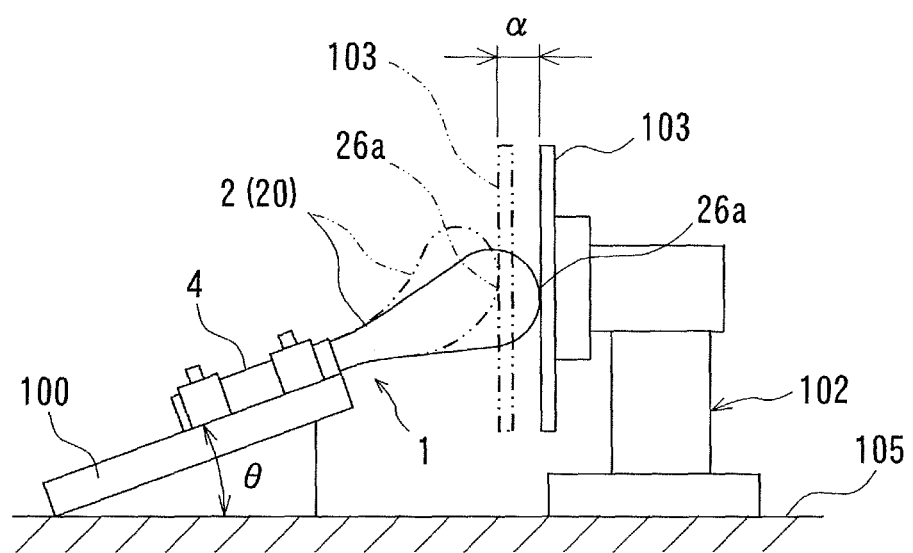
FIG. 25 is an explanatory view illustrating a state of load operation in an evaluation test.

Further, with regard to the deformation load to the stirrer 1B, as illustrated in FIG. 25, the stirrer 1B as the specimen is fixed to a mounting part of a fixation base 100 having an inclination angle θ of 25°, and a pressure plate 103 of a pressure device 102 is pressed against to the top portion 26a of the stirring section 2 in a state protruded from an upper end of the fixation base 100, thereby applying a certain load to cause deformation. Reference symbol 105 in FIG. 25 represents a floor or a table. The load at this time was set as a load in a condition that the position of the top portion 26a of the stirring section 2 was shifted and deformed by a distance α of 25 mm. This load was repeatedly applied for 1,000 times (load time period for one time was about 1 second). Then, the stirrer 1B, which had been subjected to application of this load, was subjected to the water immersion and the hot water immersion described above in the same condition, and the weight change at this time was similarly measured. Table 1 also shows the results of test 2 at this time (increase/decrease amount of weight).

TABLE 1

|  | Test 1 (no load) | Test 2 (load applied) |
| --- | --- | --- |
| Weight before immersion | 138.2 g | 138.3 g |
| Weight change after water immersion (1 hour/4 hours) | 0.0 g/0.0 g | 0.0 g/0.0 g |
| Weight change after hot water immersion (1 hour/4 hours) | 0.0 g/0.0 g | 0.0 g/0.0 g |

As is clear from the results of Table 1, the stirrer 1B has no weight change in both cases of test 1 and test 2. Thus, it is understood that no moisture penetration occurs, and excellent water-tightness with respect to moisture is obtained. Note that, according to the present invention, the evaluation test was similarly performed with respect to the stirrers 1A, 1C, 1D, 1H, and 1J according to the first, third, and fourth to sixth embodiments, and it was confirmed that the same results were obtained in both cases of test 1 and test 2.

Other Embodiments

FIGS. 26 to 29 illustrate a configuration example (main part) of the stirrer 1 in a case where a handle section having a hollow structure is applied as the handle section 4.

Figure 26:
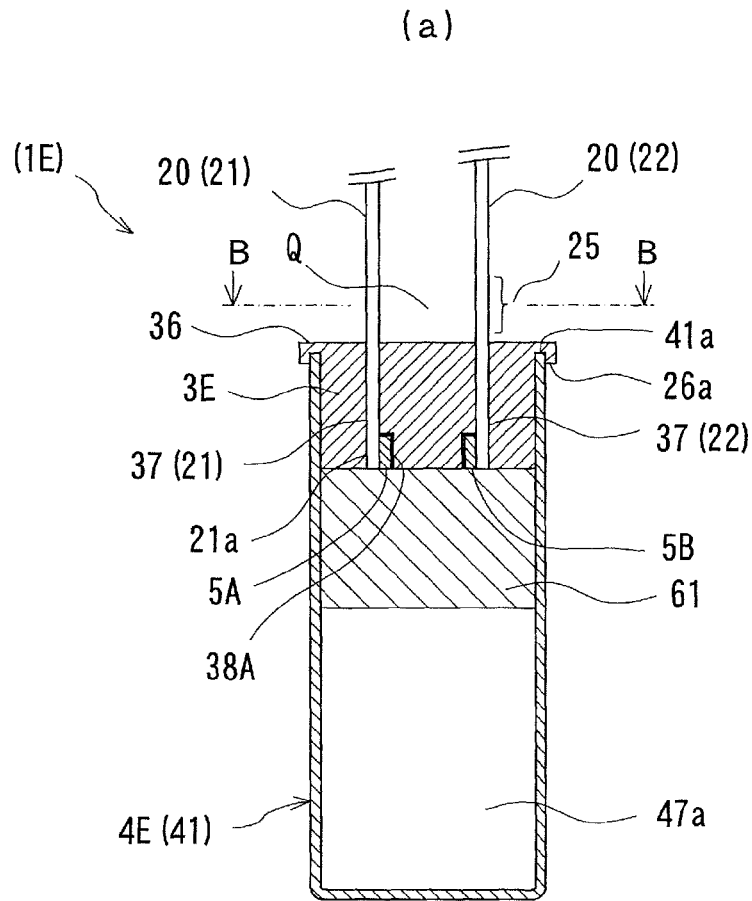
Figure 26:
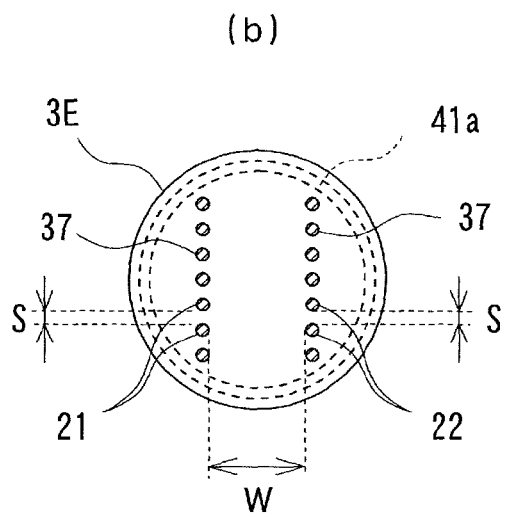

A stirrer 1E illustrated in FIG. 26 is a configuration example of a case where a handle section 4E including a cylindrical handle main body 41, which has one opened end, is applied as the handle section 4. This stirrer 1E is a stirrer in which a filling member 61 for preventing water penetration is mounted so as to be fitted inside the handle main body 41 of the handle section 4E, and then a fitting body 3E having the ends 21 and 22 of the wire members 20 of the stirring section 2 fitted thereinto is fitted and fixed to a space portion (corresponding to the mounting recess 45) provided above the filling member 61 of the handle main body 41 of the handle section 4E. The stirring section 2 has the same configuration as those of the first to fourth embodiments.

Figure 27:
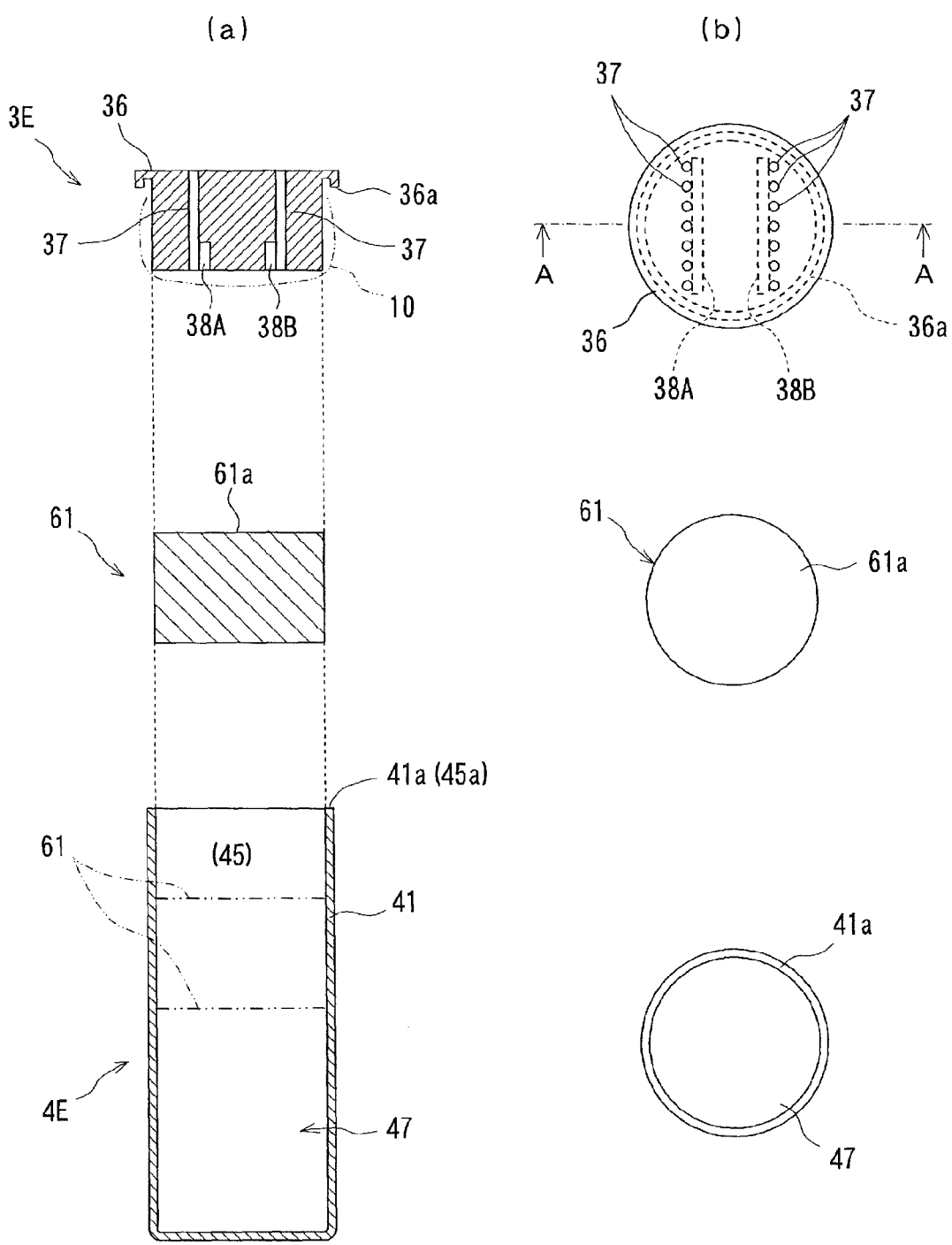

The handle section 4E is, as illustrated in a lower part of FIG. 27 etc., a cylindrical member having one opened end, and has a columnar space 47 inside. As the handle section 4E, for example, a metal cylindrical pipe is used. In FIG. 26 etc., reference symbol 41a represents an edge (upper end) of an opening portion.

The filling member 61 is a member which is mounted so as to be fitted inside the space 47 of the handle section 4E, for preventing liquid such as water from entering inside the space 47 from the fitting body 3E side. As illustrated in a middle part of FIG. 27 etc., the filling member 61 is formed to have a shape capable of being fitted inside the space 47 of the handle section 4E, and for example, a member having a columnar shape is used. Further, the filling member 61 is only required to have physical properties capable of blocking passage of liquid, and may be made of a material such as a non-foaming synthetic resin, rubber, and closed-pore foam. As exemplified in the lower part of FIG. 27, the filling member 61 is mounted in a state in which a space (space corresponding to the mounting recess 45) is left at an upper part of the space 47 of the handle section 4E so that the fitting body 3E can be fitted into the space. The filling member 61 is generally formed so as to be fixed at a required position of the space 47, but may be mounted in an unfixed state as long as the filling member 61 can block the passage of the liquid. The filling member 61 can be fixed to the space 47 by, for example, mounting, by press fitting, the filling member 61 set to have an outer diameter slightly larger than the inner diameter of the space 47 of the handle section 4E, or applying the adhesive 10 to the outer diameter part of the filling member 61 and then performing fitting.

As the fitting body 3E, for example, a fitting body having substantially the same configuration as the fitting body 3B (FIG. 11) of the second embodiment can be applied. In this case, the entire appearance shape of the fitting body 3E may be a columnar shape corresponding to the space 47 of the cylindrical handle section 4. Further, also in this fitting body 3E, similarly to the case of the fitting body 3B of the second embodiment, as illustrated in an upper part of FIG. 27, there are similarly formed the through-holes 37 into which the ends 21 and 22 of the wire members 20 forming the stirring section 2 are fitted, and the housing recesses 38A and 38B for housing the connection plates 5A and 5B and the like. Further, the lid portion 36 and the fitting frame portion 36a are similarly formed. The through-hole 37 may be a through-hole having a two-stage configuration in which the hole diameter d varies, similarly to the through-hole 39 of the fitting body 3C of the third embodiment.

The manufacturing of the stirrer 1E can be performed basically through substantially the similar manufacturing steps (first to fourth steps illustrated in FIGS. 12 to 14 or FIGS. 17 and 18) of the stirrers 1B and 1C according to the second and third embodiments. The only different point is that it is necessary to perform a step of mounting the filling member 61 inside the space 47 of the handle section 4E (special step) before the fourth step. The mounting operation of the filling member 61 may be performed together with the operation of fitting the fitting body 3E to the mounting part of the handle section.

Further, the fitting body 3E in a state in which, owing to the operations up to the third step, the ends 21 and 22 of the respective wire members 20 (A to G) forming the stirring section 2 are fitted therein is fitted and fixed to the upper space (45) of the space 47 formed after the filling member 61 of the handle section 4E is mounted (fourth step). At this time, opposing parts of the fitting body 3E and (an upper surface 61*a* of) the filling member 61 are adhered with the adhesive 10 (FIG. 27). Further, the upper end 41*a* of the opening portion of the handle section 4E is covered from above and lateral surfaces by the lid portion 36 and the fitting frame portion 36*a* of the fitting body 3E.

The stirrer 1E configured as described above may be used similarly to the case of, for example, the stirrer 1B according to the second embodiment. Further, the stirring section 2 or the like of the stirrer 1E is cleaned after being used similarly to the case of the stirrer 1B according to the second embodiment.

Further, in the stirrer 1E, both in the stirring operation and the cleaning operation, liquid such as water used in the operation does not pass between the root parts 25 of the respective wire members 20 (A to G) and the through-holes 37 of the fitting body 3E to enter inside the inner space 47 (mounting recess 45) of the handle section 4E. Further, liquid does not pass between the fitting body 3E and the upper end 41*a* of the handle section 4E to enter inside the inner space 47 (mounting recess 45) of the handle section 4E. Even when the liquid enters from the through-holes 37 of the fitting body 3E or from a gap between the fitting body 3E and the handle main body 41, the filling member 61 present below the fitting body 3E prevents the liquid from further entering therein. With this, there is no fear that the liquid enters inside a space 47*a* (FIG. 26) present below the filling member 61. Further, such a stirrer 1E which is excellent in water-tightness as described above can be manufactured relatively easily merely through the steps (first to fourth steps and special step) with simple operation contents as described above. Note that, the entire space 47*a* present below the filling member 61 may be filled and eliminated with the filling member 61.

Figure 28:
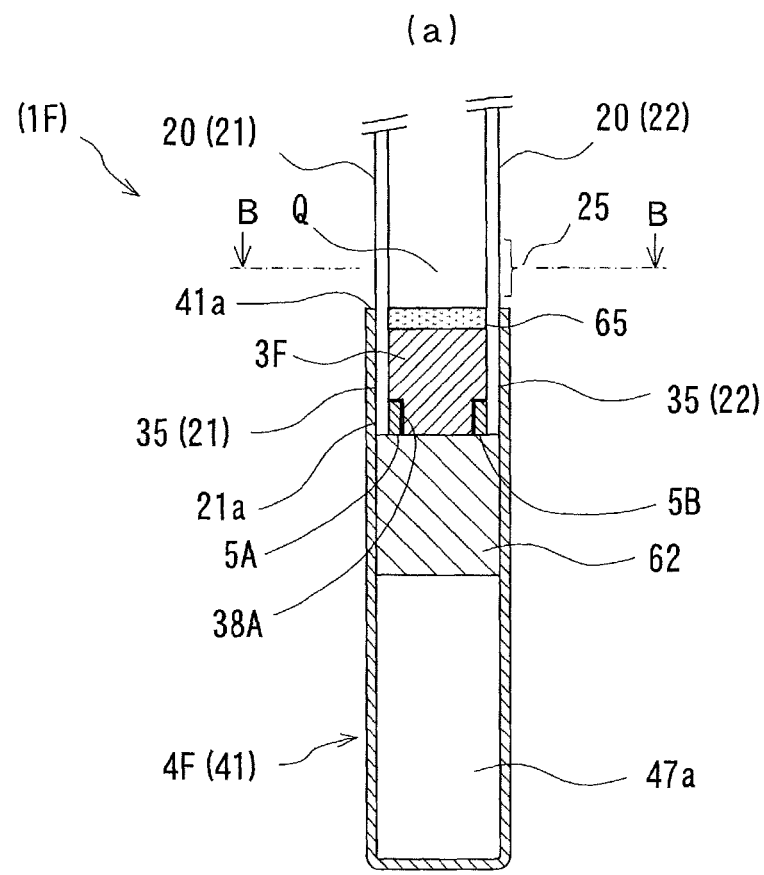
Figure 28:
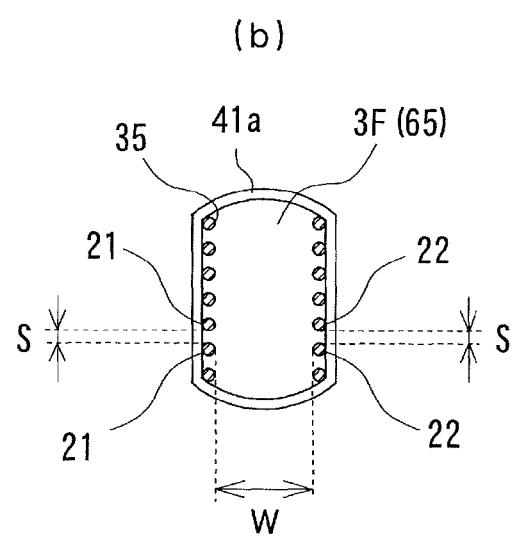

A stirrer 1F illustrated in FIG. 28 is a configuration example of a case where a handle section 4F including an oval (elliptical) handle main body 41, which has one opened end, is applied as the handle section 4. The stirrer 1F basically has the same configuration as the stirrer 1E illustrated in FIG. 27 except that appearance shapes of a filling member 62 for preventing water penetration and a fitting body 3F are changed in accordance with the shape of the inner space 47 of the handle section 4F (which has been changed from a circle shape to an oval shape in cross section), and that a shape in accordance with that of the fitting body 3A including the grooves 35 of the first embodiment is applied for the fitting body 3F.

Figure 29:
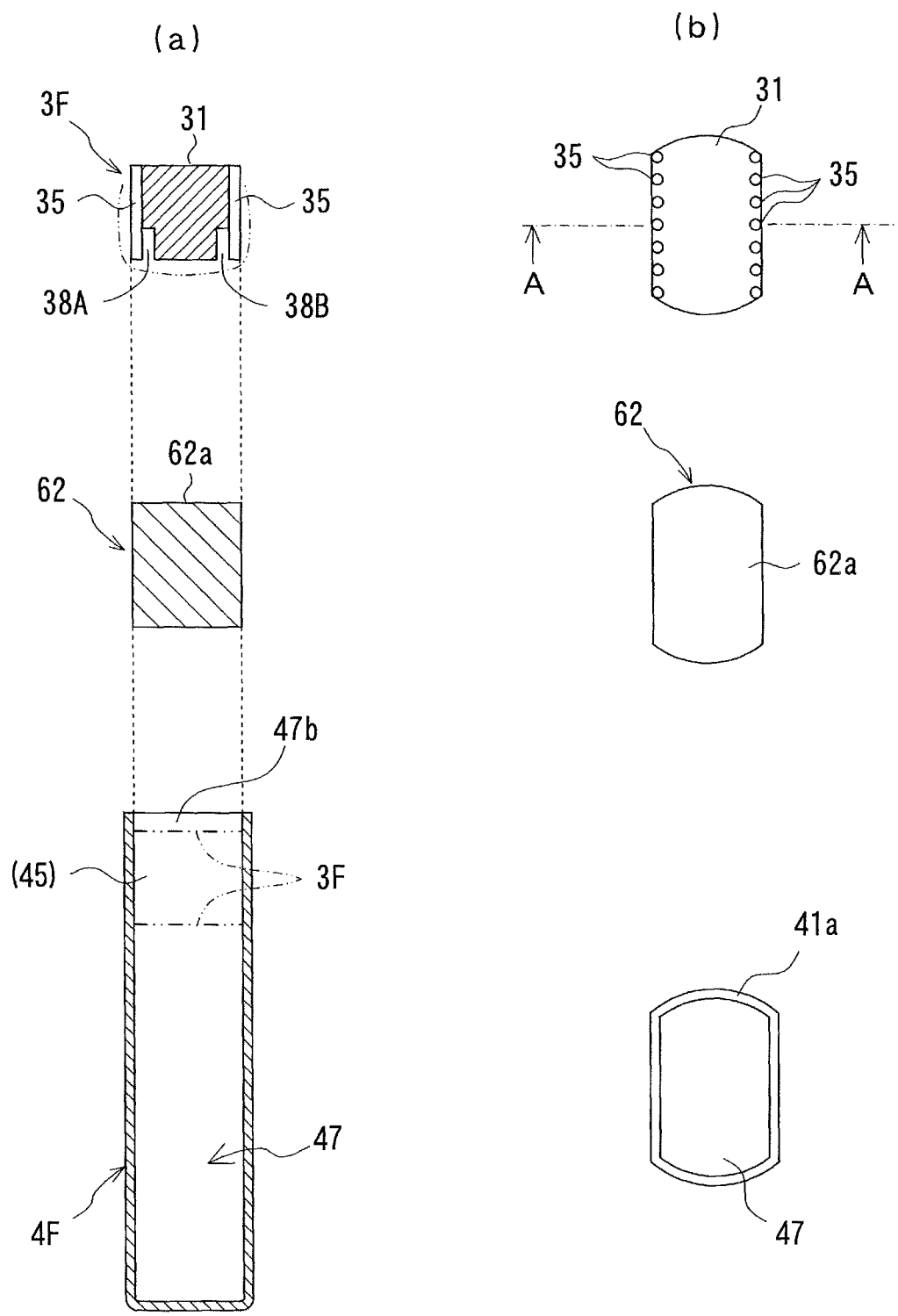

Further, in the stirrer 1F, as exemplified in FIG. 29, the fitting body 3F is mounted in a state in which there is formed a space 47*b* at an upper part of the space 47 of the handle section 4F, for forming a water penetration preventing layer above the upper surface 31 of the fitting body 3F. Then, after the fitting body 3F is fitted and fixed inside the space 47 of the handle section 4F at a required position, a water penetration preventing layer 65 made of a material having physical properties capable of preventing water penetration inside the space 47*b* (for example, a liquid epoxy resin, urethane resin, and acrylic resin) is formed. The water penetration preventing layer 65 is formed so that an upper surface thereof has the same height as the upper end 41*a* of the handle section 4F.

Figure 30:
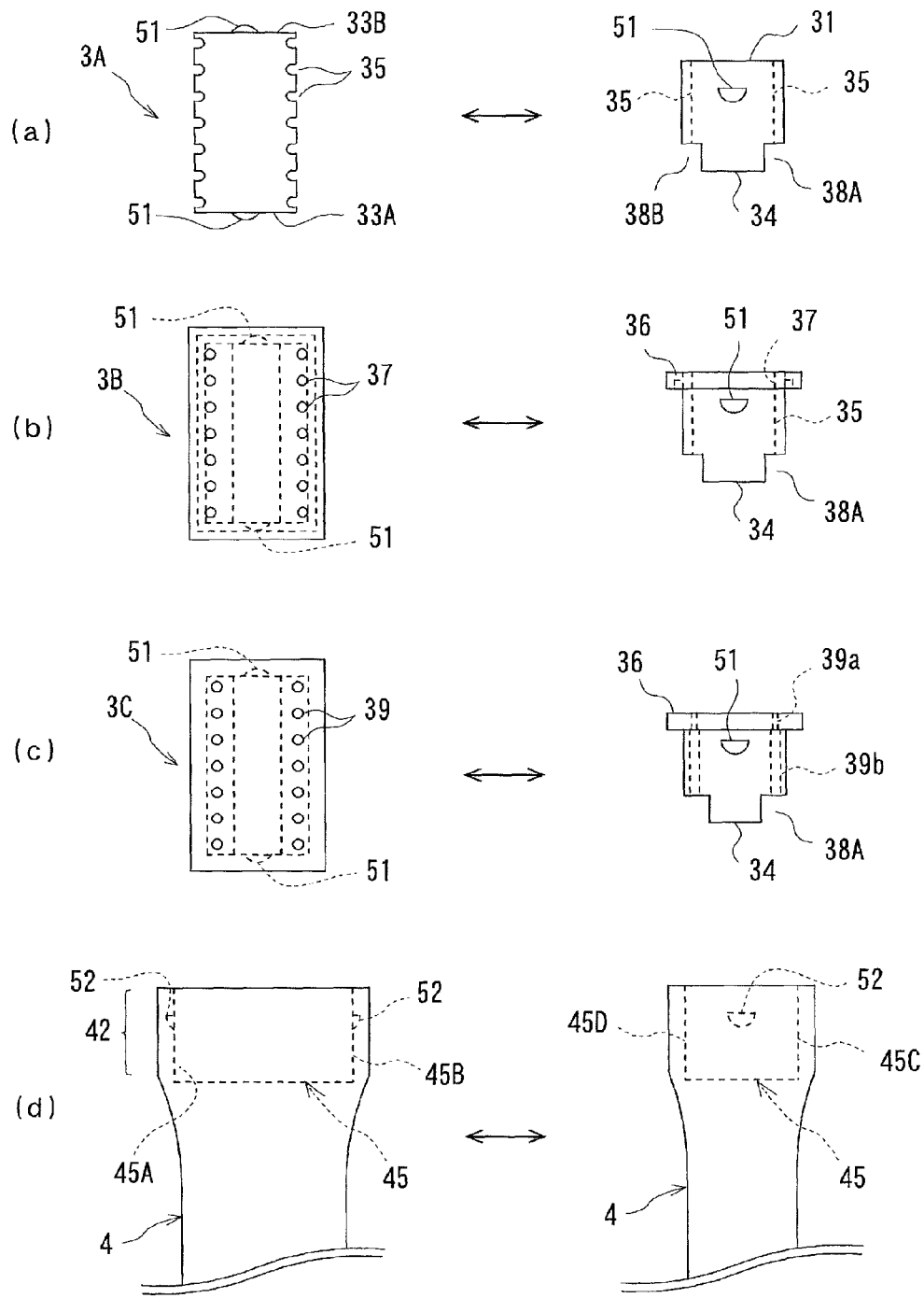

As other configuration examples, in the first to fourth embodiments, regarding the fixing of the fitting bodies 3A to 3D to the mounting recess 45 of the handle section 4, as illustrated in FIG. 30, for example, protruding portions 51 may be formed at the respective lateral surface portions 33A and 33B of each of the fitting bodies 3A to 3C, and engagement recesses (concave portions) 52 into which the protruding portions 51 gain entry to be fixed (engaged), respectively, may be formed at the respective inner wall surfaces 45A and 45B of the mounting recess 45 corresponding to the lateral surface portions 33A and 33B. FIGS. 30(*a*) to 30(*c*) illustrate on the left side the fitting bodies 3A to 3C, respectively, in a state when viewed from the upper surface side thereof, and illustrate on the right side the fitting bodies 3A to 3C, respectively, in a state when viewed from one lateral side thereof. Further, FIG. 30(*d*) illustrates on the left side the mounting part 42 of the handle section 4 in a state when viewed from the front side thereof, and illustrates on the right side the mounting part 42 in a state when viewed from one lateral side thereof.

In this case, when each of the fitting bodies 3A to 3C is fitted and fixed to the mounting recess 45 of the handle section 4, the protruding portions 51 on the fitting body 3 side gain entry into the engagement recesses 52 on the mounting recess 45 side to be fixed. With this, each of the fitting bodies 3A to 3C and the mounting recess 45 are more firmly fixed to each other, and each of the fitting bodies 3A to 3C may be prevented from being dropped out from the mounting recess 45 of the handle section 4. The conditions such as number, shape, and formation position of such protruding portions 51 and engagement recesses 52 may be changed as appropriate. Further, the protruding portions 51 may be formed on the mounting recess 45 side, and the engagement recesses 52 may be formed on the fitting body 3 side. Such a fixing mode which uses the combination of the protruding portion 51 and the engagement recess 52 as described above may be similarly applied to the other fitting bodies 3D to 3G or the fitting bodies 3H to 3J of the fifth and sixth embodiments.

Figure 31:
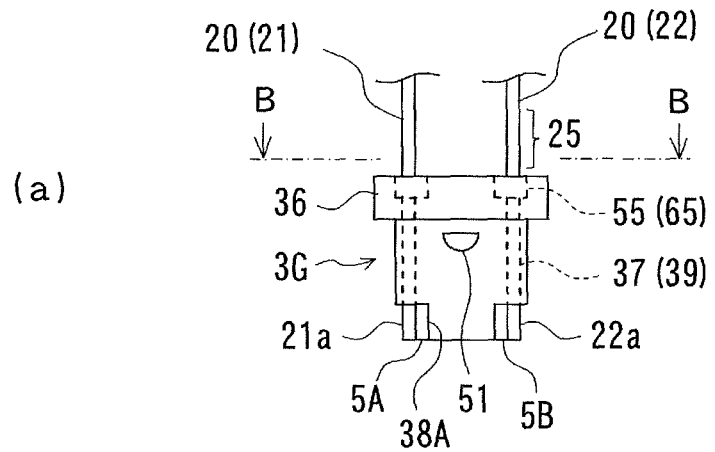
Figure 31:
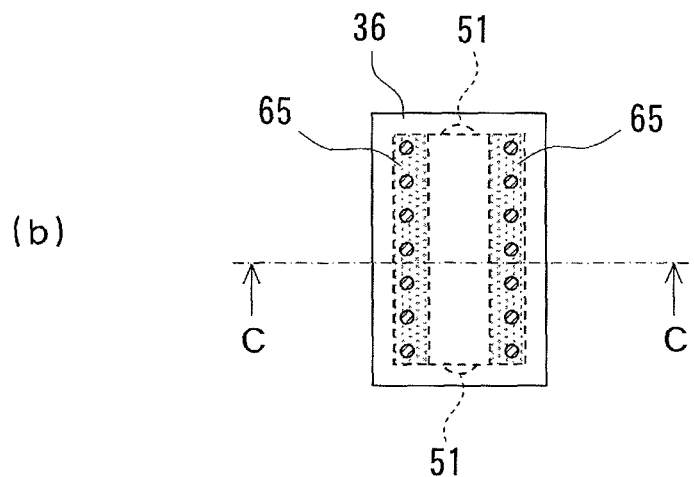
Figure 31:
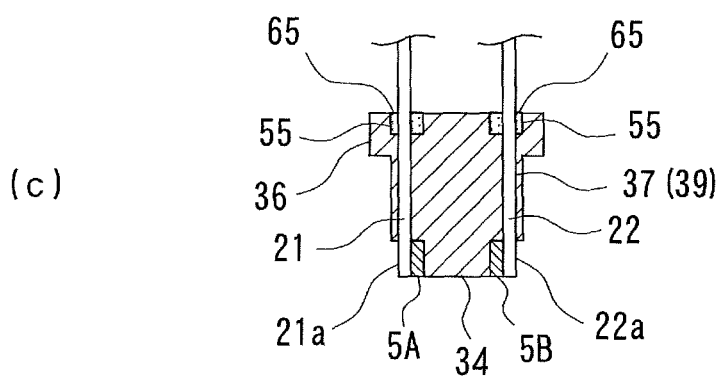
Figure 32:
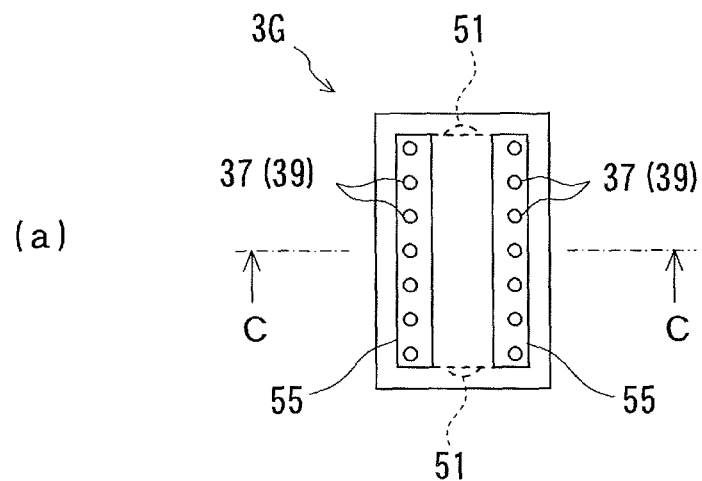
Figure 32:
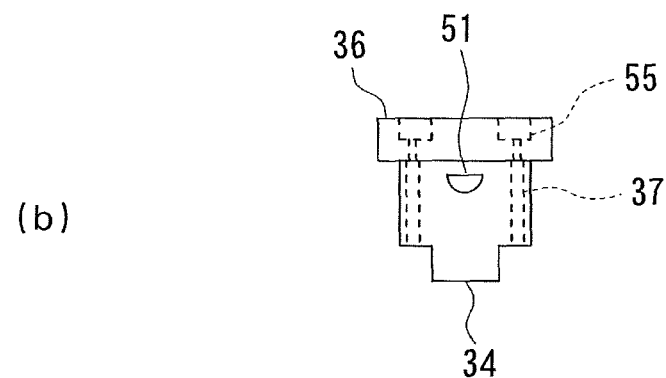
Figure 32:
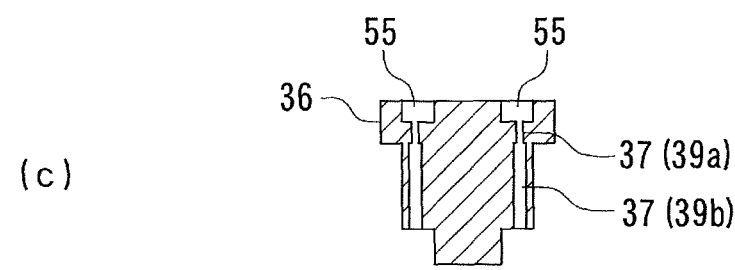

Further, as the fitting body 3 including the through-holes 37 or 39, as illustrated in FIGS. 31 and 32, there may be applied a fitting body 3G including recesses 55 for forming water penetration preventing layers 65 at peripheries in the fitting body upper surface including the through-holes 37 or 39. The recess 55 is formed to have, for example, a depth substantially half the thickness of the lid portion 36. The water penetration preventing layer 65 is a layer made of a liquid resin material as described above. The water penetration preventing layer 65 is formed by, at a stage after the ends 21 and 22 of the wire members 20 are mounted to the fitting body 3G, filling, into the recesses 55, a formation material for the preventing layer 65 with, for example, a liquid resin injection apparatus or a liquid resin dropping apparatus, and curing the liquid resin.

When the fitting body 3G including the recesses 55 is applied and the water penetration preventing layers 65 are formed, it is possible to further reliably prevent moisture from entering the gap between the root parts 25 of the wire members 20 forming the stirring section 2 and the through-holes 37 or 39.

Figure 33:
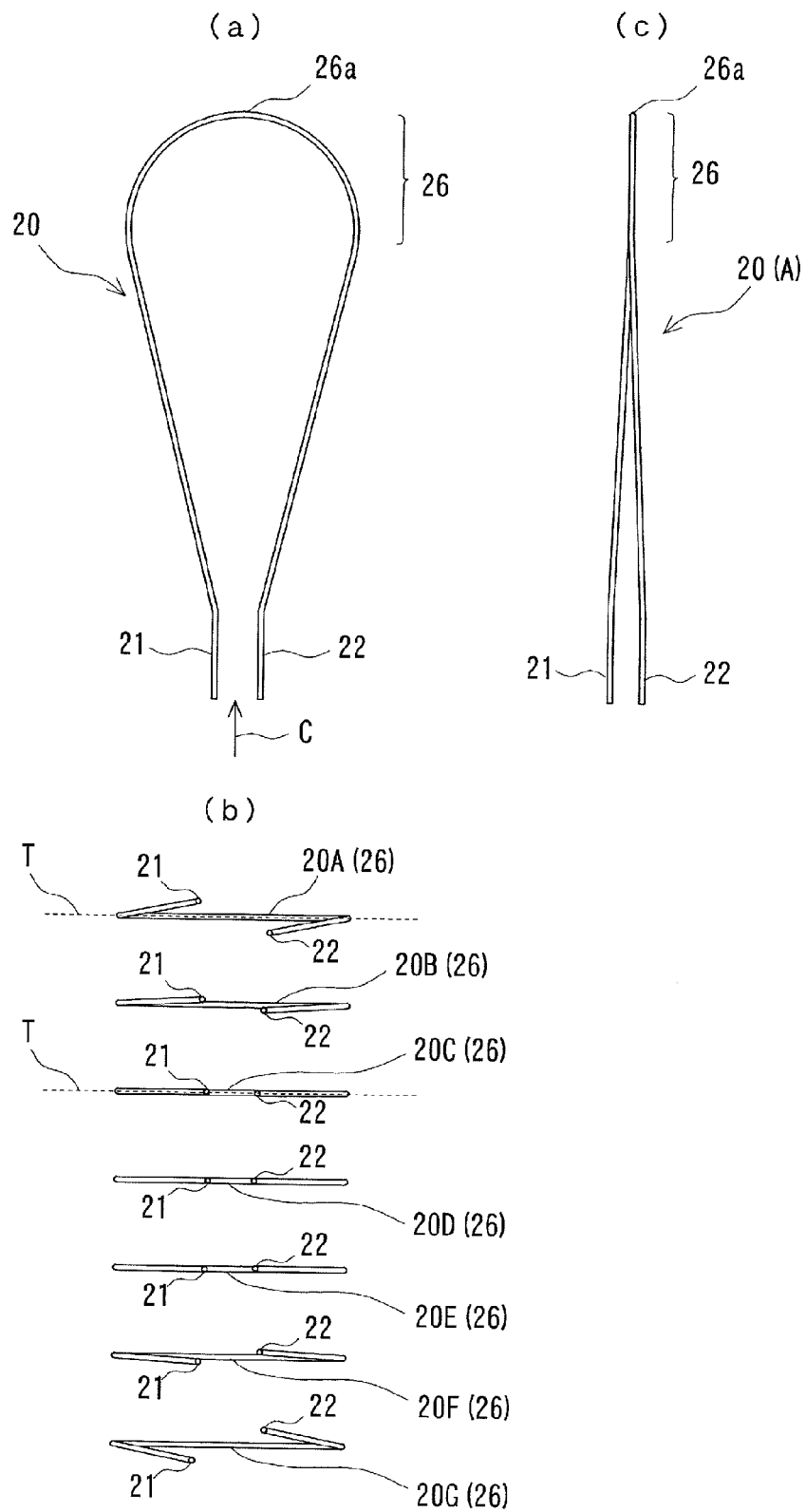

Further, next, as for the exemplified seven wire members 20(A to G) forming the stirring section 2, at a stage before being fitted into one or both of the grooves 35 and the through-holes 37 or 39 of the fitting body 3, each of the wire members 20 (A to G) has an entire shape having the folded and bent part 26 as illustrated in FIG. 33(*a*), and as illustrated as reference symbol 20D in FIG. 33(*b*), has a two-dimensional flat shape (untwisted shape) when viewed from below. Therefore, part of the wire members 20, that is, the wire members 20 (A, B, F, and G) are each formed in a state in which, as illustrated in FIG. 33(b), apart above both the ends 21 and 22 is three-dimensionally twisted with respect to the folded and bent part 26 of the wire member 20 (when viewed from the top of the stirring section 2, the folded and bent part 26 is twisted while both the ends 21 and 22 of the wire member 20 are fixed). After that, the ends 21 and 22 of the wire members 20 (A to G) are connected and fixed to the connection plates 5A and 5B, respectively (FIG. 34(b)), and then are mounted to the handle section 4 (actually, the ends 21 and 22 of the wire members 20 (A to G) are aligned in rows together with the grooves, through-holes, or the like via the fitting body 3).

The part of the wire members 20 are imparted with a twist (torsion) so that, particularly in a case where the ends 21 and 22 of the wire members 20 are arranged in a two opposing row state (particularly linear row state) spaced with an interval, the wire members to be arranged so that ends thereof are allocated at opposite positions (far positions) in the respective rows are retained to obtain, as illustrated in FIG. 34(a), "a circular outer circumference of the folded and bent parts 26 owing to the uniform wire member arrangement," which is a desired head portion shape for the stirring section 2.

That is, in the stirring section 2, as illustrated in FIG. 34(a), the parts 26 of the respective wire members 20, which are bent into the folded shape, are arranged so as to pass through a position above a center (P) between the two rows formed by the arrangement of the ends 21 and 22 of the wire members 20, and cross at substantially the same (crossing) angle θ with one another, thereby obtaining a radially expanded state from the center (P). Here, the part 26 of the wire member 20, which is bent into the folded shape, refers to a part in a range having a linear shape when viewed from the upper surface side thereof. Further, substantially the same crossing angle θ with one another refers to an angle when the error is within the range of preferably 0 to 10°.

When the parts 26 of the respective wire members 20, which are bent into the folded shape, are arranged in such a state, as exemplified in FIG. 34(a), it is possible to obtain the stirring section 2 in which the shape obtained by connecting parts positioned outermost (outermost parts) 26b of the parts 26 bent into the folded shape (shape connected by the dotted lines) is a substantially regular polygon (substantially circle). In this case, the plurality of wire members 20 forming the stirring section 2 may be arranged so that, as illustrated in FIG. 34(b) etc., one ends 21 of both the ends 21 and 22 of the respective wire members 20 are arranged at one row (L1) of the two rows (L1 and L2), other ends 22 thereof are arranged at another row (L2) thereof, and further, both the ends 21 and 22 of the respective wire members 20 are arranged in a state present at positions opposed to each other across the center (P) between the two rows (L1 and L2).

Such a twist as described above is formed so that, as illustrated in FIG. 33(b) and 33(c), with the folded and bent part 26 of the wire member 20 as a reference, both the ends 21 and 22 are provided at positions opposite to each other across the folded and bent part 26. Specifically, the twist is formed to obtain a shape so that, as illustrated in FIG. 33(b), both the ends 21 and 22 of the wire member 20 are separately provided at positions opposite to each other across a projection straight line (line indicated by dotted line T: center line of the wire member at a linear part of the bent part 26) of the part 26 bent into the folded shape of the wire member. In each of the wire members 20 (C, D, and E) to which the twist is not imparted, both the ends 21 and 22 are provided in a state overlapping with the folded and bent part 26. Further, the twist degree (respective separation distance or separation angle of the ends 21 and 22 with respect to the projection straight line of the part 26 bent into the folded shape) is gradually increased as the wire member 20 has the wire member ends 21 and 22 set at farther arrangement positions in the respective rows.

Further, as a method of forming such a stirring section 2 imparted with a twist, for example, the respective wire members 20(A to G) including wire members imparted with such a twist by a bending process in advance may be prepared, and the connection plates 5A and 5B may be fixed by welding to the ends 21 and 22 of the wire members 20 aligned by being fixed with an appropriate jig (regardless of whether or not the fitting into the fitting body 3 is finished), thereby forming the stirring section 2. Further, as another method, with use of the respective wire members 20 (A to G) without being subjected to the bending process for the twist, after temporarily fixing the respective wire members 20 (A to G) to a pair of jigs capable of performing fixing while imparting a necessary twist (regardless of whether or not the fitting into the fitting body 3 is finished), the connection plates 5A and 5B may be fixed by welding to the ends 21 and 22 of the aligned wire members 20, thereby forming the stirring section 2.

Figure 34:
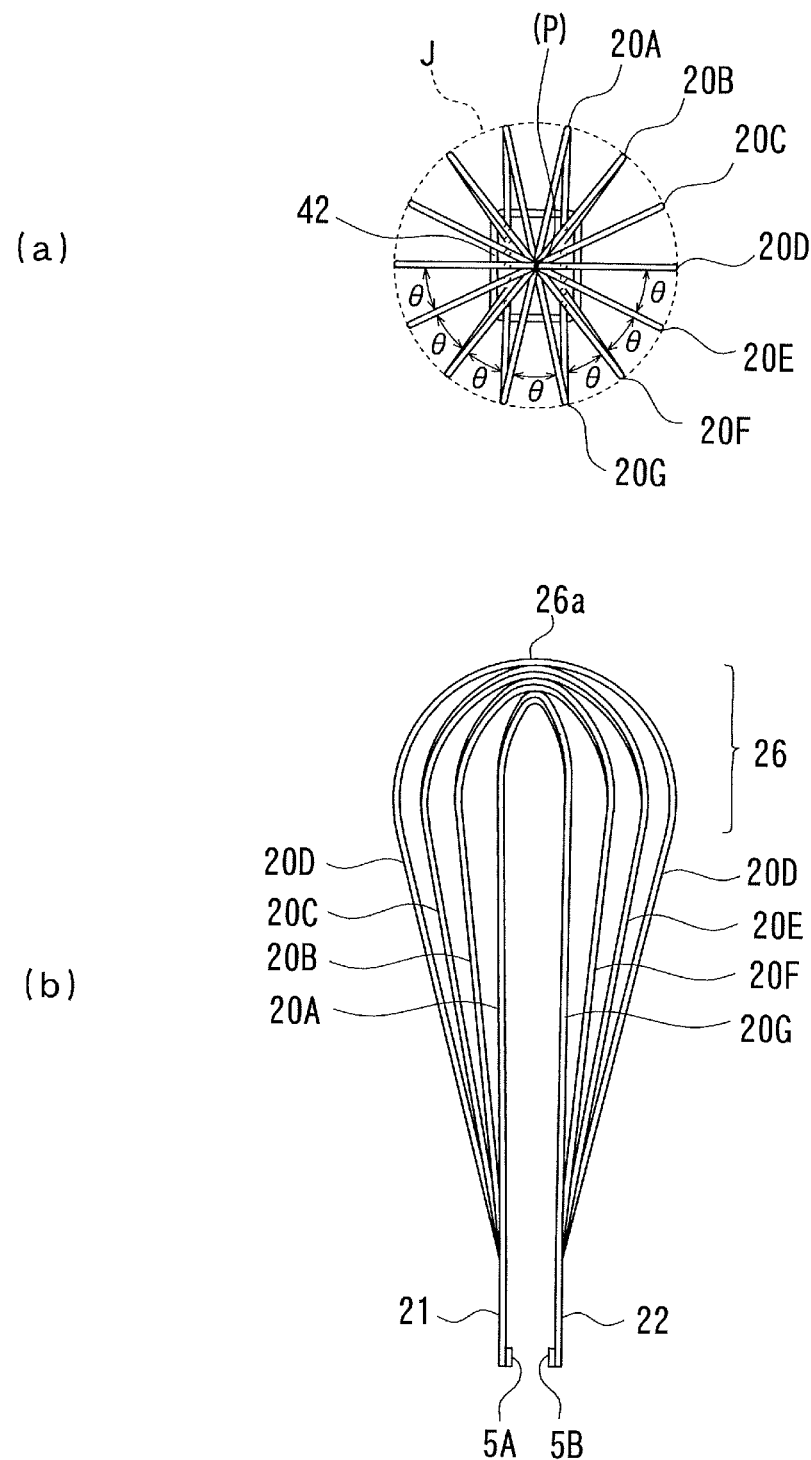

With this, as illustrated in FIG. 34, the seven wire members 20 (A to G) are caused to cross in a state in which the top portions 26a of the folded and bent parts 26 thereof are overlapped with each other in the vertical direction, and are arranged to have a substantially uniform crossing angle θ. When the stirring section 2 having a head portion shape in which the line connecting the maximum expanding parts 26b of the folded and bent parts 26 (dotted line J illustrated in an upper part of FIG. 34) has a substantially circular shape is formed, even though the wire member ends 21 and 22 form the two rows, the respective wire members 20A to 20G (particularly, the wire members 20 (A, B, F, and G) imparted with a twist) are provided at fixed positions without uneven distribution, and the shape formed of the folded and bent parts 26 of the stirring section 2 can be stably maintained.

Figure 35:
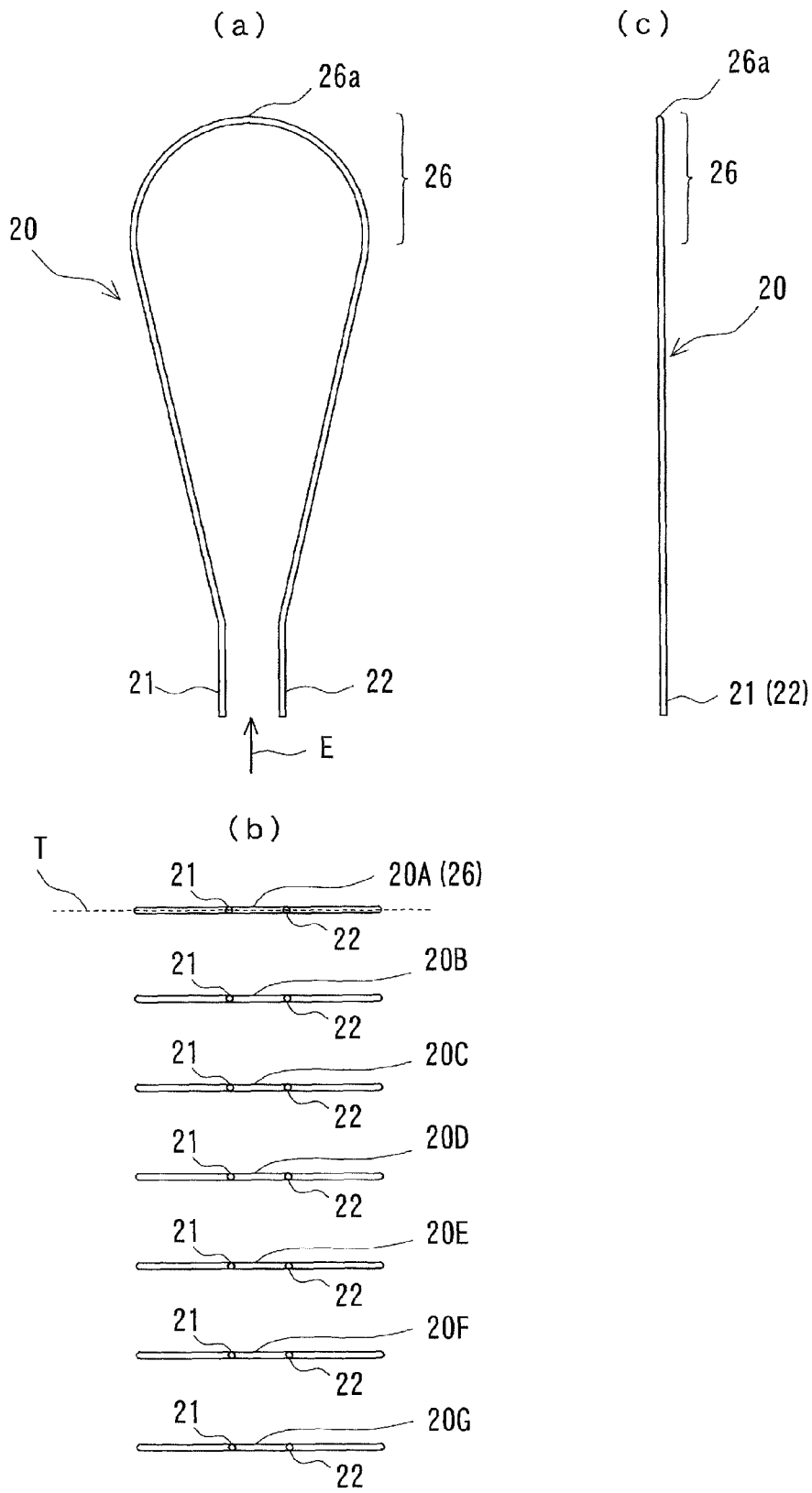
Figure 36:
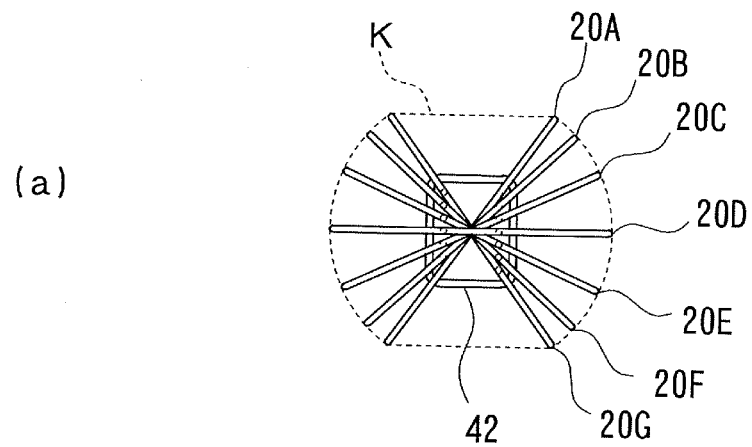
Figure 36:
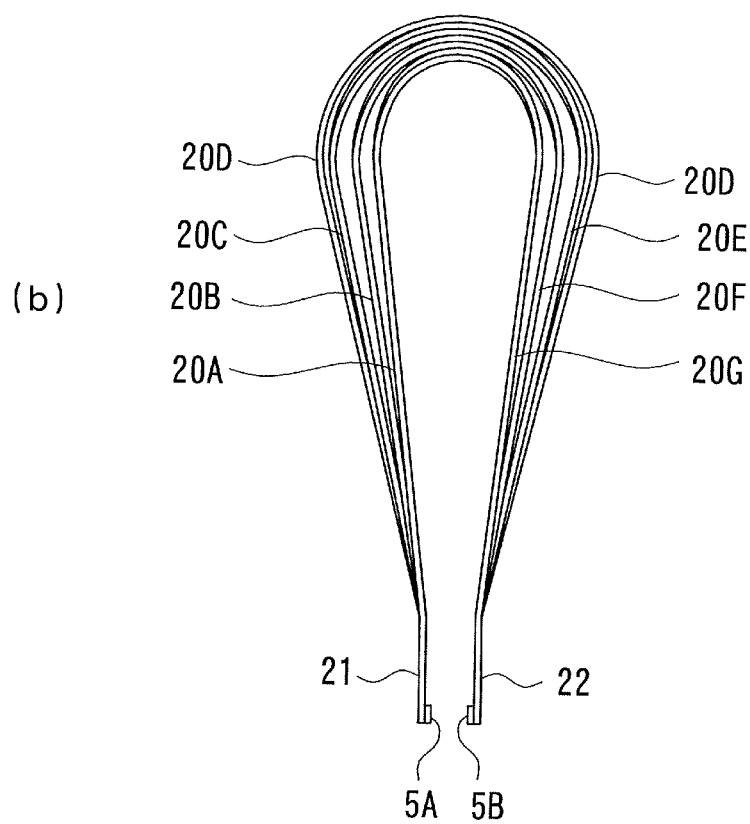

In contrast, in a case where the stirring section 2 having the same head portion shape is formed with use of the seven wire members 20 (A to G), when the two row arrangement of the wire member ends 21 and 22 are to be formed without imparting a twist to any of the wire members 20 (A to G) as illustrated in FIG. 35 (configuration of conventional specifications), as illustrated in FIG. 36, the folded and bent parts 26 of the wire members 20 (A, B, F, and G) having the wire member ends 21 and 22 which are to be set at farther arrangement positions in the respective rows are not placed at the desired positions. Therefore, such an uneven distribution state that the wire members 20 (A to G) form two groups as a whole is obtained. As a result, a line K connecting the maximum expanding parts 26b of the folded and bent parts 26 of the wire members 20 (A to G) at this time does not form "a circular outer circumference of the folded and bent parts 26 owing to the uniform wire member arrangement," which is required as the head portion shape for the stirring section 2.

Further, in addition, the plurality of wire members 20 (A to G) forming the stirring section 2 can be configured as follows. That is, as the respective wire members 20 (A to G), as exemplified in FIGS. 49, 51, and 53, there may be used wire members in which, regarding a height (length) M1 of the linear ends 21 and 22 (including the sliding operation parts 21c and 22c described above) extending substantially parallel to one another and a height M2 from the upper end (part at which the linear line ends: inflection portion) 27 of the linear ends 21 and 22 to the top portion 26a of the part 26 bent into the folded shape, the dimensions of one of those height M1 and height M2 are all set to the same dimension, and the dimensions of the other thereof are all set to dimensions different from one another. The dimensions different from one another in this case are only required to be set as different values considering that, at least when the terminal ends 21a and 22a of the wire member ends 21 and 22 are in an aligned state, the respective wire members 20 (A to G) can maintain a crossing state in the top portions 26a thereof at positions shifted in the vertical direction. The different dimensions are, for example, dimensions equal to or larger than at least the diameter of the wire member 20, and dimensions enabling all of the respective wire members 20 (A to G) to easily slide and shift at the top portions 26a.

Figure 49:
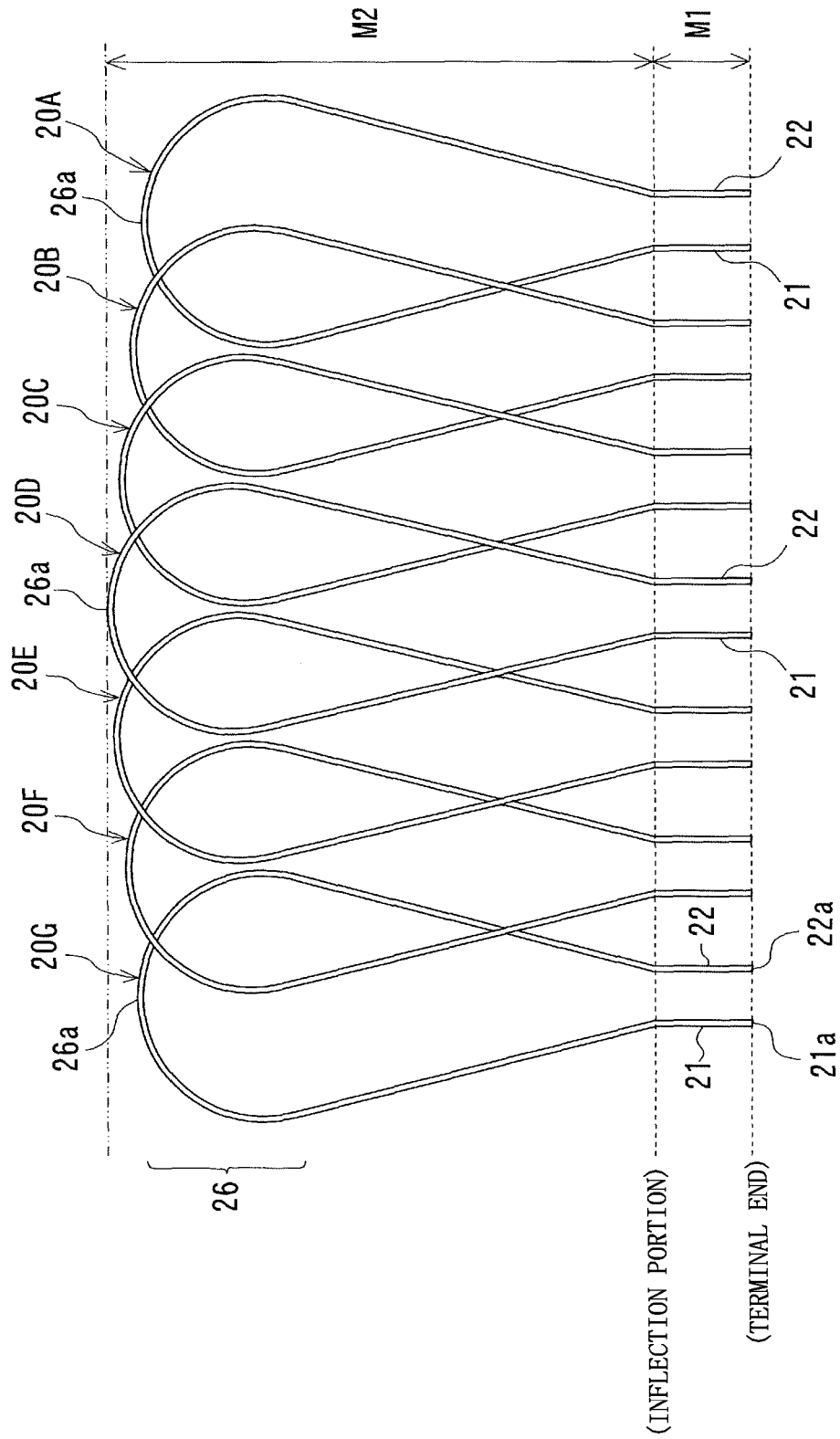
FIG. 49 is an explanatory view illustrating one configuration example of a plurality of wire members forming the stirring section.
Figure 50:
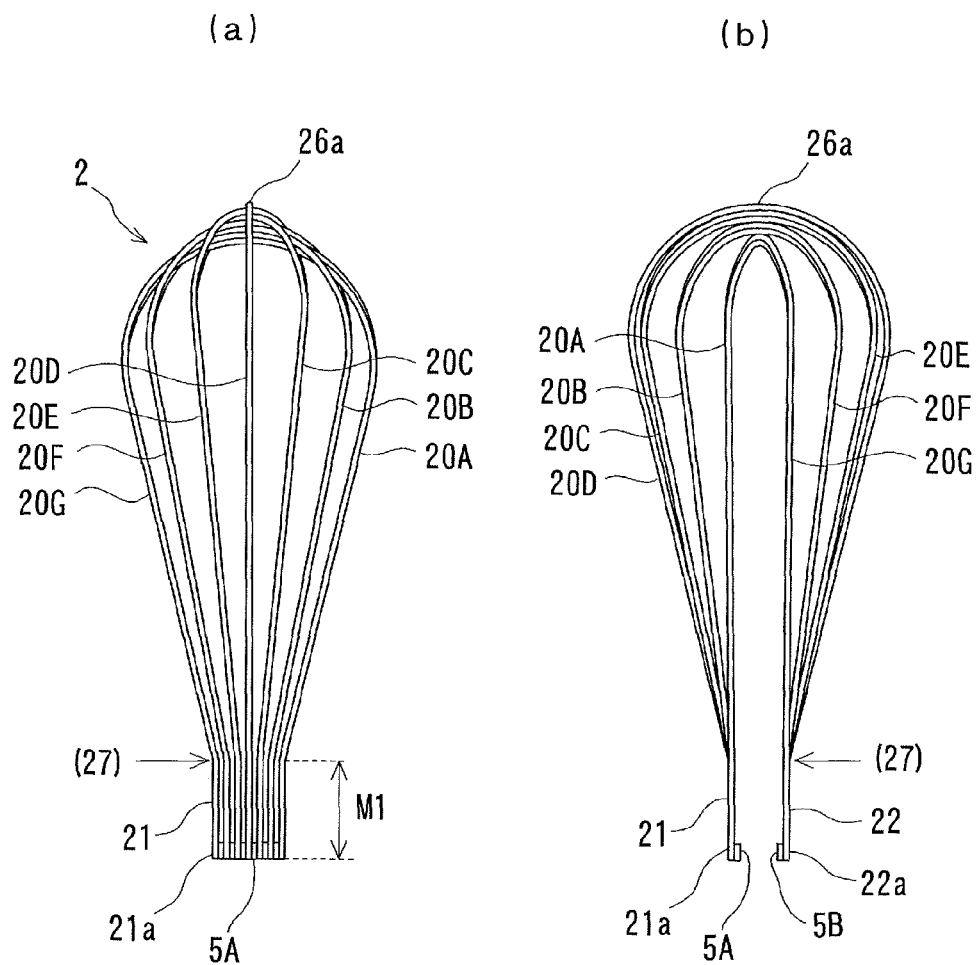

The wire members 20 (A to G) illustrated in FIG. 49 are wire members forming the stirring section 2 of the first to sixth embodiments. The wire members 20 (A to G) have the heights M1 set in the same dimension, and have the heights M2 set in different dimensions from one another. In a case where the wire members 20 (A to G) formed as described above are used, as illustrated in FIG. 50, when the terminal ends 21a and 22a of the wire member ends 21 and 22 are (fixed to the connection member 5 and) aligned, the wire member parts on the upper side from the inflection portion 27 can be easily arranged so that the top portions 26a thereof are in a crossing state at positions shifted in the vertical direction. With this, the stirring section 2 can be easily formed. Further, in the stirring section 2 in this case, the heights (lengths) M1 of all of the substantially perpendicular and linear ends 21 and 22 of the wire members 20 (A to G) are set to the same dimension, and hence, as illustrated in FIG. 50(a), all of the inflection portions 27 of the respective wire members 20 (A to G) forming each row of the two-row wire member ends are present at the same height position, and hence the inflection portions 27 are linearly aligned (in a lateral one-row state) as a whole.

Figure 51:
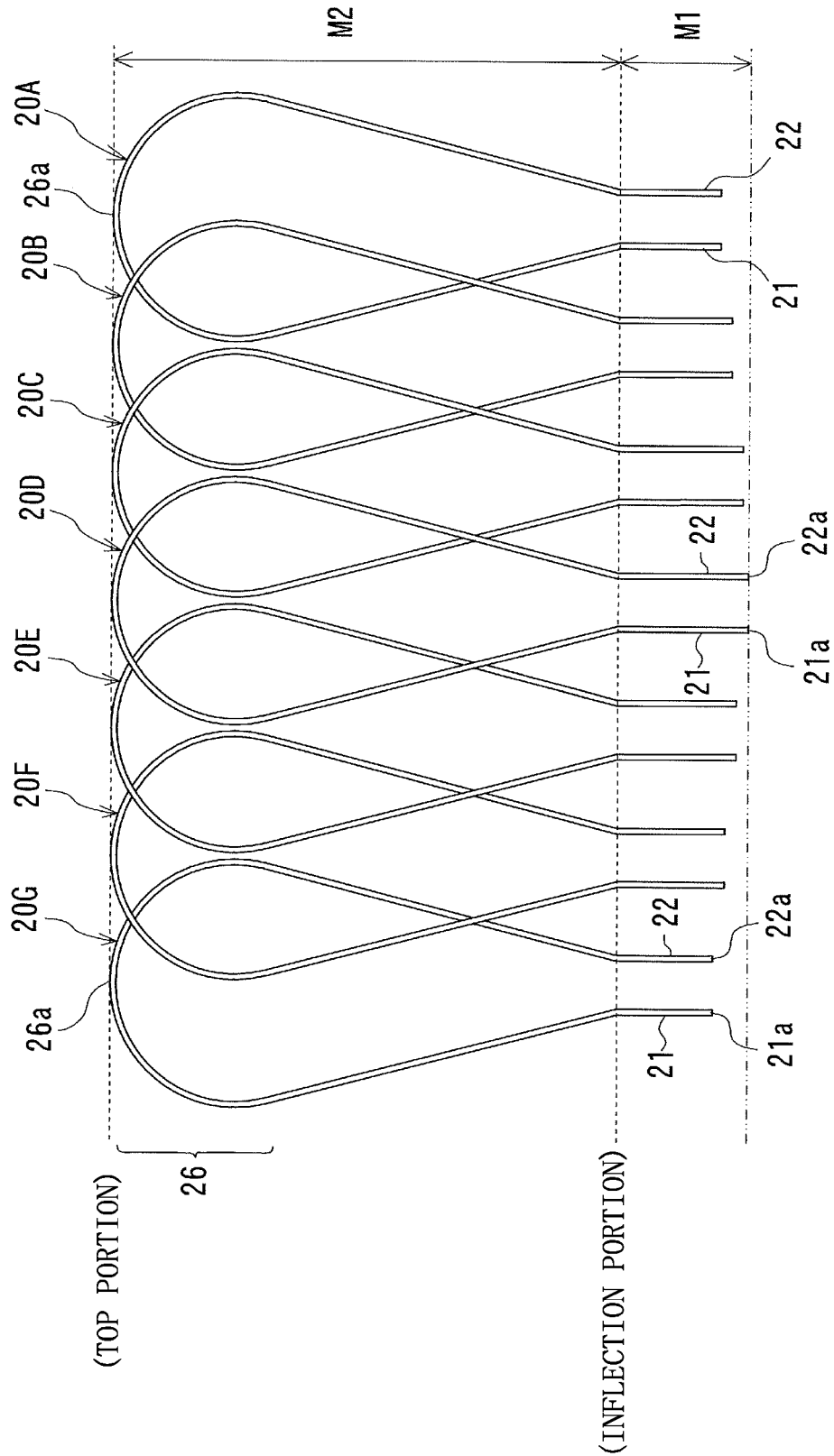
FIG. 51 is an explanatory view illustrating another configuration example of the plurality of wire members forming the stirring section.
Figure 52:
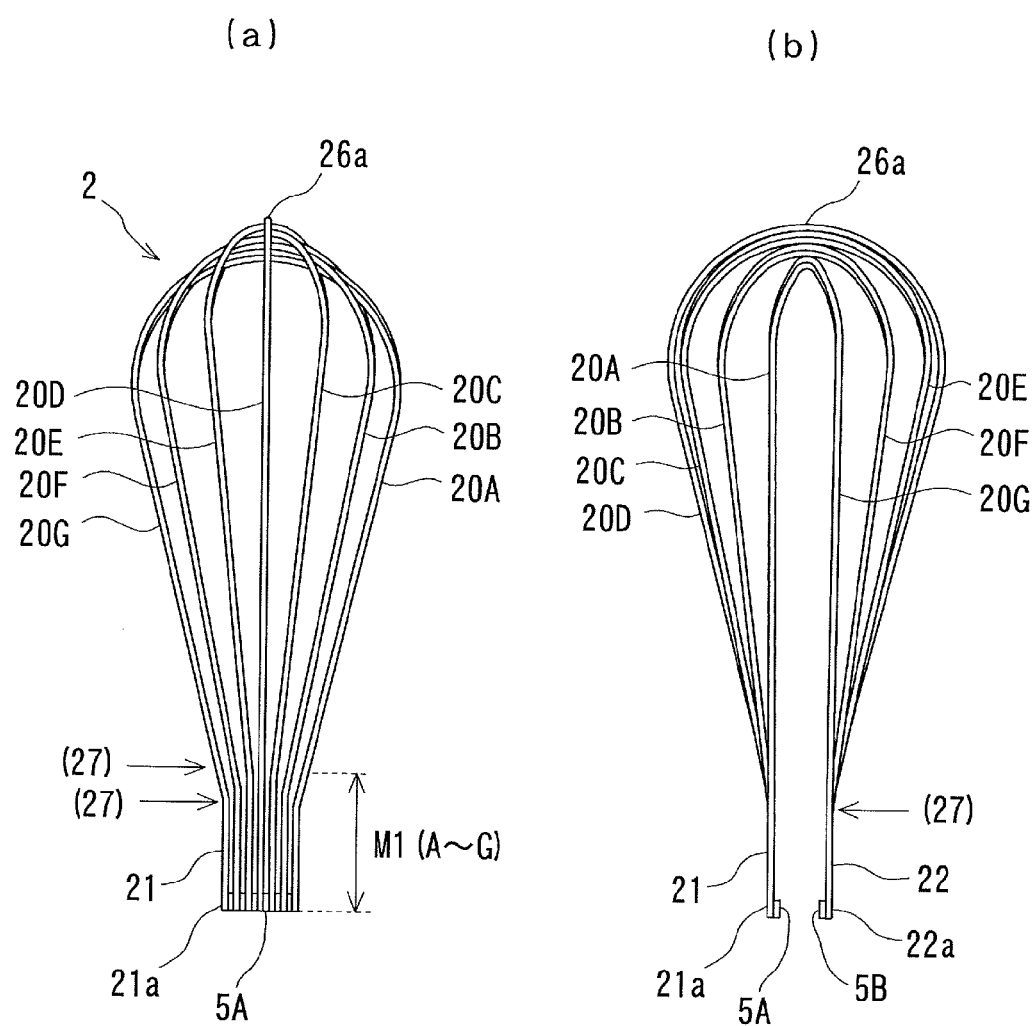

The wire members 20 (A to G) illustrated in FIG. 51 represent another configuration example in which the respective heights M2 are set to the same dimension, and the respective heights M1 are set to different dimensions from one another. The heights M1 in this configuration example are set so that the height M1 of the wire member 20D arranged at the center when the wire members 20A to 20G are arranged in order has the longest dimension, and the heights M1 of the remaining wire members 20A to 20C and 20E to 20G arranged on both sides of the wire member 20D are gradually shortened as the wire members are at positions separated from the wire member 20D. In a case where the wire members 20 (A to G) formed as described above are used, as illustrated in FIG. 52, when the terminal ends 21a and 22a of the wire member ends 21 and 22 having different heights M1 are (fixed to the connection member 5 and) aligned, the wire member parts on the upper side from the inflection portion 27 can be easily arranged so that the top portions 26a thereof are in a crossing state at positions shifted in the vertical direction. With this, the stirring section 2 can be easily formed. Further, in the stirring section 2 in this case, the heights (lengths) M1 of the substantially perpendicular and linear ends 21 and 22 of the wire members 20 (A to G) are set to different dimensions from one another, and the wire member 20D having the longest height M1 is arranged at the center. Therefore, as illustrated in FIG. 52(a), the inflection portions 27 of the respective wire members 20 (A to G) forming each row of the two-row wire member ends are present at different height positions, and hence the inflection portions 27 are aligned in an inverted V-shape as a whole.

Figure 53:
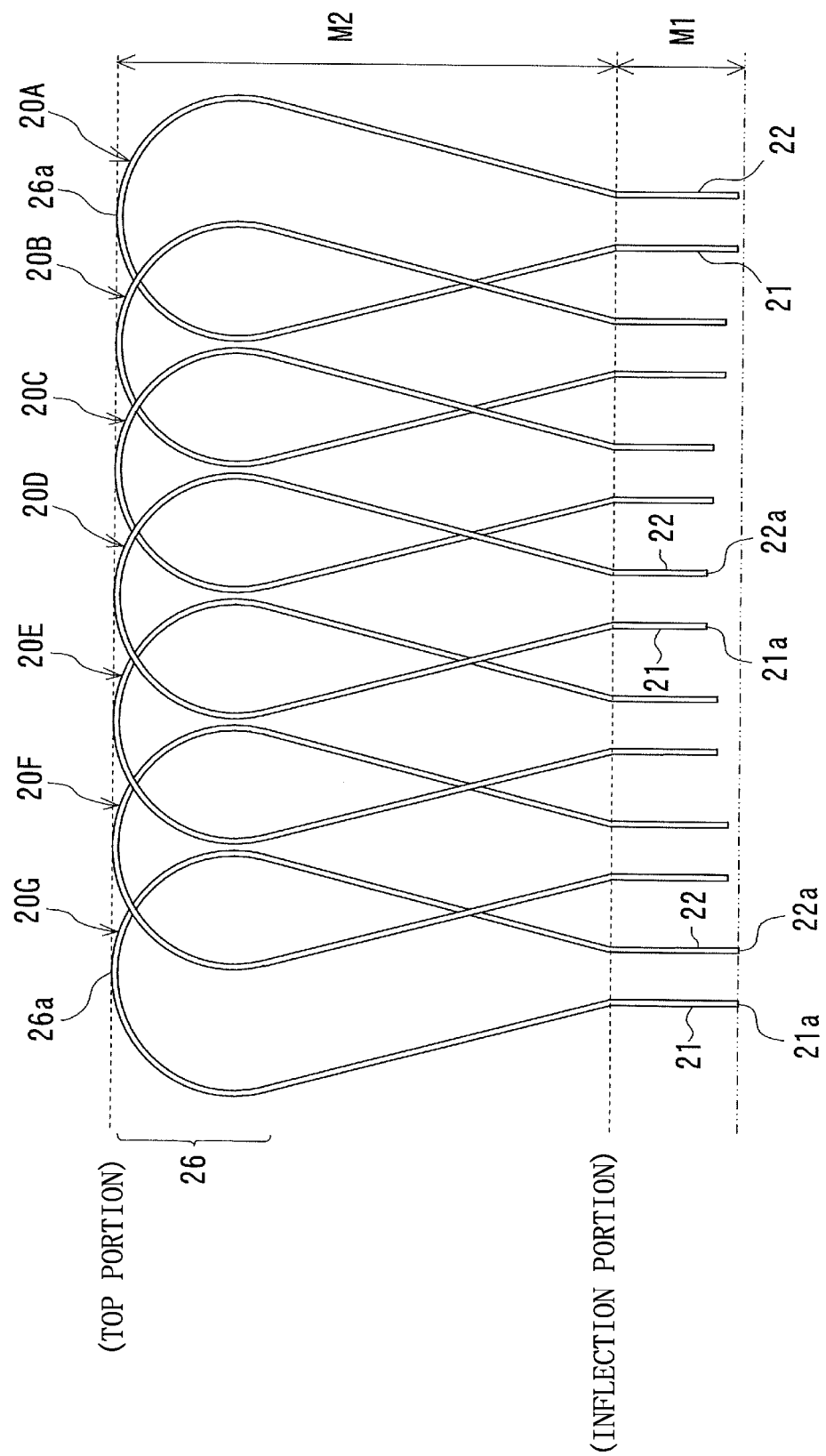
FIG. 53 is an explanatory view illustrating still another configuration example of the plurality of wire members forming the stirring section.
Figure 54:
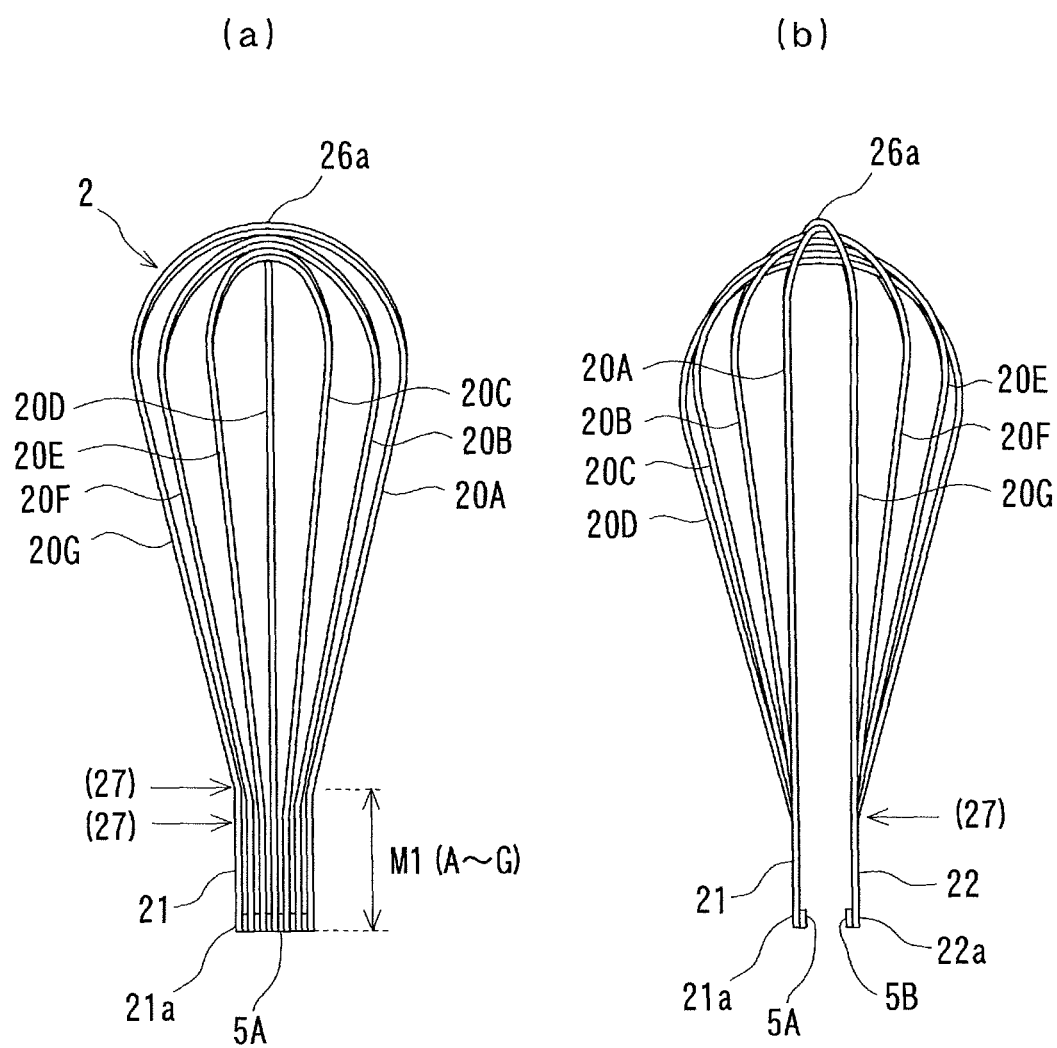

The wire members 20 (A to G) illustrated in FIG. 53 represent still another configuration example in which the respective heights M2 are set to the same dimension, and the respective heights M1 are set to different dimensions from one another. The heights M1 in this configuration example are set so that the height M1 of the wire member 20D arranged at the center when the wire members 20A to 20G are arranged in order has the shortest dimension, and the heights M1 of the remaining wire members 20A to 20C and 20E to 20G arranged on both sides of the wire member 20D are gradually length end as the wire members are at positions separated from the wire member 20D. In a case where the wire members 20 (A to G) formed as described above are used, as illustrated in FIG. 54, when the terminal ends 21a and 22a of the wire member ends 21 and 22 having different heights M1 are (fixed to the connection member 5 and) aligned, the wire member parts on the upper side from the inflection portion 27 can be easily arranged so that the top portions 26a thereof are in a crossing state at positions shifted in the vertical direction. With this, the stirring section 2 can be easily formed. Further, in the stirring section 2 in this case, the heights (lengths) M1 of the substantially perpendicular and linear ends 21 and 22 of the wire members 20 (A to G) are set to different dimensions from one another, and the wire member 20D having the shortest height M1 is arranged at the center. Therefore, as illustrated in FIG. 54(a), the inflection portions 27 of the respective wire members 20(A to G) forming each row of the two-row wire member ends are present at different height positions, and hence the inflection portions 27 are aligned in a V-shape as a whole.

By the way, as in the wire members 20 (A to G) exemplified in FIG. 49, in the case where there are used the wire members 20 having the respective heights M1 set to the same dimension and the respective heights M2 set to different dimensions from each other, the parts of the stirring section 2 from the parts 26 bent into the folded shape to the inflection portions 27 which are the upper ends of the wire member ends 21 and 22 have different dimensions from each other. Therefore, when the respective wire members 20 (A to G) are manufactured, it is necessary to prepare and use a plurality of types of bending process molds for the bending process of the wire members. Meanwhile, as in the wire members 20 (A to G) exemplified in FIGS. 51 and 53, in the case where there are used the wire members 20 having the respective heights M2 set to the same dimension and the respective heights M1 set to different dimensions from each other, all of the parts of the stirring section 2 from the top portions 26a of the parts 26 bent into the folded shape to the inflection portions 27 which are the upper ends of the wire member ends 21 and 22 have the same dimension. Therefore, when the respective wire members 20 (A to G) are manufactured, manufacturing can be performed by only preparing and using a bending process mold of one type with respect to the respective wire members 20 in which the wire member lengths are merely different. Further, in the case where such wire members 20 (A to G) are used, the manufacturing cost when the stirring section 2 formed of the wire members 20 (A to G) is manufactured can be reduced.

Further, as exemplified in FIGS. 51 and 53, in a case where the stirring section 2 is formed under a state in which the respective heights M2 of the wire members 20 (A to G) are set to the same dimension and the respective heights M1 are set to different dimensions from each other, examples of other configuration examples include: a first configuration example in which the height M1 of the wire member 20A (or 20G) on the end side when being arranged in the two-row state is set as the longest dimension, and the heights M1 of the wire members 20B to 20G (or 20F to 20A) positioned to approach the other end are set to dimensions becoming gradually shorter; and a second configuration example in which the heights M1 of the wire members 20 (A to G) are set to dimensions that alternately repeat a long dimension and a short dimension. Thus, any arbitrary configuration can be set. Here, in the case of the above-mentioned first configuration example, the inflection portions 27 of the stirring section 2 are aligned in an oblique straight-line state as a whole. Further, in the case of the above-mentioned second configuration example, the inflection portions 27 of the stirring section 2 are aligned in a zigzag state (uneven state) as a whole.

Further, the configuration of the stirring section 2 in the configuration examples illustrated in FIGS. 51 and 53 etc. can be similarly employed to the stirring section 2 in any of the embodiments described above.

Further, as for the stirring section 2 in the configuration examples illustrated in FIG. 49 to 54 etc., the case where the seven wire members 20 (20A to 20G) are used is exemplified, but the stirring section 2 may be formed with use of wire members 20 in the number other than seven.

Further, the arrangement of the ends 21 and 22 of the wire members 20 forming the stirring section 2 can be changed as appropriate. For example, the ends 21 and 22 may be arranged so as to form a continuous shape such as a circle or a square, but are preferred to be arranged so that the interval (W) is ensured, which enables the root parts 25 of the wire members 20 to be appropriately cleaned. Further, in the case where the ends 21 and 22 are arranged so as to form two opposing rows spaced with the interval (W) as described above, the ends 21 and 22 may be arranged so that each row forms a line shape other than a straight line, such as an arc shape and a curved shape. Further, in a case where the ends 21 and 22 of the wire members 20 are arranged in a state forming two linear rows, the two rows are not limited to be arranged in a parallel state, and may be arranged so as not to be in a parallel state.

Further, the connection plate (connection member) 5 is not limited to be a plate-like member as long as the ends 21 and 22 of the plurality of wire members 20 can be connected thereto, and there may be applied a member (connection member) having other shapes, for example, a linear (bar-like) shape, such as a circular wire member obtained by transferring a part of the wire member 20. Examples of the fixing method for the connection member with respect to the terminal ends 21*a* and 22*a* of the wire members 20 include, other than the welding described above, a fixing method using an adhesive or the like, and a method in which a fitting recess, into which the terminal ends 21*a* and 22*a* of the wire members 20 are to be fitted, is formed in the connection plate 5 in advance, and the terminal ends 21*a* and 22*a* of the wire members 20 are fitted into the fitting recess, to thereby integrally fix the connection member and the wire member terminal ends 21*a* and 22*a* to each other via the fitting recess. Further, the connection member can be fixed to, other than the inner parts of the terminal ends 21*a* and 22*a* of the respective wire members 20, for example, to outer parts of the terminal ends 21*a* and 22*a* of the respective wire members 20, to end surfaces of the terminal ends 21*a* and 22*a* of the respective wire members 20, and to both of the inner and outer sides of the terminal ends 21*a* and 22*a* of the respective wire members 20. When the connection member is fixed to the outer parts of the terminal ends 21*a* and 22*a*, the connection member at that time may be protruded from the fitting body 3. As described above, the fixing position of the connection member with respect to the terminal ends 21*a* and 22*a* of the respective wire members 20 can be arbitrarily selected.

Further, in the case where the ends 21 and 22 of the wire members 20 are arranged so as to form the two opposing rows spaced with the interval (W) as described above, the respective rows may be arranged to form, as described above, an arbitrary row shape other than a straight line, such as an arc shape, a curved shape, an elliptical shape, a curved-line shape, a zigzag shape, and the like. At this time, the connection member formed into a shape corresponding (approximated) to the row shape is preferred to be fixed to the terminal ends 21*a* and 22*a* of the respective wire members 20. With this, the ends 21 and 22 of the respective wire members 20 can be easily arranged at the fitting body 3 in a state in which the ends 21 and 22 form the two opposing rows spaced with the interval, and further, it is possible to retain the state in which the ends 21 and 22 are arranged into the row shape with good durability.

Further, as for the housing recess (38 or 48) for housing the connection member such as the connection plate 5 alone or housing the connection member and the terminal ends 21*a* and 22*a* of the plurality of wire members 20 fixed and connected to the connection member, for example, in a case where the connection member is formed so as not to protrude from the fitting body 3 (specifically, from an outer periphery surface of a part of the fitting body 3, which is fitted into the mounting recess 45 of the handle section 4), the housing recess 38 may be formed in the fitting body 3, and further, in a case where the connection member is formed so as to protrude from the fitting body 3, the housing recess 48 may be formed in the mounting recess 45 of the handle section 4. Further, the housing recess (38 or 48) may be formed in both of the fitting body 3 and the mounting recess 45 of the handle section 4 if necessary. By the way, in the case where the housing recess 38 is formed in the fitting body 3, the housing recess 38 may be formed in the long-side lateral surface portions 32A and 32B of the fitting body 3, formed in the short-side lateral surface portions 33A and 33B of the fitting body 3, formed in the bottom surface portion 34 of the fitting body 3, or formed in any of the respective corner portions at which the respective surface portions 32A, 32B, 33A, 33B, and 34 intersect one another. Meanwhile, in the case where the housing recess 48 is formed in the mounting recess 45 of the handle section 4, the housing recess 48 may be formed on one of the inner wall surfaces (45A, 45B, 45C, and 45E) and the bottom surface (45E) of the mounting recess 45 in an independent state, or may be formed across the inner wall surfaces or across the inner wall surface and the bottom surface in a straddle state.

Therefore, as for the housing recess (38 or 48), the conditions such as the formation position and the shape thereof are selected as appropriate depending on the form of the connection member and the fixing position (fixing state) of the connection member with respect to the terminal ends of the wire members. For example, in the first embodiment, there is exemplified a configuration in which the respective housing recesses 38A and 38B are formed in the fitting body 3A in advance, and in the second step of the manufacturing process thereof, the terminal ends 21*a* and 22*a* of the respective wire members 20 connected to the connection plates 5A and 5B are housed in the housing recesses 38A and 38B of the fitting body 3A. However, as another configuration, there may be applied a configuration similar to the configuration exemplified in the fourth embodiment. That is, without forming the above-mentioned housing recesses 38A and 38B in the fitting body 3A, as exemplified in the fourth embodiment, the housing recesses 48A and 48B may be formed in the bottom surface portion 45E of the mounting recess 45 of the handle section 4. Then, in the second step of the manufacturing method according to the first embodiment, the terminal ends 21*a* and 22*a* of the respective wire members 20 connected to the connection plates 5A and 5B may be set in a state protruded from the bottom surface portion 34 of the fitting body 3A. Then, in the third step of the manufacturing method thereof, the fitting body 3A having the terminal ends 21*a* and 22*a* of the wire members 20 and the connection plates 5A and 5B in a protruded state may be fitted to the mounting recess 45 of the mounting part 42 of the handle section 4. At this time, the connection plates 5A and 5B and the terminal ends 21*a* and 22*a* of the wire members 20 may be housed in the housing recesses 48A and 48B formed in the mounting recess 45.

Further, the lid portion 36 of the fitting body 3 exemplified in the second to fourth embodiments has such an appearance that a flat plate having an area larger than the upper surface (31) of the fitting body 3 is placed on the upper surface to be integrally formed. However, the lid portion 36 of the fitting body 3 may be separately provided from the main body portion 30 of the fitting body 3. In this case, for example, the main body portion 30 of the fitting body 3 may be made of plastic, and the lid portion 36 of the fitting body 3 may be made of a metal such as stainless. The lid portion 36 provided separately from the main body portion 30 of the fitting body 3 may be integrated with the main body portion 30 by an adhesion method such as application adhesion with the adhesive 10 and thermal fusion. When the present invention applies the fitting body 3 including the separate lid portion 36 made of a material having higher strength than the main body portion 30 as described above, it is possible to prevent enlargement of the through-holes 37 or 39 in the lid portion 36 of the fitting body 3 with respect to the root parts 25 of the wire members 20, caused by receiving an external force during use of the stirrer 1, and it is possible to enhance the durability of the water-tightness in the fitting body 3.

Further, as the metal wire member 20 forming the stirring section 2, a wire member made of other metal materials such as a titanium alloy and an aluminum alloy may be used. Further, the wire member forming the stirring section 2 may be a wire member made of a material other than a metal material (for example, a synthetic resin, a composite material, and the like). Further, the wire member 20 may be a covered wire member, in which an outside of a metal wire member is covered with a synthetic resin such as a silicon resin and a fluorine resin. Further, the number of the wire members 20 forming the stirring section 2 may be changed as appropriate, and for example, may be selected in a range of 5 to 10, preferably 6 to 8.

Further, the shape of the part 26 bent into the folded shape of the wire member 20 forming the stirring section 2 may be a shape other than a curved shape, such as a flex shape or a composite shape obtained by combining, for example, a curved shape and a flex shape. Further, the part 26 bent into the folded shape of the wire member 20 may be shaped so that the vicinity of a leading end (or center portion) of the bent part 26 is, for example, a loop shape, a semicircular shape, an elliptical shape, a shape with figure-of-eight, a glasses frame shape, a square shape, or a polygonal shape.

The handle section 4 to be used is made of a material such as a metal, wood, a synthetic resin, and a composite material. The entire shape of the handle section 4 is not limited to a bar-like shape, and the handle section 4 is only required to have a shape including the mounting part 42 including the mounting recess 45 for fitting and fixing the fitting body 3 to which the ends 21 and 22 of the wire members 20 of the stirring section 2 are mounted. As a lateral (horizontal) sectional shape of the fitting body 3, there may be employed a substantially rectangular, square, circular, or elliptical shape, or an arbitrary shape obtained by combining those shapes. As long as the handle section 4 includes the mounting recess 45 corresponding to the fitting body 3, also as a lateral sectional shape of the handle section 4, there may be employed a substantially rectangular, square, circular, or elliptical shape, or an arbitrary shape obtained by combining those shapes.

The stirrer of the present invention can be used as, other than being used as the cooking stirrer, a stirrer for other fields. Further, the stirrer may be formed in various combinations of the contents (configurations) described in the above-mentioned embodiments.

REFERENCE SIGNS LIST

1 . . . stirrer
2 . . . stirring section
3 . . . fitting body
4 . . . handle section
5 . . . connection plate (connection member)
10 . . . adhesive
12 . . . adhesion layer
20 . . . wire member
21, 22 . . . end
21*a*, 22*a* . . . terminal end
35 . . . groove
36 . . . lid portion
37, 39 . . . through-hole
38, 48 . . . housing recess
45 . . . mounting recess
A . . . direction of pulling back
W . . . interval

The invention claimed is:

1. A stirrer, comprising:
a stirring section comprising a plurality of wire members bent into a folded shape and arranged so that the plurality of wire members are caused to cross one another to be vertically shifted;
a fitting body comprising one or both of grooves and through-holes into which ends of the respective plurality of wire members forming the stirring section are fitted and fixed; and
a handle section comprising a mounting recess to which the fitting body is fitted; fixed under a state in which the ends of the respective plurality of wire members are fitted into the one or both of grooves and through-holes; and
a connection member,
wherein terminal ends of the ends of the respective plurality of wire members fitted into the one or both of grooves and through-holes of the fitting body are fixed and connected to the connection member,
wherein the fitting body or the mounting recess of the handle section comprises a housing recess for housing and fixing the connection member,
wherein the fitting body is fitted and fixed to the mounting recess of the handle section and the connection member is housed and fixed in the housing recess,
wherein the grooves or the through-holes formed in the fitting body are divided and arranged so as to form two opposing rows spaced with an interval at a center, through which a cleaning tool for cleaning the ends of the respective plurality of wire members is capable of passing, and the interval between the two opposing rows is set to be relatively larger than each of intervals between adjacent grooves or through-holes forming each of the two opposing rows,
wherein part or all of the plurality of wire members are formed so that both ends thereof are separately present at positions opposite to each other across a projection straight line (T) of a part of the each of the plurality of wire members bent into the folded shape, and further a separation distance or a separation angle of the ends of the each of the plurality of wire members with respect to the projection straight line (T) is set to gradually increase as the ends of the each of the plurality of wire members are arranged at farther positions in the respective two opposing rows than a center portion of the respective two opposing rows, wherein one of both the ends of each of the plurality of wire members is fitted into the grooves or the through-holes forming one of the two opposing rows of the fitting body, another of both the ends of the each of the plurality of wire members is fitted into the grooves or the through-holes forming another of the two opposing rows, and both the ends of the each of the plurality of wire members are fitted so as to be present at positions opposed to each other across a center between the two opposing rows, wherein the connection member comprises two independent connection members formed into a shape corresponding to a row shape of the two opposing rows of the fitting member, and the terminal ends of the ends of the respective plurality of wire members are fixed to the two independent connection members, respectively, and are connected to the two independent connection members so as to form the respective two opposing rows, and wherein the stirring section is formed so that the parts of the respective plurality of wire members bent into the folded shape are arranged so as to pass through a position above the center between the two opposing rows and cross at substantially the same angle with one another, thereby obtaining a radially expanded state, and that a shape obtained by connecting outermost parts of the bent parts comprises a substantially circular shape.

2. A stirrer according to claim 1, wherein the two opposing rows each have a linear row shape.

3. A stirrer according to claim 1,
wherein the fitting body has a shape including at least a long-side corresponding part and a short-side corresponding part, and
wherein the housing recess for housing the connection member is formed into a shape corresponding to a shape of the connection member in the long-side corresponding part of the fitting body.

4. A stirrer according to claim 1, wherein an adhesion layer is present at respective opposing parts among the mounting recess of the handle section, the fitting body, and the ends of the respective plurality of wire members.

5. A stirrer according to claim 1,
wherein the fitting body comprises a lid portion formed integrally at an upper portion thereof, for covering an upper end of the mounting recess of the handle section, and
wherein the lid portion comprises through-holes into which the ends of the respective plurality of wire members are fitted.

6. A stirrer according to claim 1, wherein the ends of the respective plurality of wire members forming the stirring section are parts used for a sliding operation of sliding the ends and the fitting body relatively to each other at a time of manufacturing so that the ends are fitted into the grooves or the through-holes formed in the fitting body, the ends each being formed into a shape including a sliding operation part, which is used at the time of manufacturing, linearly extending from the terminal end up to above the upper surface of the fitting body.

* * * * *